United States Patent
Kato et al.

(10) Patent No.: US 6,538,404 B2
(45) Date of Patent: Mar. 25, 2003

(54) MOTOR APPARATUS

(75) Inventors: Hideaki Kato, Osaka-fu (JP); Takashi Ogawa, Osaka-fu (JP); Tetsuo Nomoto, Osaka-fu (JP); Yuuichi Izawa, Osaka-fu (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/782,755

(22) Filed: Feb. 13, 2001

(65) Prior Publication Data

US 2001/0019249 A1 Sep. 6, 2001

(30) Foreign Application Priority Data

| Feb. 14, 2000 | (JP) | 2000-035974 |
| Feb. 15, 2000 | (JP) | 2000-037298 |
| Feb. 16, 2000 | (JP) | 2000-037359 |
| Feb. 16, 2000 | (JP) | 2000-037434 |

(51) Int. Cl.$^7$ ............................................... H02P 5/06
(52) U.S. Cl. ................. 318/254; 318/138; 318/139; 318/432; 318/434; 318/439; 318/799; 318/800
(58) Field of Search ................. 318/138, 139, 318/254, 432, 434, 439, 799, 800

(56) References Cited

U.S. PATENT DOCUMENTS

| 4,528,486 A | * | 7/1985 | Flaig et al. ............. 318/254 |
| 5,304,903 A | * | 4/1994 | Nakai et al. ............. 318/254 |
| 5,311,105 A | * | 5/1994 | Nakai et al. ............. 318/254 |
| 5,339,013 A | * | 8/1994 | Nakai et al. ............. 318/254 |
| 5,491,393 A | * | 2/1996 | Uesugi .................... 318/439 |

FOREIGN PATENT DOCUMENTS

| JP | 58-190287 | * | 7/1983 | ............. H02P/1/16 |
| JP | 2682164 | | 5/1991 | |
| JP | 8-182378 | | 7/1996 | |
| JP | 11-146685 | * | 5/1999 | ............. H02P/6/18 |

* cited by examiner

Primary Examiner—Robert E. Nappi
Assistant Examiner—Tyrone Smith
(74) Attorney, Agent, or Firm—Weingarten, Schurgin, Gagnebin & Lebovici LLP

(57) ABSTRACT

A motor apparatus, such as a DC brushless motor, is provided for the obtaining a position detection signal by detecting the intersection of the divided voltage of a bus voltage and three phases of the divided voltage of the three phases by a comparator which results in the central position of a flat portion. For the divided voltage for the three phases of the respective positive terminal of the comparator, the comparison voltage obtained by dividing the voltage between the divided voltage for the three phases of the following phase in the order and the divided voltage of the bus voltage is applied to the respective negative terminal. As the comparison voltage is phase shifted, the position can be detected by making a slant position ahead of the flat point of the intersection. When the comparison voltage obtained by dividing the voltage between the divided voltage for the three phases of the preceding phase in the order and the divided voltage of the bus voltage is applied to the respective negative terminal, as the phase is shifted in the opposite direction, the position can be detected by making a slant position near the flat point of the intersection. Thereby, the motor apparatus having an intersection whose position is to be detected, can be detected precisely even when the intersection is a flat crossing and is unclear.

18 Claims, 37 Drawing Sheets

[Whole block composition]

(Whole block composition)

Fig. 3
(Essential part operation waveform)
(Forward detection)
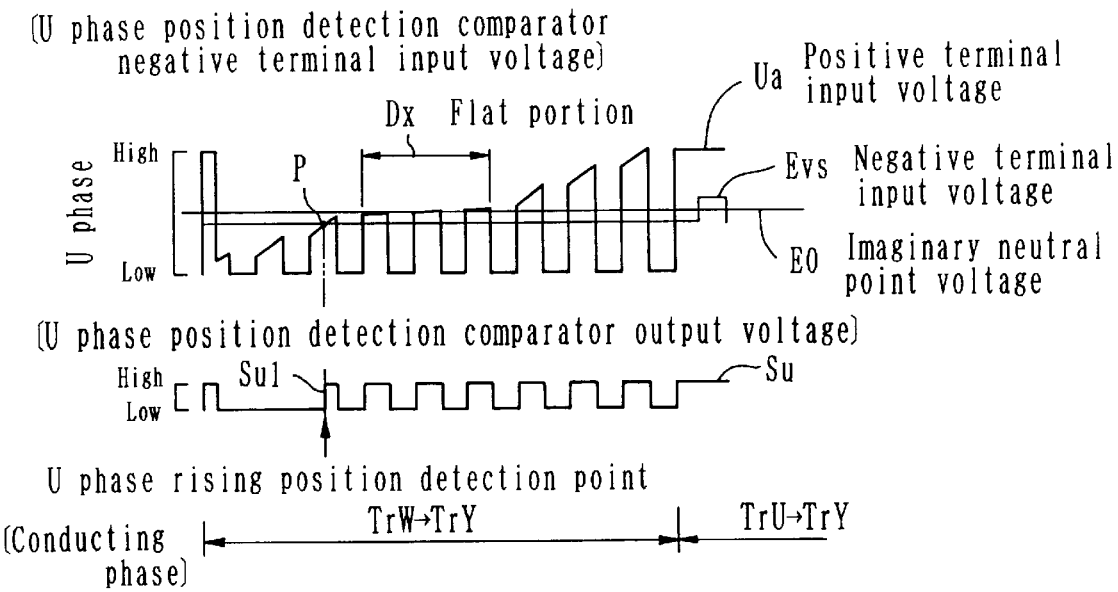
(Backward detection)
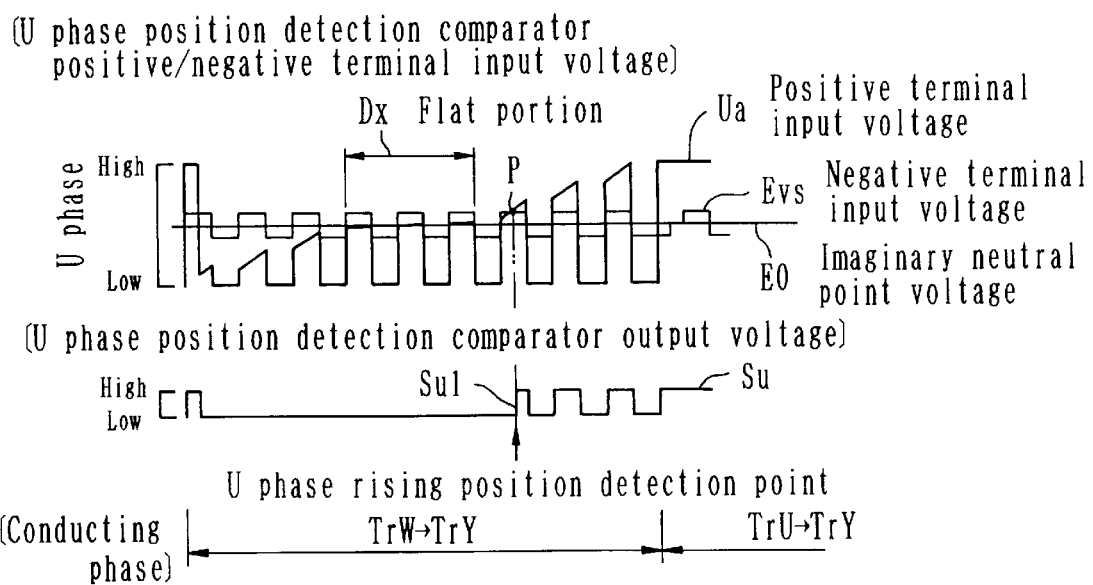

(Whole block composition)

(Whole block composition)

(Whole block composition)

(Essential part operation waveform)

(Front view of essential part composition)

(Embedded magnet type rotor)

(Essential part operation waveform)

(Position detection unstable state)

(Whole block composition)

(Whole block composition)

Fig. 17
(Essential part operation waveform)
(Normal operation state)
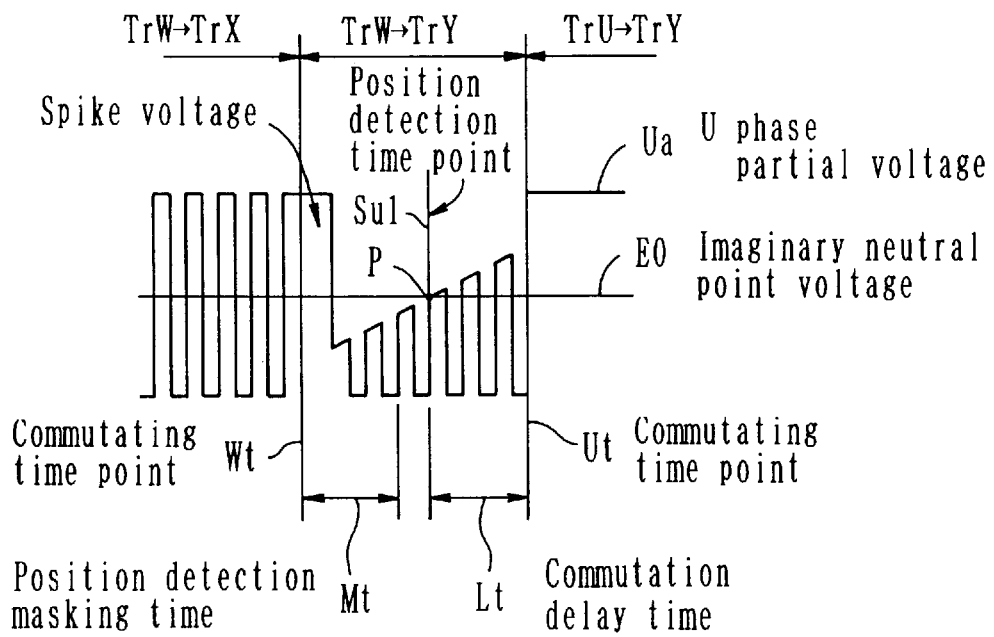
(Start-up operation state)
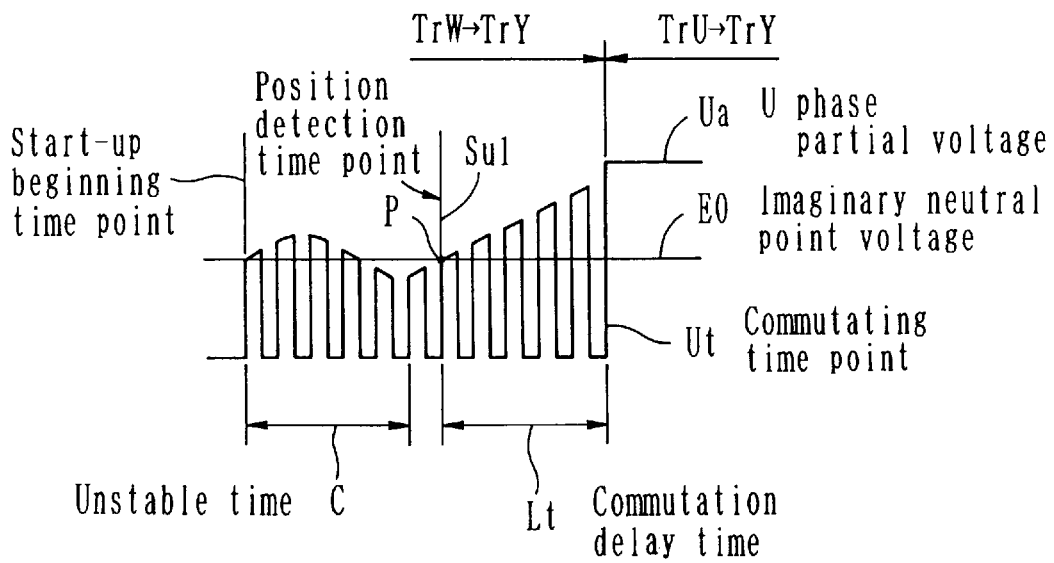

Fig. 18
(Essential part operation condition)
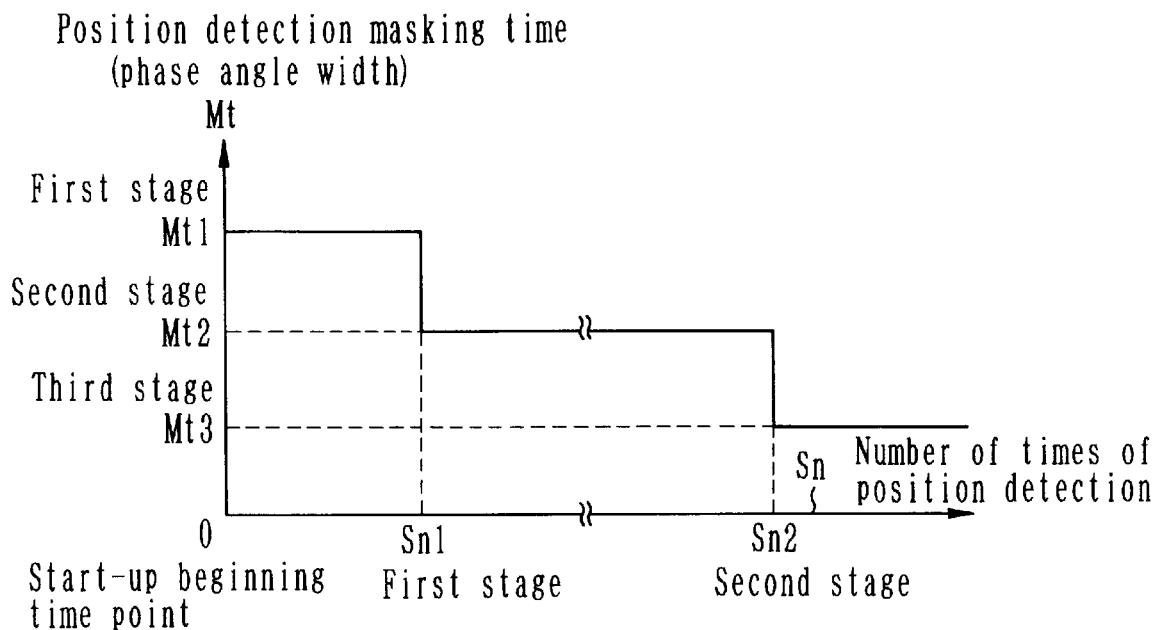
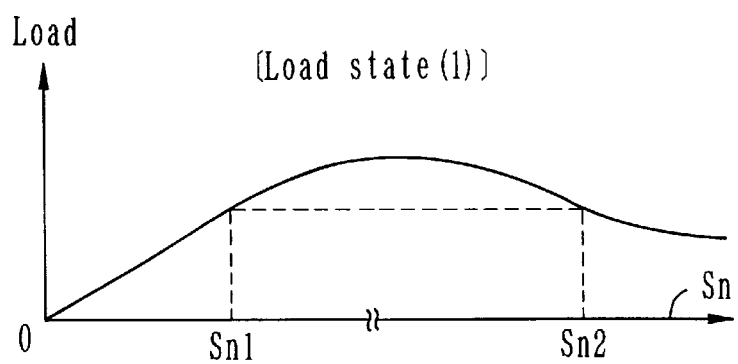
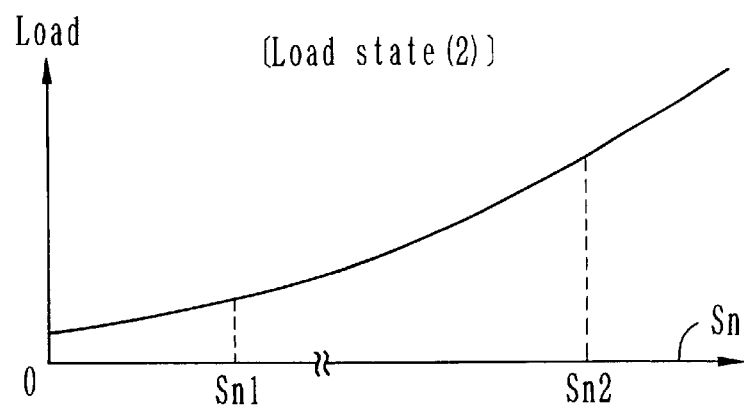

(Essential part operation condition) Fig. 19
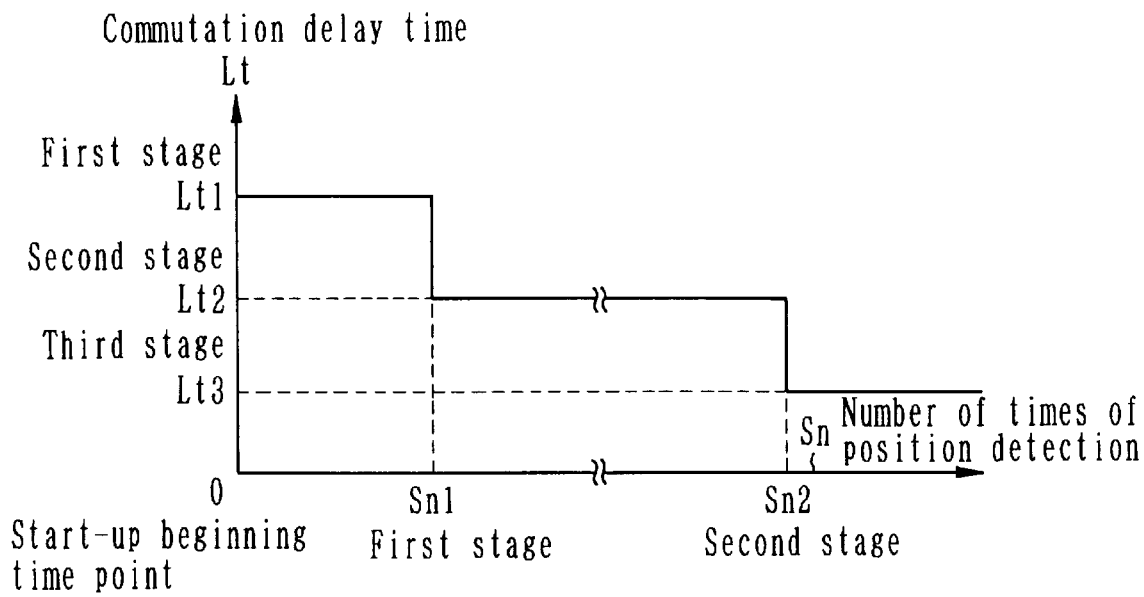
(Essential part operation condition) Fig. 20
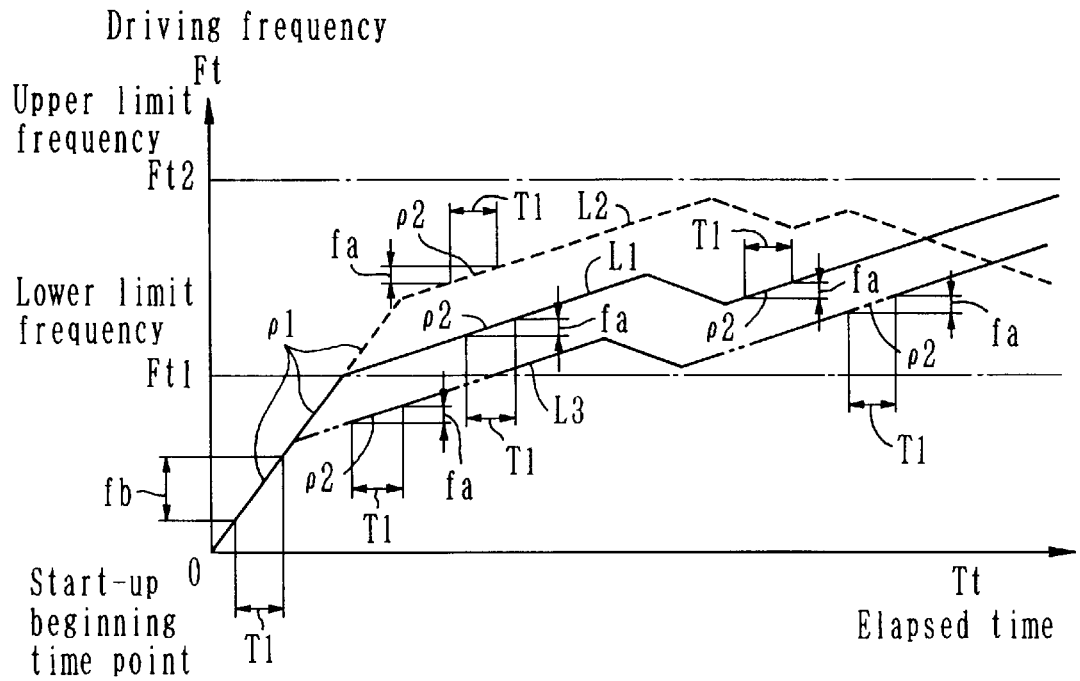

(Whole block composition)

(Essential part operation waveform)

(Normal operation state)

(Essential part operation waveform)

(Whole block composition)

(Essential part control processing flow)

(Whole block composition)

(Whole block composition)

(Essential part operation waveform)
(Rs current and overcurrent protection level)

(Essential part operation waveform)
(Rs current and overcurrent protection level)

[Whole block composition]

(Essential part operation state)

[Essential part operation state] Fig. 41
Conduction to U~V phase (TU=ON, TY=OFF)
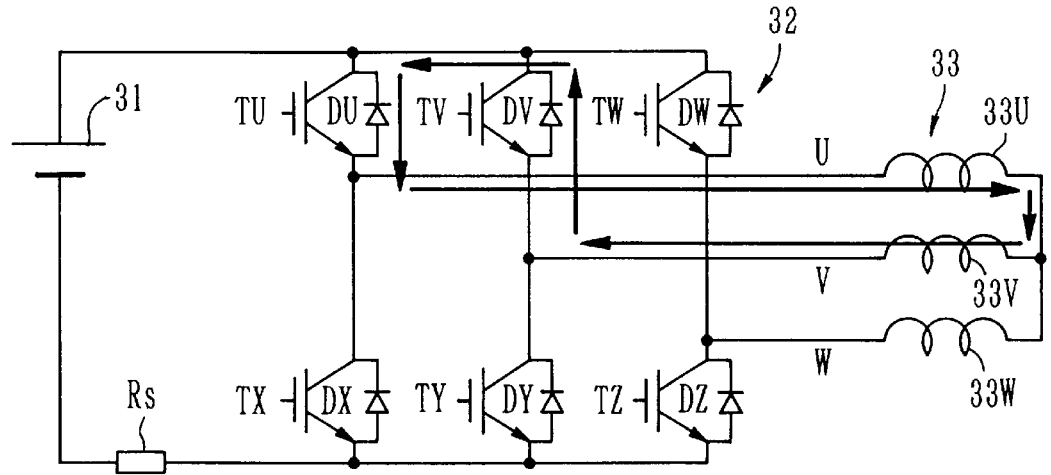
[Essential part operation state] Fig. 42
When conduction stop (TU~TZ=OFF), U~V phase power source regeneration sustained
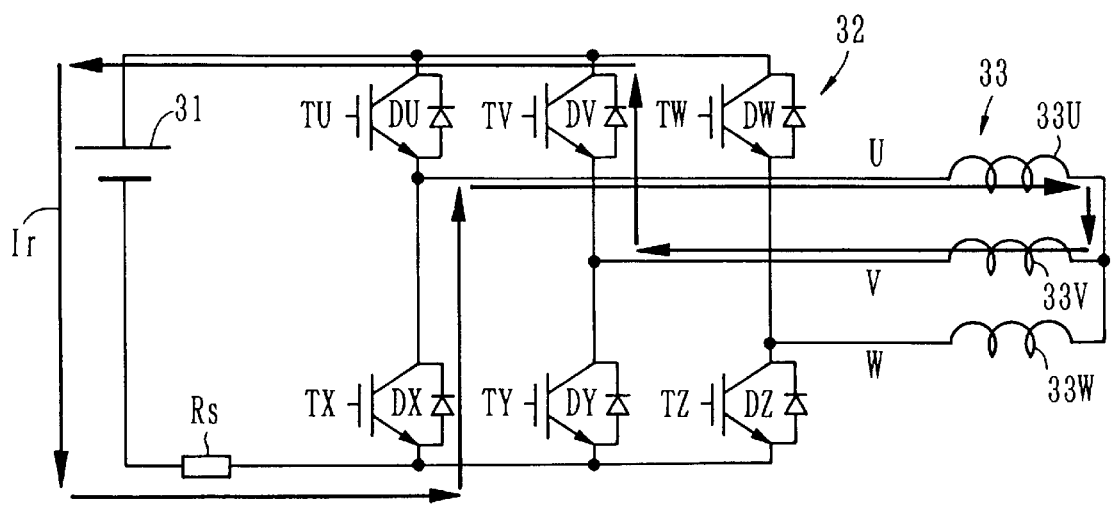

MOTOR APPARATUS

BACKGROUND OF THE INVENTION

1. Field of the Invention

This invention concerns a DC brushless motor apparatus allowing to control the inverter circuit driving by position detection signal obtained through the position detection of a motor apparatus, particularly.

2. Background of the Invention

As for the composition of such DC brushless motor apparatus, for example, compositions as shown in FIG. 9, 21, 30 are disclosed by Japan Patent Application Laid-Open Hei 8-182378. In FIG. 9, 21, 30, the power source section 1, 11, 21 is a DC power source, and obtains an bus voltage Vcc of the inverter circuit 2, 12, 22 for obtaining a pulse modified voltage mentioned below, and obtains a DC power source, for example, by rectification and flattening of the AC power source.

In FIG. 9, the inverter circuit 2, generates multi-phase, for instance, three-phase pulse width modified voltage of U-phase, V-phase and W phase, by controlling transistors TrU~TrZ, for instance, power transistor, IGBT device or the like, by means of driving signal from the drive circuit 4, creates a rotational magnetic field, and rotates the rotor 3R by supplying respective stator coils 3U, 3V, 3W of the DC brushless motor 3. Though not illustrated, the rotor 3R is composed of a plurality of magnetic poles, for example, by magnetizing two pairs of N pole and S pole, as necessary, an embedded magnet type rotor as mentioned in FIG. 12 below is employed. In this invention, besides magnetic pole formed as rotor and then magnetized, and magnetic pole formed by embedding or fitting a permanent magnet in a rotor, the "magnetic pole" includes also those formed by the other methods.

The driving of transistors TrU~TrZ by the drive circuit 4 is as shown by [Transistor driving waveform] in FIG. 10; fine pulse waveform portions correspond to chopping portions, and the voltage output to the terminal R of U phase, terminal S of V phase and terminal T of W phase appear, for instance, as waveforms before the partial voltage of [Terminal voltage partial voltage waveform] in FIG. 10, FIG. 11.

Here, as U phase, V phase and W phase are alternative current, from the time sequence viewpoint, U phase→V phase→W phase→U phase→V phase→W phase . . . are repeated, for V phase, U phase is the preceding phase, and W phase is the following phase, and for W phase, V phase is the preceding phase, and U phase is the following phase, and further, for U phase, W phase is the preceding phase, and V phase is the following phase.

Consequently, divided by the bleeder circuit of the resistor Rau, Rbu, bleeder circuit of the resistor Rav, Rbv and bleeder circuit of the resistor Raw, Rbw, the waveform of respective voltages input to respective positive terminals, namely respective + terminals of the comparator CPu, comparator CPv and comparator CPw result in U phase partial voltage Ua, V phase partial voltage Va and W phase partial voltage Wa having a waveform like U phase, V phase and W phase of [Terminal voltage partial voltage waveform] in FIG. 10.

The voltage waveform of the imaginary neutral point voltage E0 input to respective negative terminals, namely – terminals of the resistance comparator CPu, comparator CPv and comparator CPw, by dividing the buss voltage Vcc with the bleeder circuit of the resistor Rd, Rc is as shown by [Power source voltage partial voltage waveform (imaginary neutral point voltage) in FIG. 11. Here, the imaginary neutral point voltage E0 is positioned substantially at the center of the amplitude of U phase partial voltage Ua, V phase partial voltage Va and W phase partial voltage Wa, be setting the resistor Rd, Rc so that $[Rb/(Ra+Rb)]=[2Rd/(Rc+Rd)]$ for respective resistors Ra~Rd in respective bleeder circuit of U phase, V phase and W phase.

Then, the comparator CPu becomes U phase position detection comparator, the comparator CPv V phase position detection comparator, and the comparator CPw W phase position detection comparator, and respective transistor TrU~TrZ of the inverter circuit 2 are driven by delivering the position detection signal Su, Sv and Sw obtained by detecting with respective comparator CPu, CPv and CPw to the control processing portion comprising mainly a microcomputer, namely to the microcomputer 5, by controlling the drive circuit 4 through a predetermined control by the microcomputer 5.

When the rotor 3R rotates, as an induction voltage appears at the stator coil of the phase not conducted with pulse amplitude modified voltage among the stator coils 3U, 3V and 3W, [Rising induction voltage] and [Falling induction voltage] appear after respective spike voltage, as shown in the same drawing.

Then, respective comparator CPu, CPv and CPw detect the intersection with said neutral point voltage in the portion of [Rising induction voltage] and [Falling induction voltage], namely zero cross point P by comparing these voltages, and output this detection signal as position detection signal.

For instance, taking the comparison detection state by the comparator CPu as example, it is as [U phase position detection comparator positive negative input voltage (overwrite)] of FIG. 11, and the zero cross point P is detected, and "U phase rising position detection point" and "U phase falling position detection point" are output as position detection signal, as [U phase position detection comparator output voltage] in FIG. 11. Here, the comparison detection state by the other comparator CPv, CPw is the waveform state, in which the waveform of [U phase position detection comparator positive negative input voltage (overwrite)] of FIG. 9 is shifted by the phase of 120 degrees.

Such DC brushless motor has an advantage of effective use of reluctance torque by performing weak field control, by using an embedded magnet type rotor, namely IPM type rotor as shown in FIG. 12; however, when this IPM rotor is used, a flat portion DX flat in the proximity of the zero cross point P is generated in the induction voltage waveform, making the position detection unstable. as shown in FIG. 13.

Therefore, Jpn. Pat. Appln. Publication Laid-Open No. HEI 11-146685 discloses a composition, wherein, a vertical variation type imaginary neutral point voltage is generated by further adding a plurality of resistors Rf, Rh at the portion where the bus voltage Vcc is divided by respectively equal resistance value resistors Rd, Rc, and alternatively short-circuiting these additional points by respective switching device Tra, Trb according to the control signal from the microcomputer 5, and wherein the zero cross point P is shifted to a position off said flat portion Dx, by comparing and detecting the intersection of this vertical variation type imaginary neutral point voltage and the aforementioned [Rising induction voltage] and [Falling induction voltage] by means of respective comparator CPu, CPv, CPw.

In addition, Jpn. Pat. Appln. Publication Laid-Open No. HEI 11-146685 or the like disclose a composition (called, no chopping composition, hereinafter) wherein the detection is performed by a detection composition similar to said respective position detection, by modifying to the waveform like FIG. 15, without performing the pulse amplitude modification by said chopping.

Such prior art required, disadvantageously, to dispose a switching device, and a composition to control its driving.

On the other hand, in FIG. 21, the inverter circuit 12 rotates the rotor 13R by generating a multi-phase, for instance, three-phased pulse amplitude modified voltage of U phase, V phase and W phase by controlling the transistor TrU~Trz, for example power transistor, IGBT device or the like, with driving signal from the drive circuit 14, and generating a rotary magnetic field by imparting to respective stator coils 13U, 13V and 13W of the DC brushless motor 13. Though not illustrated, the rotor 13R is provided with a plurality of magnetized magnetic poles, for instance, two pairs of N pole, and S pole.

The driving of transistors TrU~TrZ by the drive circuit 14 is as shown by [Transistor driving waveform] in FIG. 22; fine pulse waveform portions correspond to chopping portions, and the voltage output to the terminal R of U phase, terminal S of V phase and terminal T of W phase appear, for instance, as waveforms before the partial voltage of [Terminal voltage partial voltage waveform] in FIG. 22, FIG. 23.

Here, as U phase, V phase and W phase are alternative current, from the time sequence viewpoint, U phase→V phase→W phase→U phase→V phase→W phase . . . are repeated, for V phase, U phase is the preceding phase, and W phase is the following phase, and for W phase, V phase is the preceding phase, and U phase is the following phase, and further, for U phase, W phase is the preceding phase, and V phase is the following phase.

Consequently, divided by the bleeder circuit of the resistor Rau, Rbu, bleeder circuit of the resistor Rav, Rbv and bleeder circuit of the resistor Raw, Rbw, the waveform of respective voltages input to respective positive terminals, namely respective+ terminals of the comparator CPu, comparator CPv and comparator CPw result in U phase partial voltage Ua, V phase partial voltage Va and W phase partial voltage Wa having a waveform like U phase, V phase and W phase of [Terminal voltage partial voltage waveform] in FIG. 22.

The voltage waveform of the imaginary neutral point voltage E0 input to respective negative terminals, namely – terminals of the resistance comparator CPu, comparator CPv and comparator CPw, by dividing the bus voltage Dcc with the bleeder circuit of the resistor Rd, Rc is as shown by [Power source voltage partial voltage waveform (imaginary neutral point voltage) in FIG. 23. Here, the imaginary neutral point voltage E0 is positioned substantially at the center of the amplitude of U phase partial voltage Ua, V phase partial voltage Va and W phase partial voltage Wa, be setting the resistor Rd, Rc so that [Rb/(Ra+Rb)]=[2Rd/(Rc+Rd)] for respective resistors Ra~Rd in respective bleeder circuit of U phase, V phase and W phase.

Then, the comparator CPu becomes U phase position detection comparator, the comparator CPv V phase position detection comparator, and the comparator CPw W phase position detection comparator, and respective transistor TrU~TrZ of the inverter circuit 2 are driven by delivering the position detection signal Su, Sv and Sw obtained by detecting with respective comparator CPu, CPv and CPw to the control processing portion comprising mainly a microcomputer, namely to the microcomputer 15, by controlling the drive circuit 14 through a predetermined control by the microcomputer 15.

When the rotor 13R rotates, as an induction voltage appears at the stator coil of the phase not conducted with pulse amplitude modified voltage among the stator coils 13U, 13V and 13W, [Rising induction voltage] and [Falling induction voltage] appear after respective spike voltage, as shown in the same drawing.

Then, respective comparator CPu, CPv and CPw detect the intersection with said neutral point voltage in the portion of [Rising induction voltage] and [Falling induction voltage], namely zero cross point P by comparing these voltages, and output this detection signal as position detection signal Su, Sv and Sw.

For instance, taking the comparison detection state by the comparator CPu as example, it is as [U phase position detection comparator positive negative input voltage (overwrite)] of FIG. 23, and the zero cross point P is detected, and "U phase rising position detection point" and "U phase falling position detection point" are output as position detection signal, as [U phase position detection comparator output voltage] in FIG. 23. Here, the comparison detection state by the other comparator CPv, CPw is the waveform state, in which the waveform of [U phase position detection comparator positive negative input voltage (overwrite)] of FIG. 23 is shifted by the phase of 120 degrees.

In this detection, the microcomputer 15 takes as position detection signal Su1 the signal obtained by detecting, first, Low to High rising edge or the output of the U phase position detection comparator CPu, when the time has elapsed for the spike voltage in the previous conduction pattern ends, and changes over to the conduction by the conduction pattern from the next transistor TrU to the transistor TrY when the time for the rotor 13R rotates by a certain angle has elapsed.

Then, the microcomputer 15 takes as position detection signal (not illustrated) the signal obtained by detecting, first, High to Low falling edge by the W phase position detection comparator CPw, when the time has elapsed for the spike voltage in the conduction pattern from the previous transistor TrU to the transistor TrY ends, and changes over to the conduction by the conduction pattern from the next transistor Tru to the transistor TrZ when the time for the rotor 13R rotates by a certain angle has elapsed.

Similarly, during the conduction from the transistor TrU to the transistor TrZ, the conduction is changed over from the transistor TrV to the transistor TrZ by the position detection signal (not illustrated) detecting the rising edge of the output of the V phase comparator CPv, and during the conduction from the transistor TrV to the transistor TrZ, the conduction is changed over from the transistor TrV to the transistor TrZ by the position detection signal Su2 detecting the falling edge of the output of the U phase comparator CPv.

During the conduction from the transistor TrV to the transistor TrX, the conduction is changed over from the transistor TrW to the transistor TrX by the position detection signal (not illustrated) detecting the rising edge of the output of the W phase comparator CPW, and during the conduction from the transistor TrW to the transistor TrX, it is operated to change over the conduction from the transistor TrW to the transistor TrY by the position detection signal (not illustrated) detecting the falling edge of the output of the V phase comparator CPv.

Thus, the microcomputer 15 drives the inverter circuit 12 to keep the rotor 13R rotating, by obtaining the position information of the rotor 13R, based on the output waveform of respective comparator CPu, CPv and CPw.

The aforementioned driving state corresponds to an operation state (called stationary operation state, in the present invention) where the rotor 13R can rotate following the increase/decrease of the inverter circuit 12 driving frequency, rotating synchronously with the driving of the inverter circuit 12 by the position detection signal Su, Sv, Sw.

On the contrary, in the starting state where the rotor 13R begins to rotate by starting the driving of the inverter circuit 12, the stationary inertia of the rotor 13R, axial friction, load driven by the rotor 13R or the like make the position detection of the rotor 13R unstable, and it is difficult to operate in synchronization with the position detection signal Su, Sv, Sw.

To solve these problems, Japanese Patent 92682164 or others disclose a composition (called the first prior art, hereinafter) wherein the conduction change over to the rotor coils 13U, 13V or 13W by the position detection signal Su, Sv, Sw of the rotor 13R is not performed immediately after the start of driving of the inverter circuit 12, a forced synchronous operation of the inverter circuit 12 is performed to change over by force the conduction to the rotor coils 13U, 13V or 13W, for example, by means of a clock circuit disposed in the microcomputer 15, and to transit to the synchronous operation by the stationary position detection, after a predetermined operation increasing/decreasing as prescribed by the output voltage of the inverter circuit 12 according to the time.

Besides, without performing said forced synchronous operation, the position of the rotor 13R is detected immediately after the start of the inverter circuit 12; however, taking example of the points of the sections "TrW→TrY", "TrUu→TrY", the detection of the position detection signal Su1 is performed following the time point to execute the changeover operation (called, conversion in the present invention) from previously conducted and operating transistor, for instance, transistor TrW, TrX to the next conductive transistor, for example, transistor TrW, TrY, namely following the conversion time point Wt, as in the [normal operation state] of FIG. 24.

In the detection of the position detection signal Su1, the inverter circuit 12 driving is controlled by setting the time interval (called, position detection masking time) Mt for detecting the position after having restricted not to perform the position detection during a predetermined interval of time, and the delay time (called, conversion delay time in the present invention) Lt for restricting the next conversion time Ut, namely the time point for changing over, for instance, to the conduction of the transistor TrU, and TrT to the time period delayed by a predetermined time from the point of position detection.

In addition to this control, a composition (called, the second prior art, hereinafter) for transiting to the synchronized operation by the stationary position detection, all the way increasing/decreasing the driving frequency of the inverter circuit 12.

Though the [normal operation state] of FIG. 24 does not show but the portion corresponding to the "U phase rising position detection point", an amplitude variation inverse to the amplitude variation of FIG. 24 appears, similarly as in "U phase rising position detection point" of FIG. 23, also in the portion corresponding to the "U phase falling position detection point" of FIG. 23. Also, V phase and W phase, similarly, position detection portions appear at two posi-tions. There, as mentioned above, if two pairs of N pole and S pole, namely two opposed pairs are magnetized to the rotor 13R, (3 phase×2 points)×points of number of two opposed poles, in other words, 12 points of detection location portions appear.

In the composition of such DC brushless motor, in relation to the synchronous operation with the rotor 13R as shown in FIG. 25, it is well known a composition wherein the imaginary neutral point voltage E0 is detected by shifting vertically like E01, E02 in FIG. 25, by changing the partial pressure ratio of the bleeder circuit obtaining the imaginary neutral point voltage E0 or the bleeder circuit obtaining respective phase divided voltage, for shifting the detection position of position detection signal Su, Sv, Sw forward or backward the induction voltage, as the intersection Pa or intersection Pb (called, the third prior art, hereinafter), and it goes without saying that, in such a composition, the position detection masking time Mt and the conversion delay time Lt are set to correspond to the intersection Pa or intersection Pb.

As the synchronous operation is forced without position detection, the aforementioned first prior art can not accelerate the time for transiting to the synchronous operation by stationary position detection, and requires a considerably long time, because the inverter circuit 12 output voltage should be increased gradually, with a change in the extent not to provoke the inverter circuit 12 emergency stop, by disordered or irregular driving due to the variation of the load driven by the rotor 13R.

On the other hand, the second prior art has an advantage of being able to transit to the synchronous operation by stationary position detection in a period of time shorter than the first prior; however, when the load driven by the rotor 13R varies, the position detection will be disordered by such variation, and disadvantageously, it can not transit to the synchronous operation by stationary position detection.

Further, in FIG. 30, the inverter circuit 22, generates multi-phase, for instance, three-phase pulse width modified voltage of U-phase, V-phase and W phase, by controlling transistors TrU~TrZ, for instance, power transistor, IGBT device or the like, by means of driving signal from the drive circuit 24, creates a rotational magnetic field, and rotates the rotor 23R by supplying respective stator coils 3U, 3V, 3W of the DC brushless motor 23. Though not illustrated, the rotor 3R is composed of a plurality of "magnetized" poles, for example, magnetic poles composed of two pairs of N pole and S pole.

In this invention, the "magnetic pole" includes both magnetic pole formed as rotor and then magnetized, and magnetic pole formed by embedding or fitting a permanent magnet in a rotor.

The driving of transistors TrU~TrZ by the drive circuit 24 is as shown by [Transistor driving waveform] in FIG. 31; fine pulse waveform portions correspond to chopping portions, and the voltage output to the terminal R of U phase, terminal S of V phase and terminal T of W phase are divided by the bleeder circuit of the resistor Rau, Rbu, bleeder circuit of the resistor Rav, Rbv and bleeder circuit of the resistor Raw, Rbw, then the waveform of respective voltages input to respective positive terminals, namely respective+ terminals of the comparator CPu, comparator CPv and comparator CPw result in U phase partial voltage Ua, V phase partial voltage Va and W phase partial voltage Wa having a waveform like U phase, V phase and W phase of [Terminal voltage partial voltage waveform] in FIG. 31.

The voltage waveform of the imaginary neutral point voltage E0 input to respective negative terminals, namely − terminals of the resistance comparator CPu, comparator CPv and comparator CPw, by dividing the bus voltage Dcc with the bleeder circuit of the resistor Rd, Rc is as shown by [Power source voltage partial voltage waveform (imaginary neutral point voltage) in FIG. 32. Besides, it is sometimes used a composition wherein the imaginary neutral point voltage E0 is shifted upward or downward the imaginary neutral point voltage E0 of FIG. 32, and the position detection signal Su1~Sw2 is obtained by shifting the intersection P forward or backward.

Then, the comparator CPu becomes U phase position detection comparator, the comparator CPv V phase position detection comparator, and the comparator CPw W phase position detection comparator, and respective transistor TrU~tRz of the inverter circuit 22 are driven by delivering the position detection signal Su, Sv and Sw obtained by detecting with respective comparator CPu, CPv and CPw to the control processing portion comprising mainly a microcomputer, namely to the microcomputer 25, by controlling the drive circuit 24 through a predetermined control by the microcomputer 25.

When the rotor 23R rotates, as an induction voltage appears at the stator coil of the phase not conducted with pulse amplitude modified voltage among the stator coils 23U, 23V and 23W, [Rising induction voltage] and [Falling induction voltage] appear after respective spike voltage, as shown in FIG. 32.

Then, respective comparator CPu, CPv and CPw detect the intersection with said neutral point voltage in the portion of [Rising induction voltage] and [Falling induction voltage], namely zero cross point P by comparing these voltages, and output this detection signal as position detection signal Su, Sv and Sw.

For instance, taking the comparison detection state by the comparator CPu as example, it is as [U phase position detection comparator positive negative input voltage (overwrite)] of FIG. 32, and the zero cross point P is detected, and "U phase rising position detection point" and "U phase falling position detection point" are output as position detection signal, as [U phase position detection comparator output voltage] in FIG. 32. Here, the comparison detection state by the other comparator CPv, CPw is the waveform state, in which the waveform of [U phase position detection comparator positive negative input voltage (overwrite)] of FIG. 33 is shifted by 120 degrees in phase.

In other words, in [R,S,T terminal voltage partial waveform] of FIG. 31, position detection signals are detected cyclically with a time interval corresponding to the rotor 23R speed variation, in respect of one pair of magnetic poles of the rotor 23R, during one revolution of the rotor 23R as Su1→Sw2→Sv1→Su2→Sw1→Sv2 and delivered to the microcomputer 25.

The microcomputer 25 calculates the number of revolution per unit time of the rotor 23R (called number of revolution, in the present invention), for instance, rpm or rps (called collectively "rpm", hereinafter) based on the time interval for obtaining respective position detection signals Su1~Sw2, and controls to change the frequency fm of chopping pulse or respective phase voltage (chopping frequency, hereinafter) given from inverter circuit 22 to respective stator coils 23U~W or the chopping pulse duty rate du (duty rate, hereinafter) so that this number of revolution rpm be the target number of revolution, for instance, number of revolution rm. Here, the aforementioned number of revolution rpm is the one called, generally, average number of revolution.

When the number of occurrence of position detection signals Su1~Sw2, is twelve per revolution of the rotor 23r, the number of revolution rpm can be obtained by dividing a unit time value, for instance, 1 minute or 1 second by a time value of the time from the time point when the previous one of these twelve position detection signals is obtained to the time point when the next is obtained, measured by an inner clock circuit (not shown) of the microcomputer 25, or the number of revolution rpm in terms of average value can be obtained by dividing a unit time by a time value of the time from the time point when one of position detection signals is obtained to the time point when a plurality of, for instance, ten position detection signals are obtained, and then dividing by the number of signals.

To be specific, as in FIG. 33, if a control with a tolerance of +/−α is to be executed to the target number of revolution rm1, the control will be executed based on position detection signals Su1~Sw2 by changing the chopping frequency fm or the duty rate fm of respective phase voltage, and when the number of revolution rpm obtained based on position detection signals Su1~Sw2 attains the tolerated upper limit rm1+α, the output voltage Ua~Wa of respective phase (here, Ua~Wa mean output voltage of transistors TrU~TrZ before said voltage division, and the same applies below) is lowered by changing the chopping frequency fm or the duty rate du.

On the other hand, if tolerated lower limit rm1−α is attained, it is operated to lowers the respective phase output voltage, and in addition, the operation to vary the output voltage Ua~Wa is performed, by PI control based on the differential value of the detected number of rotation rpm and the target number of rotation rm1 or others. Besides, the control cycle T1 for this control is limited to a relatively small cycle, for instance, 10 msec~1 sec, and it is controlled to vary often the output voltage Ua~Wa.

In the aforementioned DC brushless motor apparatus, if the load driven by the rotor 23R, namely the driving object of the DC brushless motor apparatus is an air-conditioner, refrigerator or other compressor, it is necessary to adjust the output voltage, by changing often the chopping frequency fm or the duty rate du, as the load varies violently. Such output voltage modification and adjustment increases, disadvantageously, the vibration and noise of the motor itself or compressor.

Further, the present invention concerns an inverter driving electric motor apparatus provided with a function to protect the inverter overcurrent.

Such an inverter driving electric motor apparatus 200 is used, for example, as compression section for coolant compression of refrigeration equipment, air-conditioner or the like, driving source of fan or the like, and various motors such as DC brushless motor is used as electric motor (motor, hereinafter) and, for example, a composition of inverter driving electric motor apparatus 200 wherein a motor 33 is driven by an inverter 32 as shown in FIG. 38 is well-known. In respective drawings below, portions referred to with the same symbol have the same function as portions of the same symbol described in any of drawings.

In FIG. 38, the microcomputer 35 drives the inverter 32 by controlling the drive circuit 34 by delivering a control signal to rotate continuously the motor to the drive circuit 34, and the inverter 32 drives the motor 33 by converting the DC power source 31 into a multiple phase, for instance, three-phased AC power source by means of power transistors (called transistor hereinafter) TU, TV, TW, TX, TZ.

The driving of transistors TU~TZ is controlled to rotate the rotor 33R synchronously by imparting signals from position detection portions (not shown) for detecting the position of the rotor 33R to the microcomputer 35. The DC power source 31 is, for example, a DC power source obtained by rectifying and flattening the SC voltage obtained by transforming an AC power source (not shown), for instance, commercial AC power source to the required voltage.

The overcurrent detection circuit 36 is a portion for detecting if the DC value detected by a current detection device for detecting current supplying the inverter 32 with current from the DC power source 31, for instance, a current detection resistor Rs disposed on the electric line of the negative side of the inverter 32 exceeds a predetermined value or not, namely overcurrent or not.

Upon the detection of overcurrent, the overcurrent detection circuit 36 delivers an overcurrent detection signal 36A announcing the overcurrent to the microcomputer 35 through an overcurrent anomaly hold circuit 37, the microcomputer 35 controls the operation of the drive circuit to stop driving the inverter 32, and when the driving of the inverter 32 is stopped by this overcurrent protection operation, a control signal from the microcomputer 35 makes the anomaly cancellation circuit 38 cancel the anomaly hold by the overcurrent anomaly hold circuit 37.

The overcurrent anomaly hold circuit 37 is composed, for instance, of flip-flop circuit, and the anomaly cancellation circuit 38 is composed to cancel the anomaly hold by said flip-flop circuit, for example, by a transistor Tr provided with a protection resistor Rr disposed at the input side.

The overcurrent detection circuit 36 is composed of comparator Cp, circuit DC power source Vcc, overcurrent detection resistors R1, R2, reference voltage resistors R3, R4 or like. Here the DC power current 31 is set to, for example, a voltage of 280V and the circuit DC power source Vcc to a voltage of 5~15V and, consequently, the DC power current 31 and the circuit DC power source Vcc are separate power sources; however, when the voltage of the DC power current 31 is low and composed of a voltage similar to the circuit DC power source Vcc, the DC power current 31 and the circuit DC power source Vcc may be composed of the same one. In this case, it is necessary to compose so as not to vary the voltage of the portion corresponding to the circuit DC power source Vcc during the overcurrent.

Next, respective parts of the overcurrent detection circuit 36 are set to the following operation conditions. In the following expressions, Vcc represents the voltage of the circuit DC power source Vcc, and the voltage Em1 of the positive terminal, namely, + terminal of the comparator Cp is as represented by the following expression (1).

$$Em1 = Vcc \cdot R4/(R3+R4) \qquad (1)$$

As for the current Is flowing in the current detection resistor Rs, suppose the direction flowing from the negative pole circuit side of the inverter 32 to the negative pole of the DC current 1, shown by the arrow, be positive direction, and respective resistor values be R1>>Rs, R2>>Rs, the voltage Em2 of the negative terminal, namely, − terminal of the comparator Cp is as represented by the following expression (2).

$$Em3 = (-Is \cdot Rs) + [Vcc + Is \cdot Rs)R2/(R1+R2)] \qquad (2)$$

$$= (R2 \cdot Vcc - R1 \cdot Rs \cdot Is)/(R1+R1)$$

Consequently, it is composed so that, if Em1<Em2, the output of the comparator Cp, namely, the overcurrent detection signal 36A becomes low level Low and if Em1>Em2, the output of the comparator Cp, namely, the overcurrent detection signal 36A becomes high level High; therefore, an overcurrent detection signal 36 of the waveform as shown by [Comparator output voltage] of FIG. 39.

Respective section operation waveform of FIG. 39 is an operation example of the case where the inverter 32 and the motor 33 are composed of a three-phased DC brushless motor, and in this composition, respective transistors TU~TZ of the inverter 32 performs the three-phased driving for conduction of respective stator coils 33U, 33V, 33W of the motor 33 by a phase of 120 degrees, and [Conduction phase] [Transistor driving waveform] of FIG. 39 is an operation example in a state wherein U phase transistor TU conducts in ON state and Y phase transistor TY is performing a conduction of a fine pulse state by executing ON/OFF by chopping.

In this operation state, respective current state of respective transistors TU~TZ is as shown by the bold arrow line in FIG. 40~FIG. 42, and when both U phase transistor TU and Y phase transistor TY are ON state, said positive direction current flows in the overcurrent detection resistor Rs as shown in FIG. 40, and when U phase transistor TU is ON and Y phase transistor TY is OFF, as shown in FIG. 41, the current flows so as to pass through a feedback diode DV connected in parallel with V phase transistor TV, and therefore, current does not flow in the overcurrent detection resistor Rs.

Here, even when the conduction of all transistors TU~TZ is stopped, energy accumulated in the stator coils 33U, 33V of the motor 33 flows in the opposite direction, and becomes regeneration current Ir and, as shown in FIG. 42, current flows passing through the diode DV and a feed back diode DX connected in parallel with X phase transistor TX and, consequently, a negative current flowing in the direction opposed to said positive direction flows in the overcurrent detection resistor Rs.

In case of conduction state according to the [Transistor driving waveform] of FIG. 39, in the normal state Em1<Em2

Overcurrent detection signal 36A=Low consequently, the anomaly hold circuit 37 delivers a signal of the "normal" side level, namely, of the low level side in the [anomaly hold circuit] in FIG. 39 to the microcomputer 35, and the microcomputer 35 delivers a control signal to drive all transistors TU~TZ to the drive circuit 43, all transistors TU~TZ operate to supply the motor 33 with three-phased AC current.

When the position detection signal of the rotor 33R is not obtained for some reason, the current value delivered from the DC power source 31 to the inverter 32 becomes, for instance, a predetermined value preventing overcurrent damage of transistors TU~TZ by the overcurrent and magnetic decrease of the magnetized pole of the rotor 33R, and as [Rs current and overcurrent protection level] of FIG. 39, for instance, if a current attaining "overcurrent protection operation level Is1" flows in the overcurrent detection resistor Rs, the resistor R2 side voltage of the overcurrent detection resistor Rs lowers to a predetermined value, and the comparator CP comparison state becomes the state of [Comparator positive negative terminal input voltage (overwrite)][Comparator output voltage] of FIG. 39, and Em1>Em2

Overcurrent detection signal 36A=High consequently, the anomaly hold circuit 37 delivers a signal of the "abnormal" in FIG. 39 to the microcomputer 35, and the microcomputer 35 delivers a control signal to stop all transistors TU~TZ to the drive circuit 43, all transistors TU~TZ operate, and each transistor TU~TZ itself comes in a state not to supply the motor 33 with current.

Then, as the current flowing in the motor 33 transfers to the current value Isn side as [Rs current and overcurrent protection level] of FIG. 39, the current passing through the overcurrent detection resistor Rs becomes lower than the "overcurrent protection operation level Is1" and the overcurrent detection signal 36A of the comparator CP returns to the Low side as [Comparator output voltage] of FIG. 39, but the overcurrent anomaly hold circuit 37 keeps on holding "abnormal" state, as [abnormality hold circuit] in FIG. 39, and this hold is cancelled by the cancel operation of the anomaly cancellation circuit 38 by the control from the microcomputer 35 and returns to "normal" side.

Here, in [Rs current and overcurrent protection level] of FIG. 39, the portion where the "regeneration current period" after the inverter 33 stop flows toward "−A" side, is a portion of regenerated current Ir where stator coil respective transistor TU~TZ itself of the inverter 33 doesn't supply the motor 33 with current, as mentioned above, but that is generated by the energy accumulated in the stator coil 33U, 33V of he motor 33. In other words, in this rotation state, the motor 33 results in operating the power generation similarly to a generator, and the current by this power generation operation appears as regenerated current Ir.

In such a prior art, as it is necessary to provide, besides overcurrent detection circuit, an overcurrent anomaly hold circuit, and an overcurrent anomaly cancel circuit, apparatus whose composition becomes complicated can not be supplied easily and at a low price, and in addition, anomaly or faults also happen in these overcurrent anomaly hold circuit or overcurrent anomaly cancel circuit, making the maintenance more difficult disadvantageously.

SUMMARY OF THE INVENTION

The present invention has an object to resolve problems of such prior art, namely, necessity to provide a switching device to form an imaginary neutral point and a composition for driving control of the same, impossibility to shorten the time to the synchronous operation by a stationary position detection and necessity of a considerably long time, impossibility to transit to the cyclic operation by a stationary position detection, increase of vibration and noise of the motor itself and compressor according to the modification and adjustment of output voltage, impossibility to supply easily and at a low price an apparatus whose composition becomes complicated, and moreover, difficulty of maintenance due to anomaly or faults that happen in these overcurrent anomaly hold circuit or overcurrent anomaly cancel circuit.

Therefore, as means to solve such problems,
  in a motor apparatus such as DC brushless motor comprising a rotor having a plurality of magnetized poles, and a multiple-phase stator coil disposed to supply said rotor with rotational field during the conduction, wherein a rotational field is formed by conducting a predetermined said stator coil with voltage generated in an inverter circuit, and the time to perform said conduction is controlled based on a position detection signal obtained by comparing and detecting the induced voltage generated in said stator coil of the phase not conducted as above by the rotation of said rotor and a predetermined voltage by means of a comparator provided for each phase of said multiple phases, a first composition comprising
  a comparison input means for inputting a first divided voltage dividing the voltage of said respective phase stator coil to the positive terminal of the comparator for said respective phase, and inputting a second divided voltage obtained by dividing the voltage between said first divided voltage of the phase different from the phase inputting to said positive phase and the imaginary neutral point voltage obtained by dividing the bus voltage of said inverter circuit to the negative terminal of said comparator, and
  a position detection means for obtaining said position detection signal by detecting the intersection of the voltage portion based on said induced voltage in said first divided voltage and said second divided voltage by said respective comparator, a second composition, wherein
  in said first composition,
    said position detection signal is obtained at the time position shifted from the intersection of said induction voltage and said imaginary neutral point voltage, by making the phase of said stator coil for obtaining said second divided voltage a phase following the phase of said stator coil obtaining said first divided voltage, a third composition, wherein
  in said first composition,
    said position detection signal is obtained at the time position shifted from the intersection of said induction voltage and said imaginary neutral point voltage, by making the phase of said stator coil for obtaining said second divided voltage a phase preceding the phase of said stator coil obtaining said first divided voltage, a fourth composition, wherein
  in said first composition~third composition,
    a condenser for absorbing noise component of the voltage input to said respective comparator and attenuating the waveform is provided, a fifth composition, including
  in a motor apparatus such as DC brushless motor comprising a rotor having a plurality of magnetized poles, and a multiple-phase stator coil disposed to supply said rotor with rotational field during the conduction, wherein a rotational field is formed by conducting a predetermined said stator coil with voltage generated in an inverter circuit, and the time to perform said conduction is controlled based on a position detection signal obtained by comparing and detecting the induced voltage generated in said stator coil of the phase not conducted as above by the rotation of said rotor and a predetermined voltage by means of a comparator provided for each phase of said multiple phases,
  a masking time control means for controlling the increase/decrease of position detection masking time for regulating the detection of said position detection signal following a preceding conversion time point, at the start-up of said inverter circuit 12, in response to the number of times of said position detection signal obtained after the beginning of said start-up, a sixth composition, including
  in addition to this fifth composition,
    a conversion time control means for controlling the increase/decrease of conversion delay time for regulating the conversion time point following said preceding position detection signal at said start-up, in response to the number of times of said position detection signal obtained after the beginning of said start-up, a seventh composition, including
in addition to this fifth composition,
a driving frequency increase/decrease control means for controlling the increase rate of said inverter circuit driving frequency immediately after the beginning of said start-up, by an increase rate higher than said driving frequency increase rate during the stationary operation of said inverter circuit, an eighth composition, wherein
in said fifth composition,
said control to increase/decrease the position detection masking time is performed only from the time point of the beginning of said start-up to the time point when the revolution of said rotor attains a predetermined number of revolution, a first {ninth} composition, wherein
in said sixth composition,
said control to increase/decrease the conversion delay time is performed only from the time point of the beginning of said start-up to the time point when the revolution of said rotor attains a predetermined number of revolution, a tenth composition, wherein
in said seventh composition,
said control by the higher increase rate is performed only from the time point of the beginning of said start-up to the time point when the revolution of said rotor attains a predetermined number of revolution, an eleventh composition, comprising
in a motor apparatus such as DC brushless motor similar to the motor apparatus in said fifth composition,
a masking time control means for controlling the increase/decrease of position detection masking time for regulating the detection of said position detection signal following a preceding conversion time point, at the start-up of said inverter circuit 12, in response to the number of times of said position detection signal obtained after the beginning of said start-up,
a conversion time control means for controlling the increase/decrease of conversion delay time for regulating the conversion time point following said preceding position detection signal at said start-up, in response to the number of times of said position detection signal obtained after the beginning of said start-up, and
a driving frequency increase/decrease control means for controlling the increase rate of said inverter circuit driving frequency immediately after the beginning of said start-up, by an increase rate higher than said driving frequency increase rate during the stationary operation of said inverter circuit, a twelfth composition, comprising
in a motor apparatus such as DC brushless motor comprising a rotor having a plurality of magnetized poles, and a multiple-phase stator coil disposed to supply said rotor with rotational field during the conduction, wherein a rotational field is formed by conducting a predetermined said stator coil with voltage generated in an inverter circuit, and the time to perform said conduction is controlled based on a position detection signal obtained by comparing and detecting the induced voltage generated in said stator coil of the phase not conducted as above by the rotation of said rotor and a predetermined voltage by means of a comparator provided for each phase of said multiple phases,
a load state distinction means for distinguishing as stable state where the load driven be said rotor is table, when the variation of number of revolution of said rotor obtained based on said position detection signal is within a predetermined range for a predetermined time, and
a control hold means for holding the control state of said pulse amplitude modification voltage at the control state at the time of said distinction when it is distinguished as said stable state, a thirteenth composition, comprising
in place of said control hold means of said twelfth composition,
a control cycle modification means for changing said pulse amplitude modification voltage control cycle to a control cycle longer that the control cycle at the time of said distinction, a fourteenth composition, comprising
in an inverter driving electric motor apparatus for driving an electric motor by an inverter converting DC power source into AC power source, and holding/canceling the overcurrent protection operation for stopping said inverter driving based on the output of overcurrent detection, by comparing the detection voltage obtained by sensing the current supplied to said inverter from said DC power source and a predetermined reference voltage by means of a comparator,
a hold/cancellation means for performing said hold, or said hold and cancellation, based on the hysteresis operation of said comparator, a fifteenth composition, wherein
in said fourteenth composition,
said cancellation is performed based on reset operation of said hystérésis operation when the regenerated current of said electric motor after said stop has done becomes a predetermined negative current, and a sixteenth composition, wherein
in said fourteenth composition,
said cancellation is performed based on the control of a microcomputer controlling said inverter driving, without reset operation of said hystérésis operation, are proposed.

BRIEF DESCRIPTION OF THE DRAWINGS

FIG. 3 is a essential part operation waveform diagram of the present invention;

FIG. 17 is a essential part operation waveform diagram of the present invention;

FIG. 18 is a essential part operation condition diagram of the present invention;

FIG. 19 is a essential part operation condition diagram of the present invention;

FIG. 20 is a essential part operation condition diagram of the present invention;

FIG. 41 is a essential part operation state diagram of the prior art; and

FIG. 42 is a essential part operation state diagram of the prior art.

DETAILED DESCRIPTION OF THE PREFERRED EMBODIMENT

Now, the embodiments of the present invention shall be described in detail.

In embodiments of the present invention, examples composed by modifying only the portion of respective bleeder circuit of said prior art will be described referring to FIG. 1~FIG. 8. In FIG. 1~FIG. 8, those portions having the same symbol as the symbol of said FIG. 9~FIG. 15 are portions having the same function as those portions having the same symbol in FIG. 9~FIG. 15. Moreover, those portions having the same symbol in FIG. 1~FIG. 8 are portions having the same function as those portions having the same symbol described in any one of FIG. 1~FIG. 8.

FIRST EXAMPLE

Figure 1:
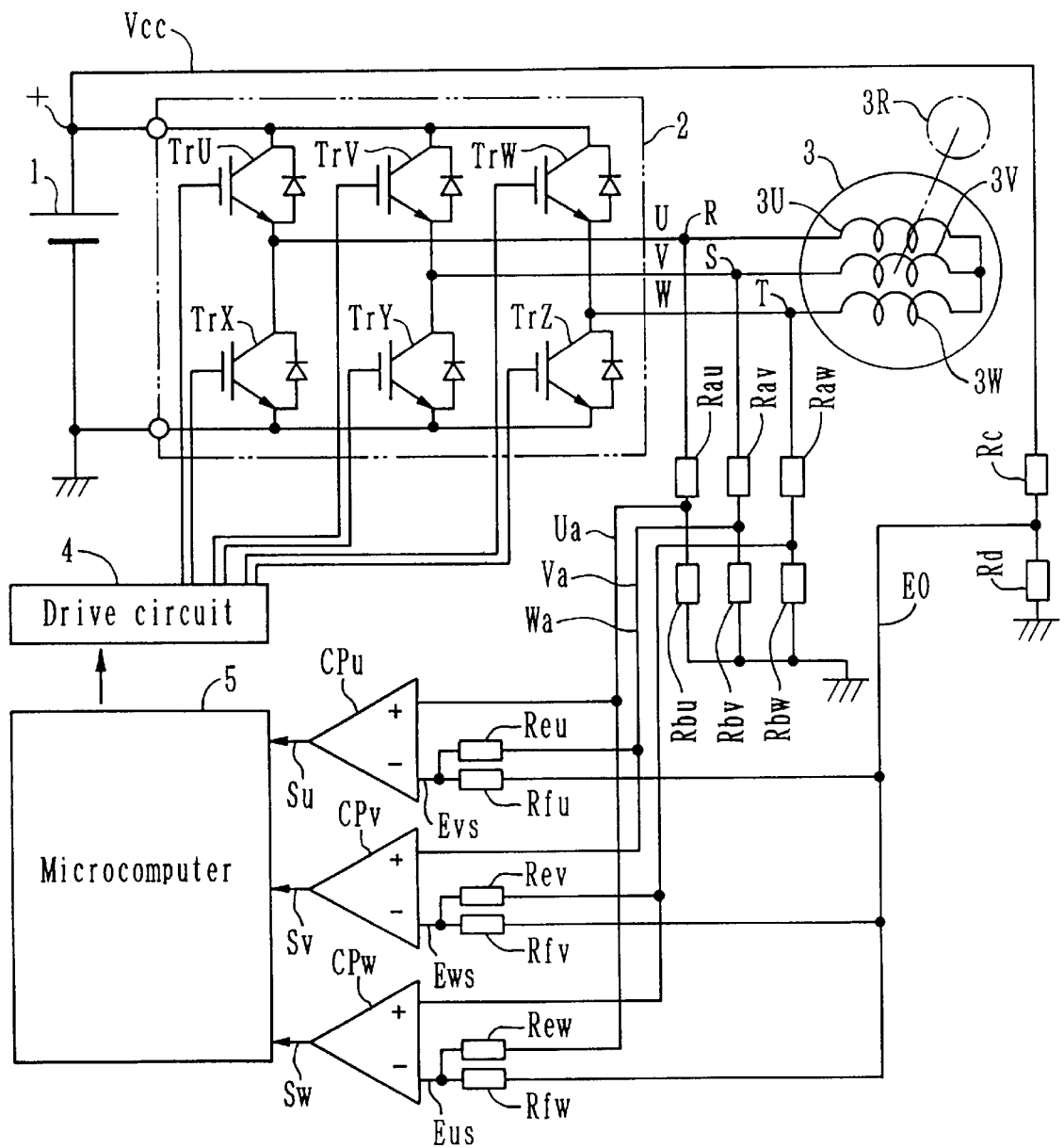
FIG. 1 is a whole block composition diagram of the present invention.
Figure 2:
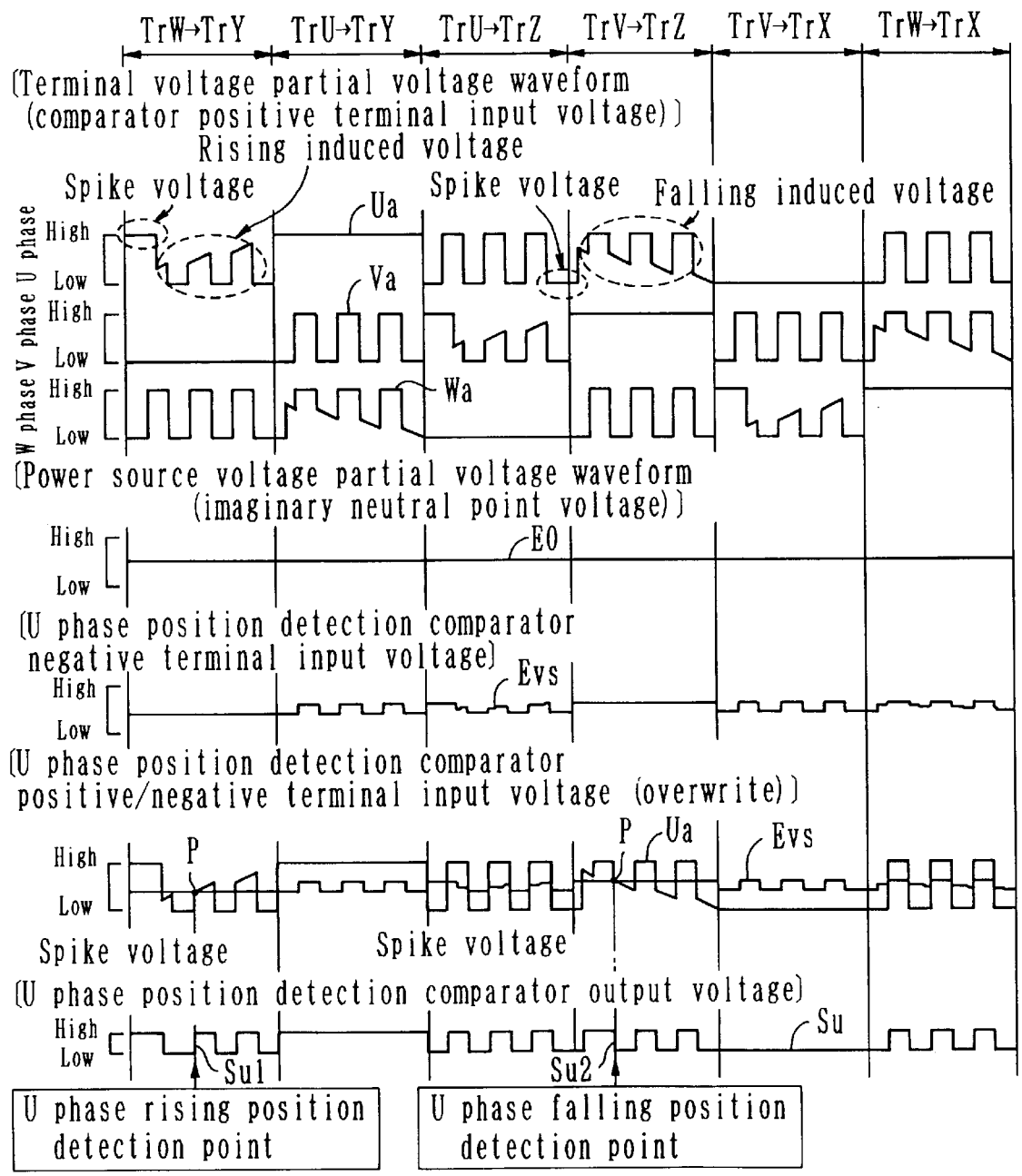
FIG. 2 is a essential part operation waveform diagram of the present invention.

Now a first example shall be described referring to FIG. 1~FIG. 3. This first embodiment, on the whole, composes said first composition and second composition.

In FIG. 1, voltage input to respective positive terminal, namely, + terminal of respective comparator CPu, CPv, CPw is similar to said prior art.

The bus voltage Vcc is divided by the bleeder circuit by the resistor Rd, Rc, becomes an imaginary neutral point voltage E0 as [Power source voltage partial voltage waveform (imaginary neutral point voltage)] in FIG. 2, and is input to the resistor Rfu side of the bleeder circuit by the resistor Reu, Rfu, the resistor Rfv side of the bleeder circuit by the resistor Rev, Rfv, and the resistor Rfw side of the bleeder circuit by the resistor Rew, Rfw.

Voltage between U phase divided voltage Ua and the imaginary neutral point voltage E0 is divided at the bleeder circuit by the resistor Rew, Rfw, becomes a waveform whose amplitude of U phase divided voltage Ua is reduced as U phase voltage waveform in [Terminal voltage partial voltage waveform] in FIG. 2 and input to the negative terminal, namely, − terminal of the comparator CPw.

Voltage between V phase divided voltage Va and the imaginary neutral point voltage E0 is divided at the bleeder circuit by the resistor Reu, Rfu, becomes a waveform whose amplitude of V phase divided voltage Va is reduced as V phase voltage waveform in [Terminal voltage partial voltage waveform] in FIG. 2 and input to the negative terminal, namely, − terminal of the comparator CPu.

Voltage between W phase divided voltage Va and the imaginary neutral point voltage E0 is divided at the bleeder circuit by the resistor Rev, Rfv, becomes a waveform whose amplitude of W phase divided voltage Wa is reduced as W phase voltage waveform in [Terminal voltage partial voltage waveform] in FIG. 2 and input to the negative terminal, namely, − terminal of the comparator CPu.

In other words, in respective comparator CPu, CPv, CPw, respective comparison voltage EVs, EWs, EUs input to the − terminal is a comparison voltage made based on the later phase in order, in respect of U, V, W phase divided voltage Ua, Va, Wa input to the + terminal.

Concerning the comparison detection state in respective comparator CPu, CPv, CPw, for instance, taking an example of comparison detection state in the comparator CPu, namely, U phase position detection comparator CPu, as [U phase position detection comparator positive negative terminal input voltage (overwrite)] in FIG. 2, the intersection P of the large amplitude U phase divided voltage Ua input to the + terminal and the small amplitude comparison voltage EVs input to the − terminal is detected, and as [U phase position detection comparator negative terminal input voltage] in FIG. 2, [U phase rising position detection point] and [U phase falling position detection point] are output as position detection signal Su1, Su2. The comparison detection state in the comparator CPv, CPw of the other phase is the waveform state wherein the waveform of [U phase position detection comparator positive negative terminal input voltage (overwrite)] in FIG. 2 is shifted by a phase of 120 degrees respectively.

In this detection, the microcomputer 5 takes as position detection signal Su1 the signal obtained by detecting, first, Low to High rising edge or the output of the U phase position detection comparator CPu, when the time has elapsed for the spike voltage in the previous conduction pattern ends, and changes over to the conduction by the conduction pattern from the next transistor TrU to the transistor TrY when the time for the rotor 3R rotates by a certain angle has elapsed.

During the conduction from the transistor TrU to the transistor TrY, as an induction voltage in the falling direction is generated by the rotation of the rotor 3R, at the W phase terminal T not conducted, this induction voltage is divided and input to the positive terminal of the W phase position detection comparator CPw. On the other hand, the input voltage to the negative terminal of the W phase position detection comparator CPw is the comparison voltage Eus obtained by dividing the U phase divided voltage Ua and imaginary neutral point voltage E0 with the resistor Rew and resistor Rfw.

Here, supposing:

Ra=Rau=Rav=Raw, Rb=Rbu=Rbv=Rbw respective resistance value for respective partial voltage generates, normally, the imaginary neutral point voltage E0 as [Rb/(Ra+Rb)]=[2Rd/(Rc+Rd)].

Then, the microcomputer 5 takes as position detection signal (not illustrated) the signal obtained by detecting, first, High to Low falling edge by the W phase position detection comparator CPw, when the time has elapsed for the spike voltage in the conduction pattern from the previous transistor TrU to the transistor TrY ends, and changes over to the conduction by the conduction pattern from the next transistor Tru to the transistor TrZ when the time for the rotor 3R rotates by a certain angle has elapsed.

Similarly, during the conduction from the transistor TrU to the transistor TrZ, the conduction is changed over from the transistor TrV to the transistor TrZ by the position detection signal (not illustrated) detecting the rising edge of the output of the V phase comparator CPv, and during the conduction from the transistor TrV to the transistor TrZ, the conduction is changed over from the transistor TrV to the transistor TrZ by the position detection signal Su2 detecting the falling edge of the output of the U phase comparator CPv.

During the conduction from the transistor TrV to the transistor TrX, the conduction is changed over from the transistor TrW to the transistor TrX by the position detection signal (not illustrated) detecting the rising edge of the output of the W phase comparator CPW, and during the conduction from the transistor TrW to the transistor TrX, it is operated to change over the conduction from the transistor TrW to the transistor TrY by the position detection signal (not illustrated) detecting the falling edge of the output of the V phase comparator CPv.

Thus, the microcomputer 5 drives the inverter circuit 2 to keep the rotor 3R rotating, by obtaining the position information of the rotor 3R, based on the output waveform of respective comparator CPu, CPv and CPw.

Here, suppose the imaginary neutral point voltage E0 be Vrd, V phase divided voltage Va VRbv, and respective resistance value Re>>Rb and Re>>Rd, Rf>>Rb and Rf>>Rd, the input voltage Evs of the negative terminal of the U phase position detection comparator CPu has the following relation:

$$Evs = [(VRbv - VRd)Rf / (Re + Rf)] + VRd$$

$$= (VRbv \cdot Rf + VRd \cdot Re) / (Re + Rf)$$

Consequently, a comparison voltage Evs having a voltage which is the voltage VRd of the imaginary neutral point voltage E0 shifted by the V phase voltage is generated at the negative terminal of the U phase position detection comparator CPu; therefore, the position detection timing shall be:

[U phase position detection comparator negative terminal input voltage]<[Imaginary neutral point voltage Vdr)]

during the rising of the induction voltage, and

[U phase position detection comparator negative terminal input voltage]>[Imaginary neutral point voltage Vdr)]

during the falling of the induction voltage,
and the position detection signal Su1 obtained by the intersection of the portion of induction voltage of the U phase divided voltage Ua and the comparison voltage Evs shall be position at the time point shifted forward than the intersection of the portion of induction voltage of the U phase divided voltage Ua and the imaginary neutral point voltage E0.

Figure 13:
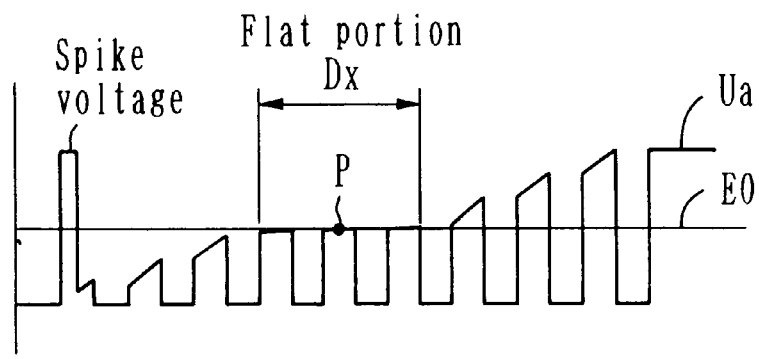
FIG. 13 is a essential part operation waveform diagram of the prior art.
Figure 14:
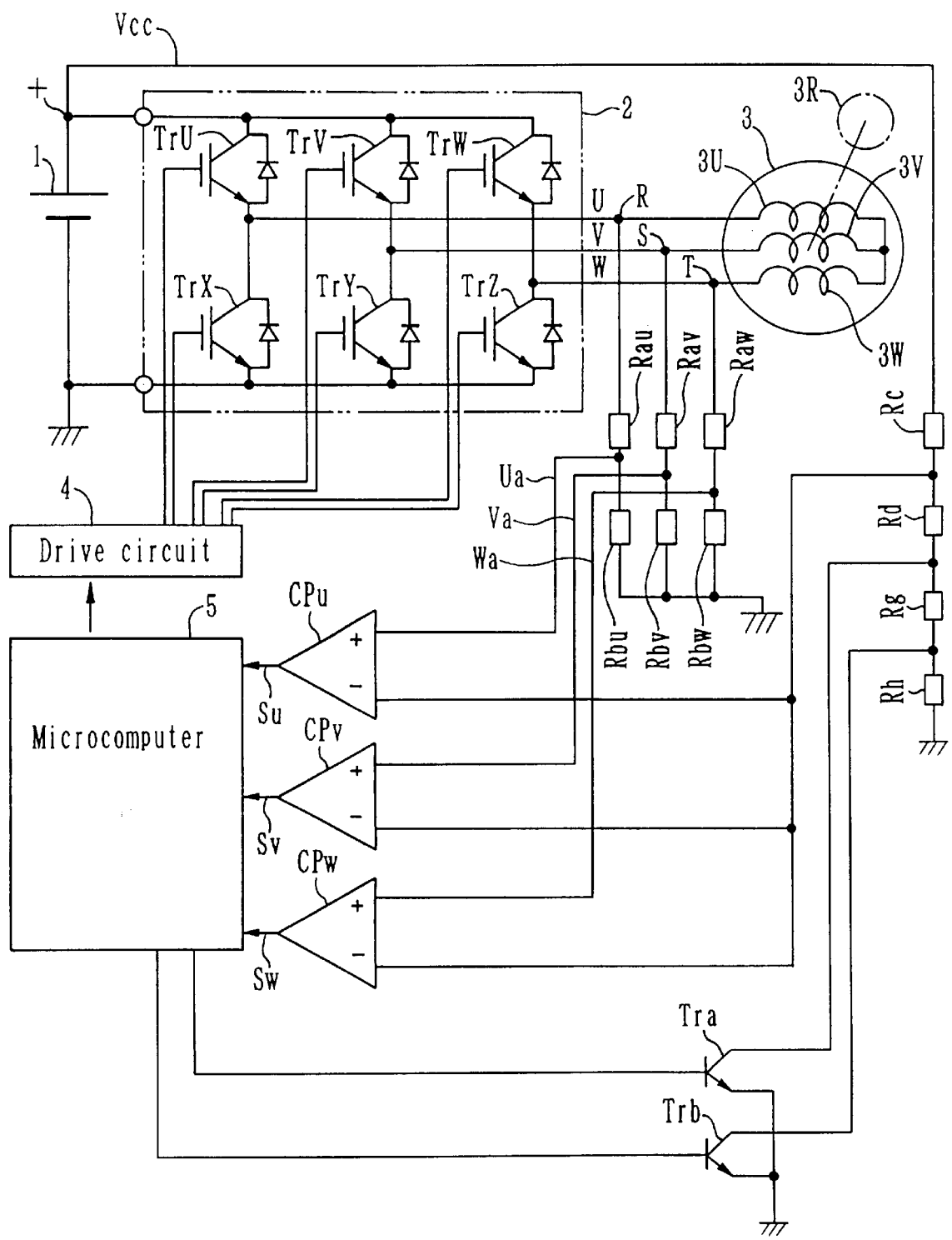
FIG. 14 is a whole block composition diagram of the prior art.

A secured position detection is made possible, as the position detection point, namely, [U phase rising position detection point] is positioned at a point having a slant before becoming the flat portion Dx, as [Forward detection] in FIG. 3, event when the waveform of the induction voltage comes to have a flat portion Dx becoming flat in the vicinity of the zero cross point P, as in said FIG. 13.

In the description above, it was set to create the voltage Vdr of the imaginary neutral point voltage E0, supposing the partial voltage rate by the resistor Rc and resistor Rd be:

[Rb/(Ra+Rb)]=[2Rd/(Rc+Rd)]

however, it is also possible to shift the displacement amount of the intersection during the rising and falling induction voltage by changing this partial voltage rate.

In this case, normally, it is necessary to change the time from the position detection to the conduction changeover for rising and falling of the induction voltage, by a software of the microcomputer 5, namely by the control processing.

SECOND EXAMPLE

Figure 4:
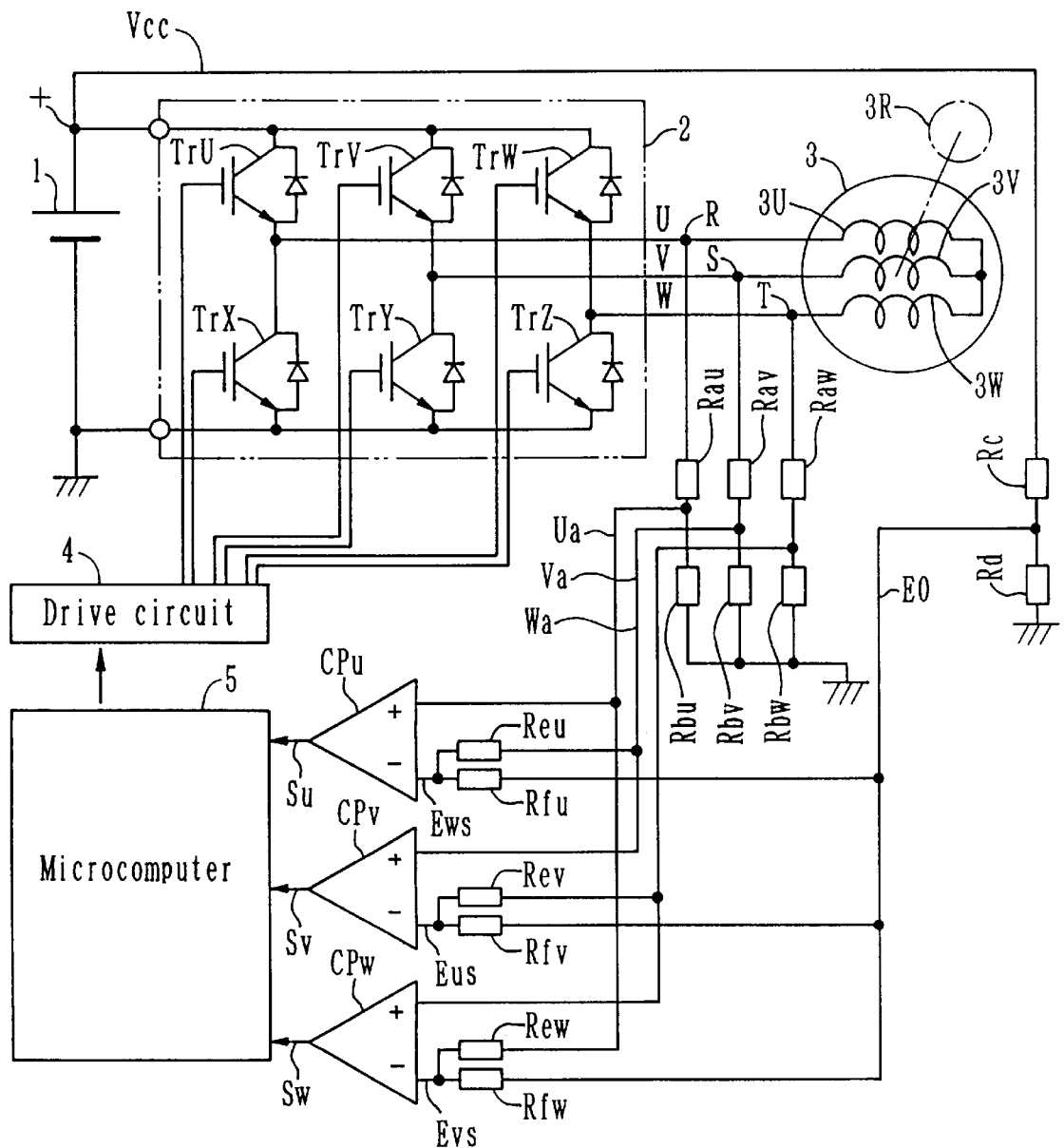
FIG. 4 is a whole block composition diagram of the present invention.
Figure 5:
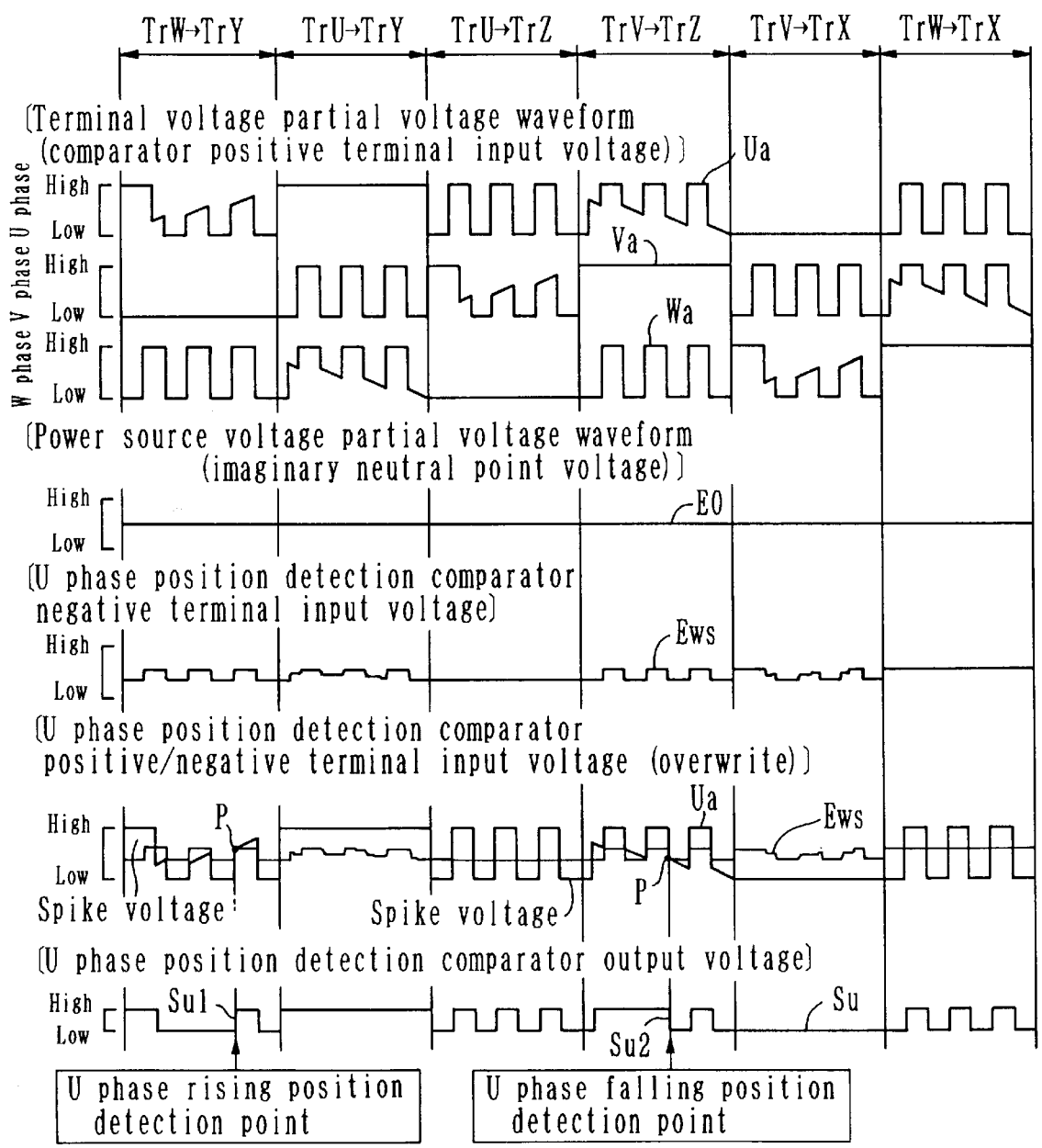
FIG. 5 is a essential part operation waveform diagram of the present invention.

Now a second example shall be described referring to FIG. 4, FIG. 5. The composition of this second example composes said first composition and third composition. The composition of this second example is different from the composition of the first example of FIG. 1 in that, the voltage supplied to the resistor Reu is changed to the W phase divided voltage Wa, the voltage supplied to the resistor Rev is changed to the U phase divided voltage Ua, and the voltage supplied to the resistor Rew is changed to the V phase divided voltage Va.

Consequently, respective comparison voltage Eus, Evs, Ews input to the negative terminal side of respective comparator CPu, CPv, CPw are all changed to the comparison voltage obtained based on the phase preceding in the order, in respect of in respect of the phase of respective U phase divided voltage Ua, V phase divided voltage Va, W phase divided voltage Wa input to the positive terminal.

Therefore, concerning the comparison detection state in respective comparator CPu, CPv, CPw, for instance, taking an example of comparison detection state in the comparator CPu, namely, U phase position detection comparator CPu, as [U phase position detection comparator positive negative terminal input voltage (overwrite)] in FIG. 5, the comparison voltage EWs input to the negative terminal has a waveform wherein the amplitude of the W phase divided voltage Wa is reduced, and the comparison state, as [U phase position detection comparator positive negative terminal input voltage (overwrite)] in FIG. 5, the intersection of the U phase divided voltage Ua of large amplitude input to the + terminal and the comparison voltage EWs having small amplitude input to the − terminal, and [U phase rising position detection point] and [U phase falling position detection point] are output as position detection signal Su1, Su2. The comparison detection state in the comparator CPv, CPw of the other phase is the waveform state wherein the waveform of [U phase position detection comparator positive negative terminal input voltage (overwrite)] in FIG. 5 is shifted by a phase of 120 degrees respectively.

Here, suppose the imaginary neutral point voltage E0 be Vrd, W00 phase divided voltage Wa VRbw, and respective resistance value Re>>Rb and Re>>Rd, Rf>>Rb and Rf>>Rd, the input voltage Ews of the negative terminal of the U phase position detection comparator CPu has the following relation:

$$Ews = [(VRbw - VRd)Rf/(Re + Rf)] + VRd$$
$$= (VRbw \cdot Rf + VRd \cdot Re)/(Re + Rf)$$

Consequently, a comparison voltage Ews having a voltage which is the voltage VRd of the imaginary neutral point voltage E0 shifted by the W phase voltage is generated at the negative terminal of the U phase position detection comparator CPu; therefore, the position detection timing shall be:

[U phase position detection comparator negative terminal input voltage]>[N neutral point voltage Vdr)]

during the rising of the induction voltage, and

[U phase position detection comparator negative terminal input voltage]<[Neutral point voltage Vdr)]

during the falling of the induction voltage, and the position detection signal Su1 obtained by the intersection of the portion of induction voltage of the U phase divided voltage Ua and the comparison voltage Ews shall be position at the time point shifted forward than the intersection of the portion of induction voltage of the U phase divided voltage Ua and the imaginary neutral point voltage E0.

A secured position detection is made possible, as the position detection point, namely, [U phase rising position detection point] is positioned at a point having a slant before becoming the flat portion Dx, as [Forward detection] in FIG. 3, event when the waveform of the induction voltage comes to have a flat portion Dx becoming flat in the vicinity of the zero cross point P, as in said FIG. 13.

THIRD EXAMPLE

Figure 6:
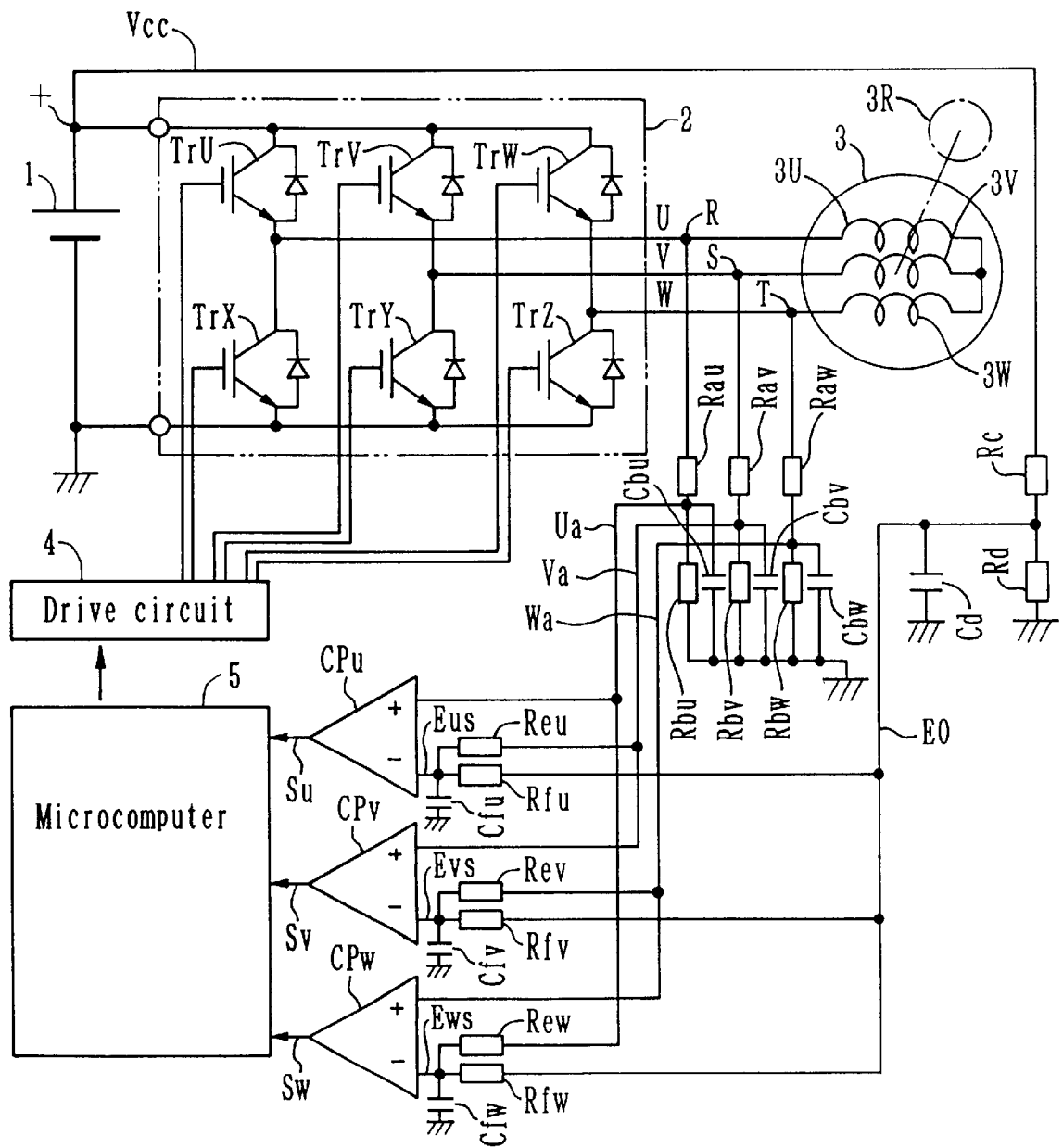
FIG. 6 is a whole block composition diagram of the present invention.

Now a third example shall be described referring to FIG. 1, FIG. 4, FIG. 6. The composition of this third embodiment is different from the composition of said first example and second example in that a condenser is provided for absorbing noise component of the voltage input to respective comparator CPu, CPv, CPw, and attenuating the waveform.

In the composition of FIG. 4, the input voltage to the positive terminal and the input voltage to the negative terminal of respective comparator CPu, CPv, CPw may overlap during the switching of respective transistor TrU~TrZ, and the output voltage of respective comparator CPu, CPv, CPw may possibly become unstable and provoke malfunction; therefore, an accurate position detection signal Su, Sv, Sw can be obtained by disposing, at least, at the point of input voltage of the positive terminal of respective comparator CPu, CPv, CPw, and absorbing noise and attenuating the waveform of the switching point of the pulse voltage. Also, in the composition of FIG. 1 and FIG. 6,, an accurate position detection signal Su, Sv, Sw can be obtained by disposing a similar condenser, and absorbing noise.

In FIG. 6, a condenser Cbu is connected in parallel with the resistor Rbu, a condenser Cbw is connected in parallel with the resistor Rbw, and a condenser Cbw is connected in parallel with the resistor Rbw, and in addition, a condenser Cfu is connected between the negative terminal of the comparator CPu and the ground, namely the earth, a condenser Cfv is connected between the negative terminal of the comparator CPv and the ground, and a condenser Cfw is connected between the negative terminal of the comparator CPw and the ground, and further, a condenser Cd is connected in parallel to the resistor Rd.

Here, normally, the capacitance value of respective condenser is set as follows:

Cb=Cbu=Cbv=Cbw

Cf=Cfu=Cfv=Cfw

And, at least, the provision of condenser Cb can prevent malfunction due to noise. Though, in the composition of FIG. 6, all condensers Cb, Cf, Cd are connected; however, if the noise is not particularly big, condenser Cd, or condenser Cd, Cf may be omitted.

[Variant Embodiment]

The present invention includes also the following variants.

Figure 7:
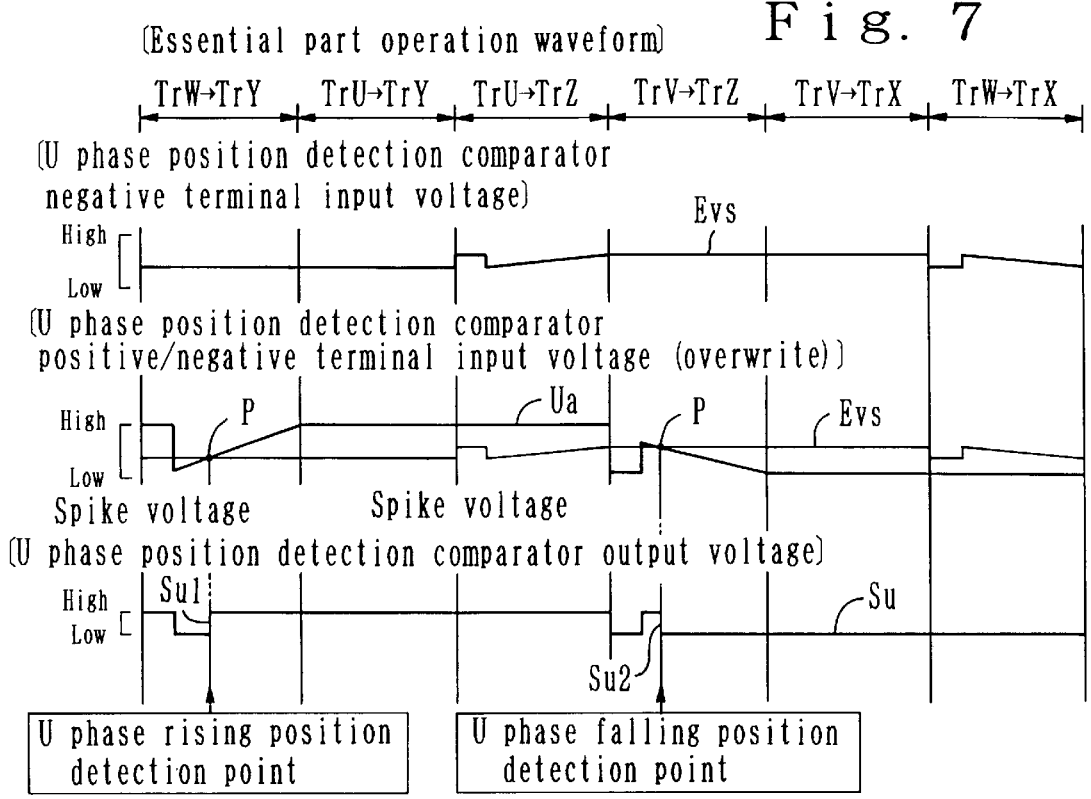
FIG. 7 is a essential part operation waveform diagram of the present invention.
Figure 15:
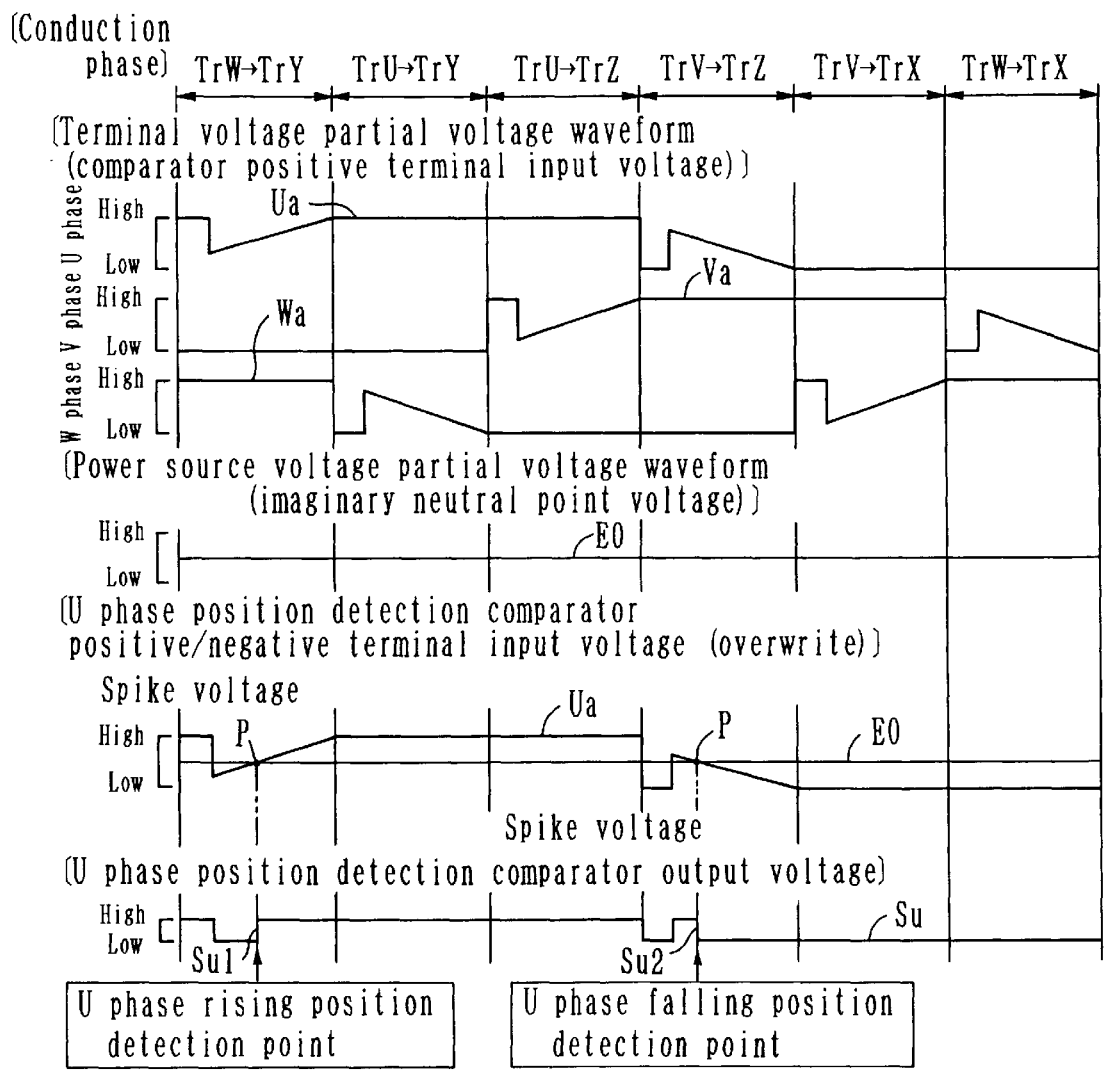
FIG. 15 is a essential part operation waveform diagram of the prior art.
Figure 16:
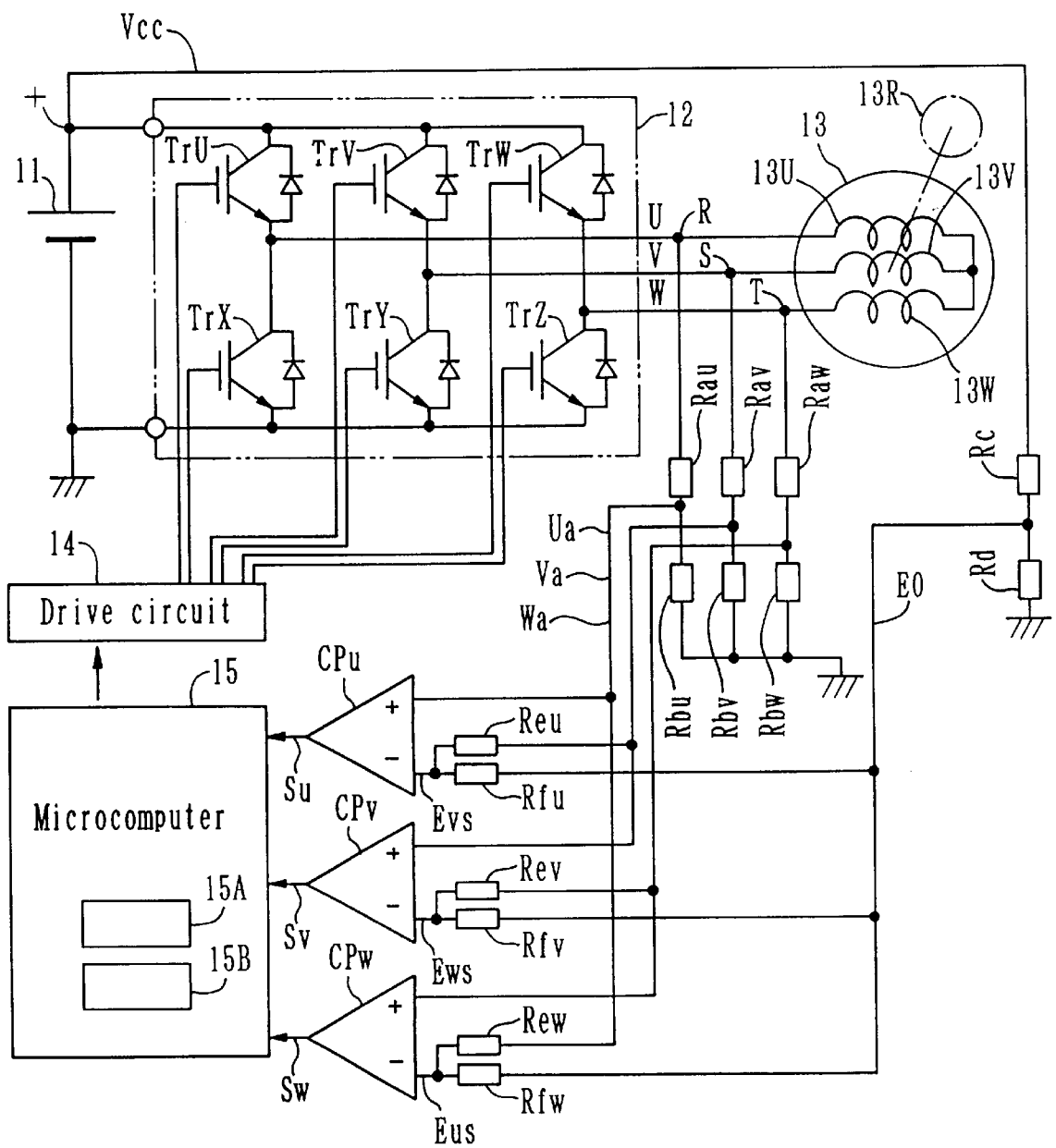
FIG. 16 is a whole block composition diagram of the present invention.

(1) Modification to obtain the position detection signal by, for instance, respective waveform as in FIG. 7, by composing through the application of the composition of said first example and third example to the no chopping composition like as said FIG. 15.

Figure 8:
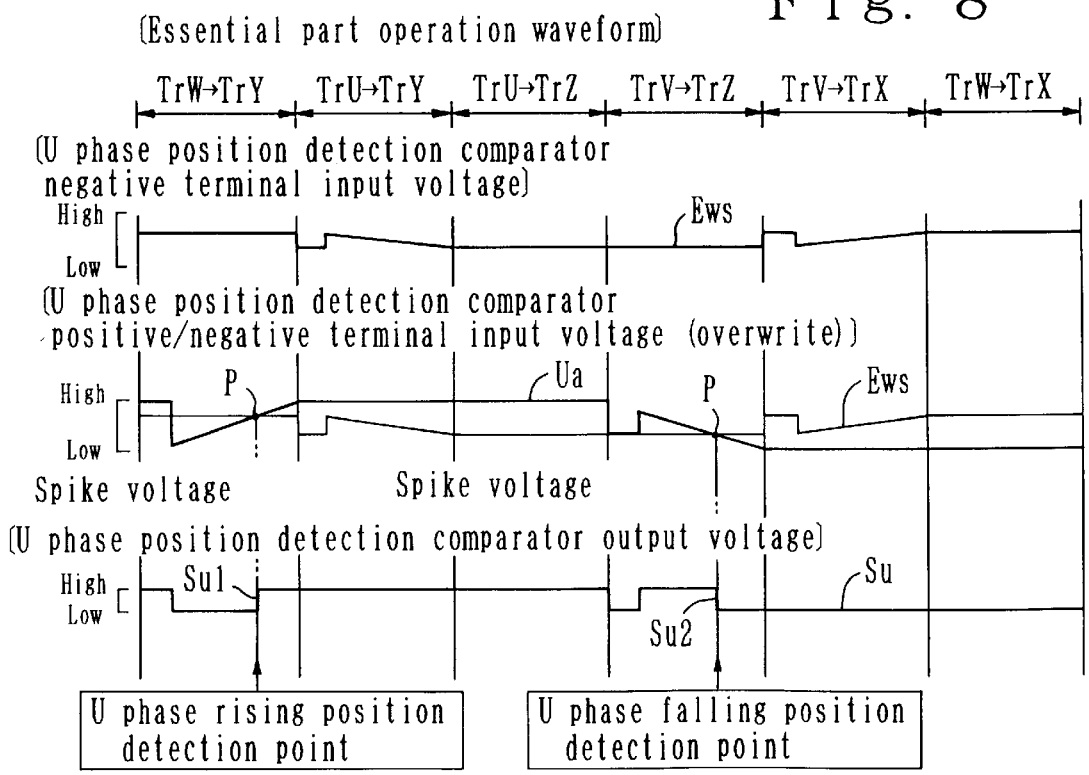
FIG. 8 is a essential part operation waveform diagram of the present invention.
Figure 9:
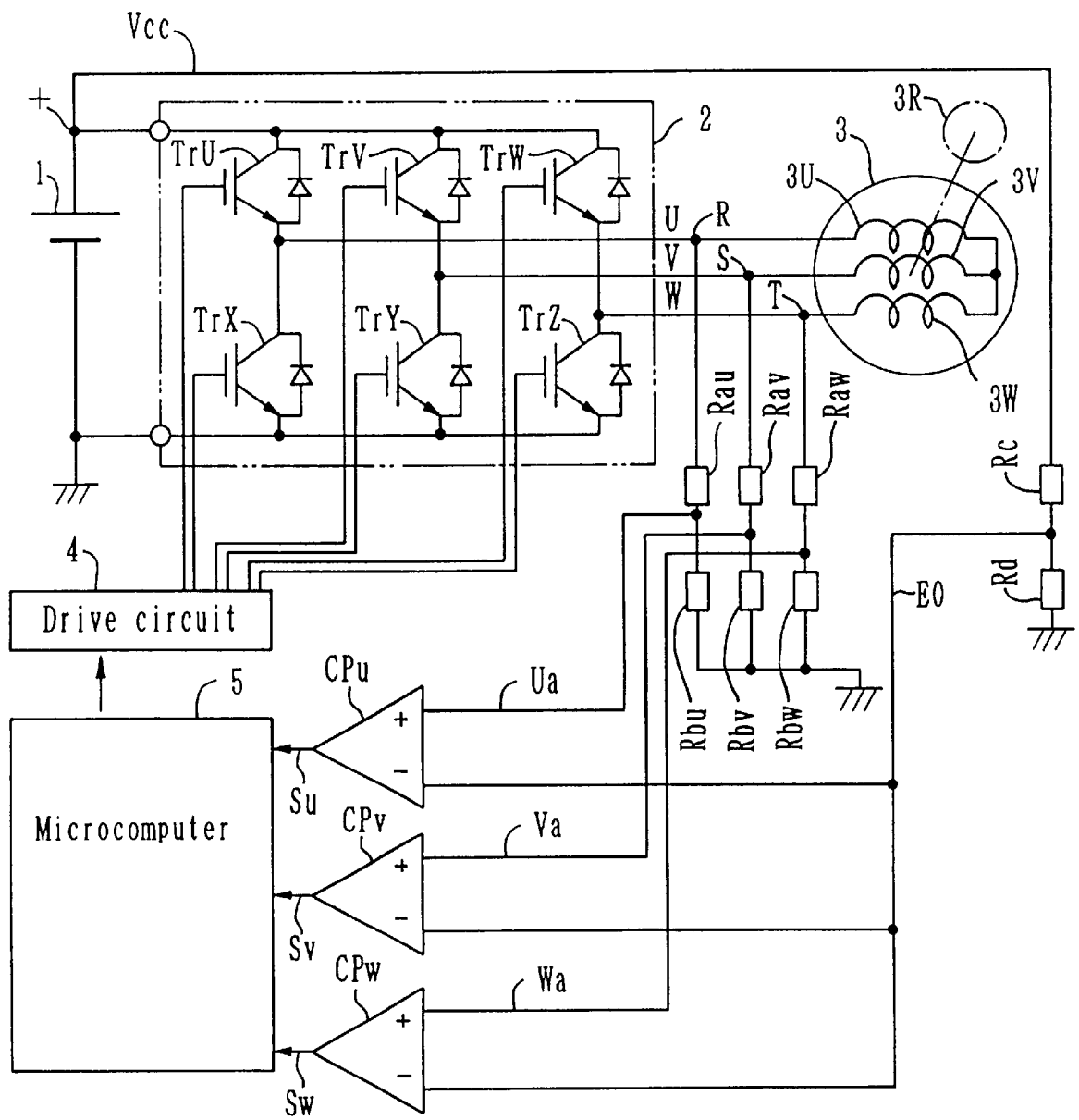
FIG. 9 is a whole block composition diagram of a prior art.
Figure 10:
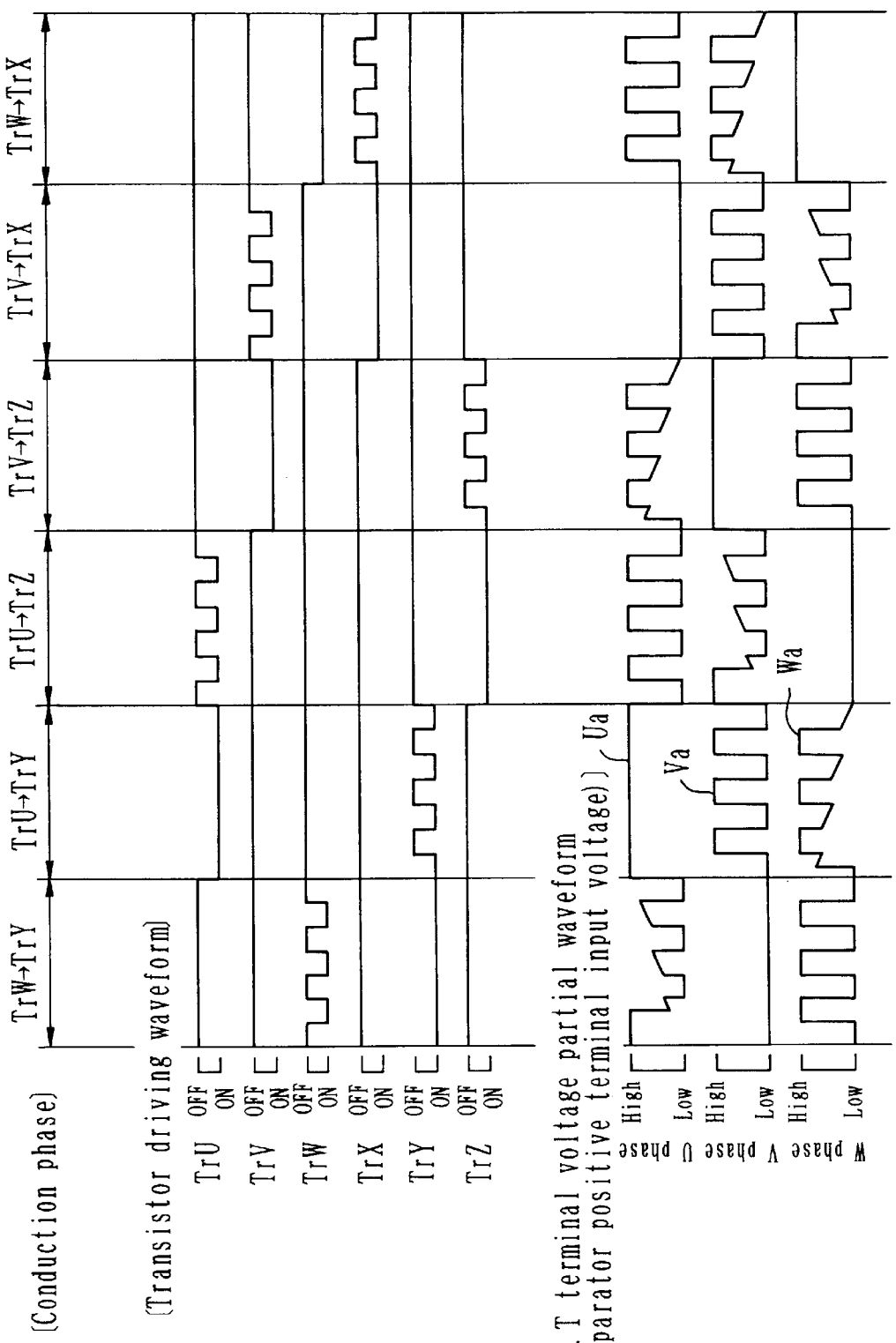
FIG. 10 is a essential part operation waveform diagram of the prior art.
Figure 11:
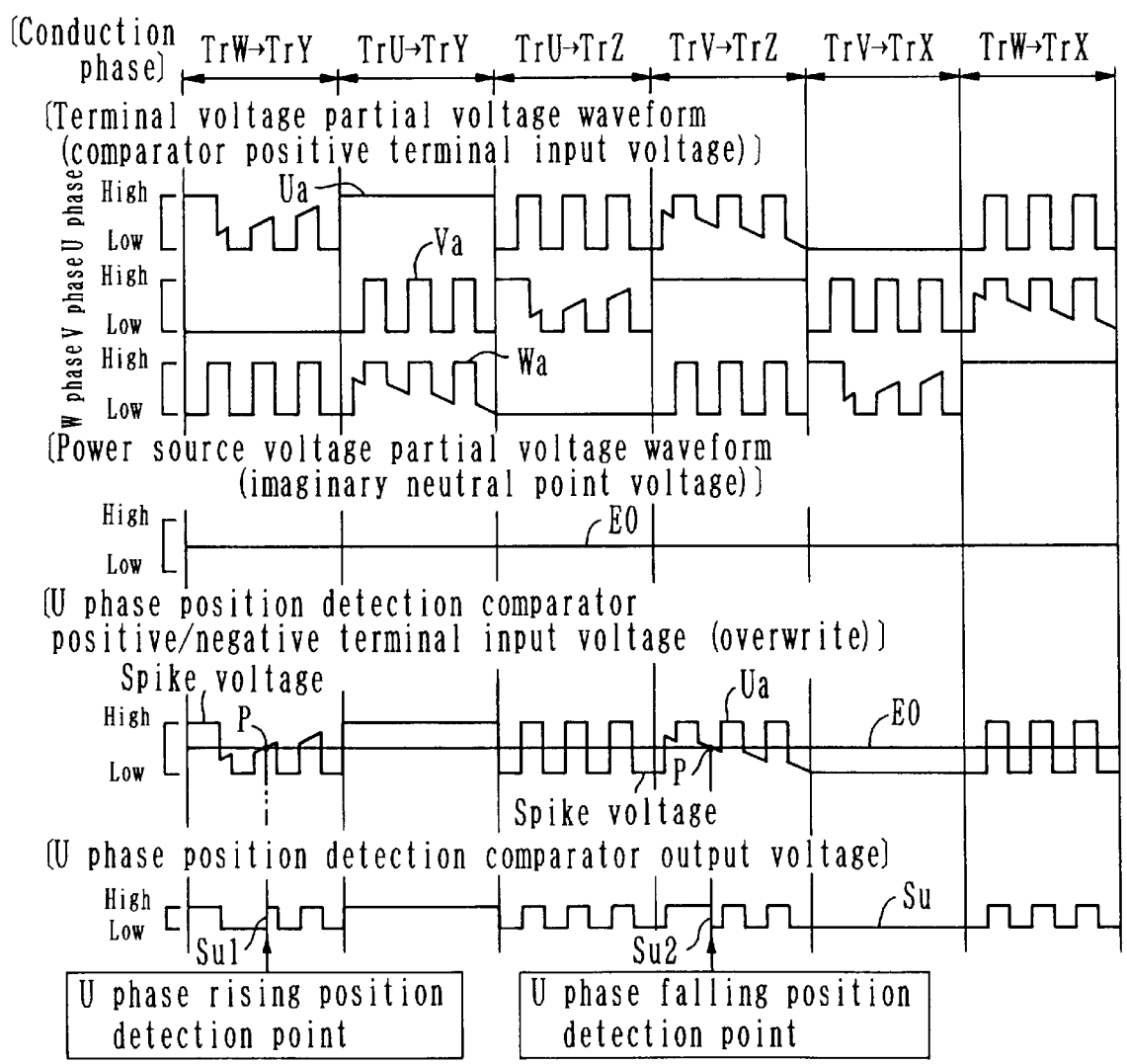
FIG. 11 is a essential part operation waveform diagram of the prior art.
Figure 12:
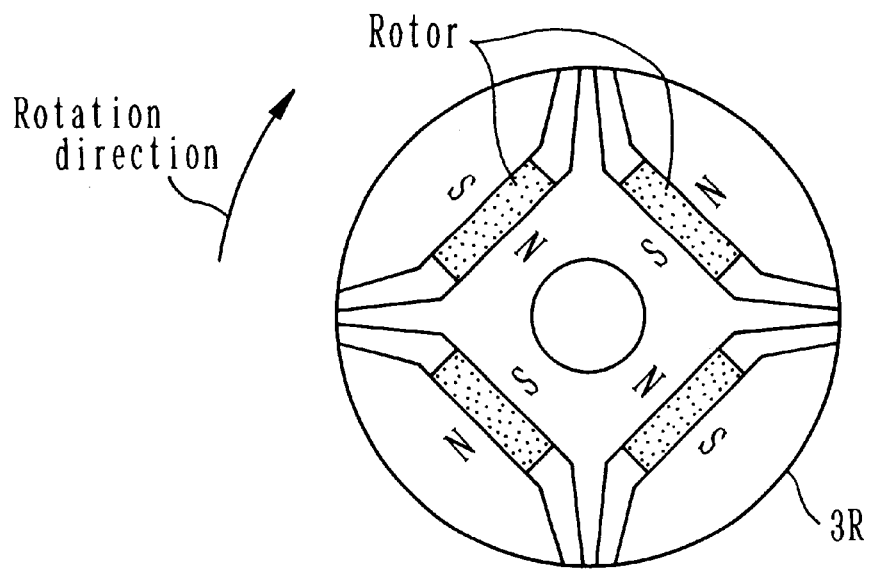
FIG. 12 is a essential part composition front view of the prior art.

(2) Modification to obtain the position detection signal by, for instance, respective waveform as in FIG. 8, by composing through the application of the composition of said second example and third example to the no chopping composition like as said FIG. 15.

According to the present invention, as mentioned above, an operation fully using the reluctance torque can be performed, because, the rotor detection position can avoid the flat portion of the induction voltage generated by the IPM type rotor or the like, only by setting the input to the positive terminal and the negative terminal of the comparator to a voltage based on different phases obtained only by the resistance bleeder circuit, and as the effect, the apparatus of simple, cheap and maintenance easy composition can be supplied, because wrong detection due to noise is prevented only by adding a condenser.

Figure 21:
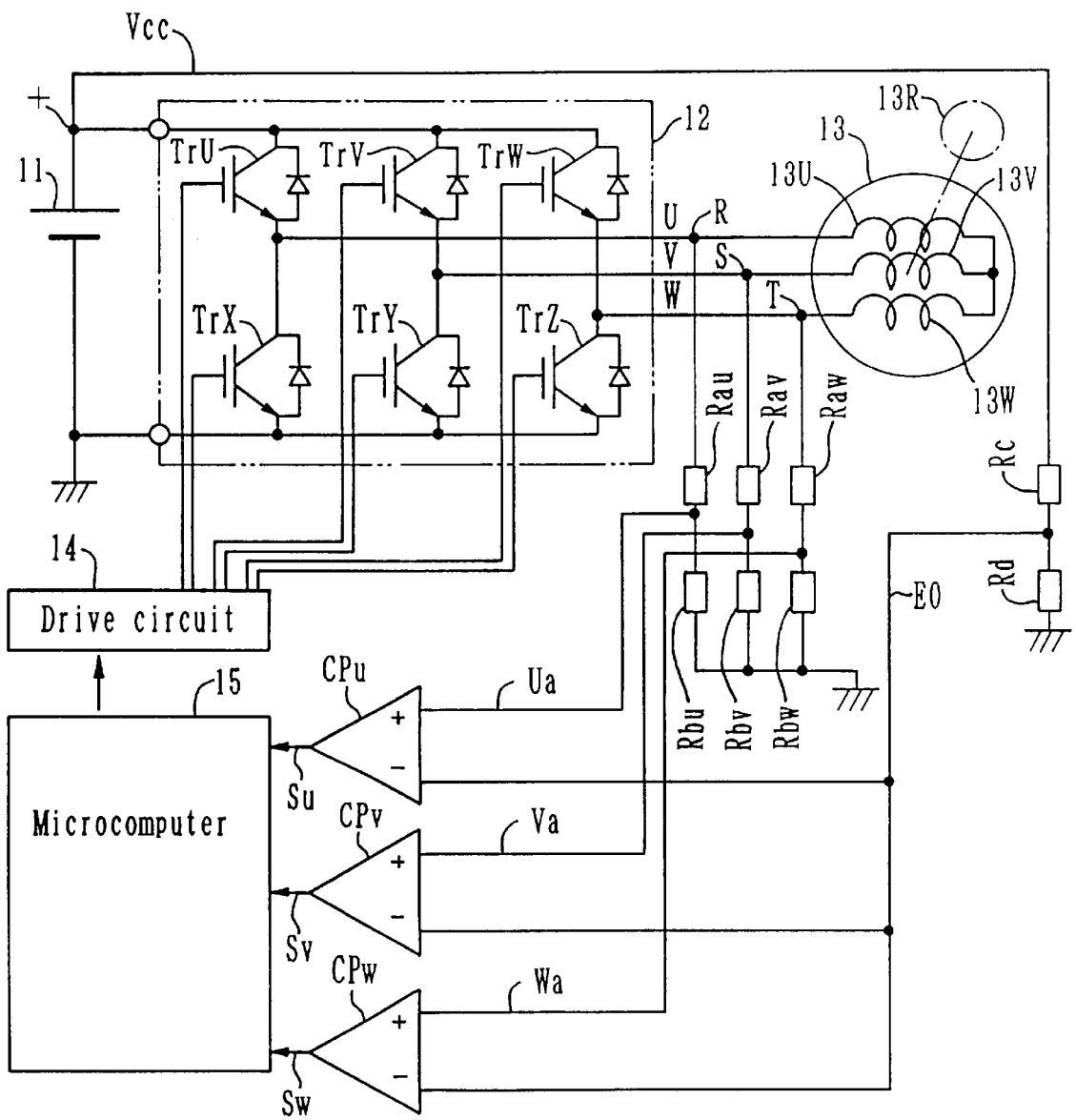
FIG. 21 is a whole block composition diagram of the prior art.
Figure 22:
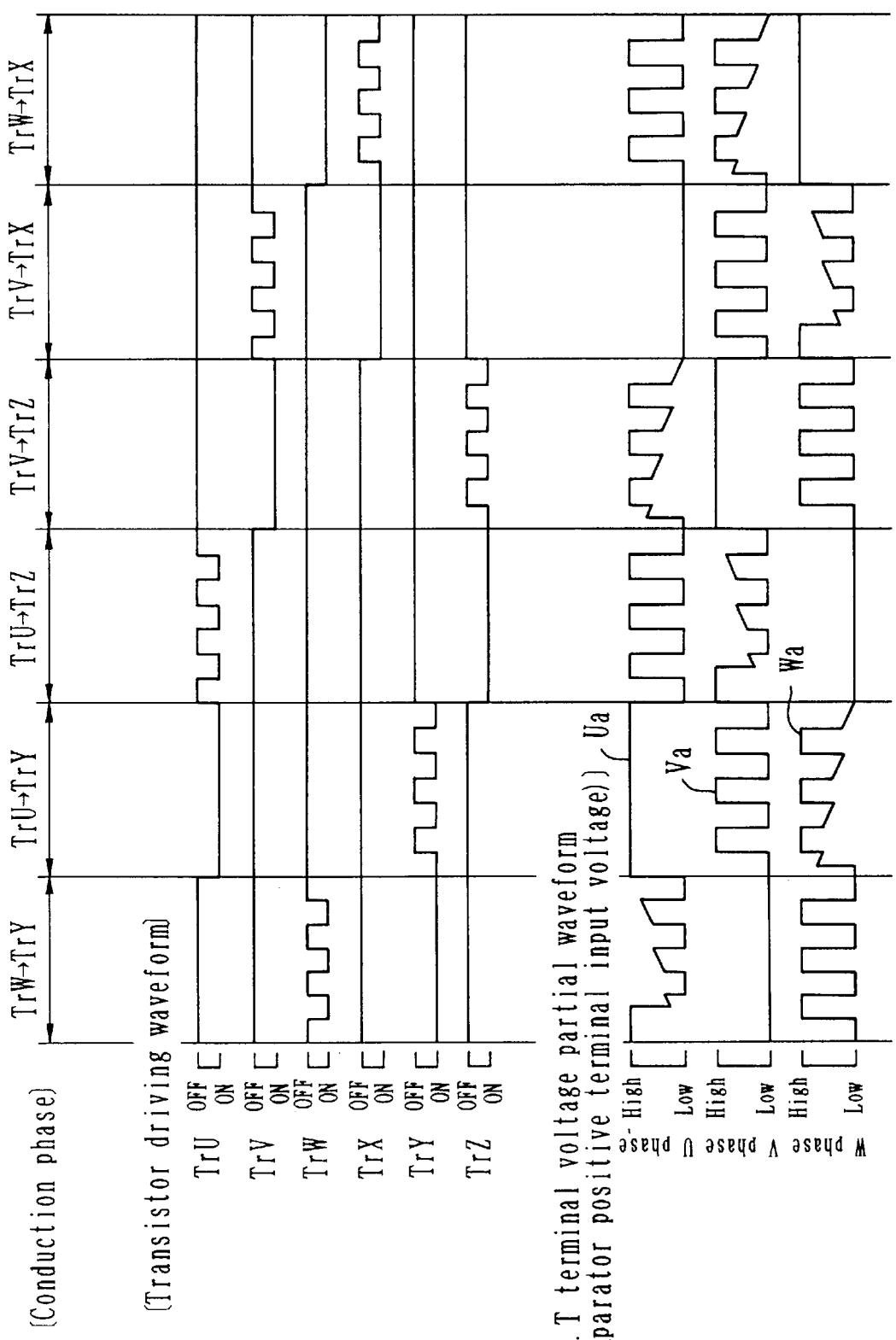
FIG. 22 is a essential part operation waveform diagram of the prior art.

Moreover, as another embodiment of the present invention, examples wherein the present invention is applied to the composition of the prior art of said FIG. 21~FIG. 20, shall be described referring to FIG. 16~FIG. 20. In FIG. 16~FIG. 21, those portions having the same symbol as the symbol of said FIG. 21~FIG. 24 are portions having the same function as those portions having the same symbol in FIG. 21~FIG. 24. Moreover, those portions having the same symbol in FIG. 16~FIG. 20 are portions having the same function as those portions having the same symbol described in any one of FIG. 16~FIG. 20.

FOURTH EXAMPLE

Now a fourth example shall be described referring to FIG. 16~FIG. 20. This fourth embodiment, on the whole, composes said fifth composition and eighth composition and is different from the composition of the prior art of FIG. 21~FIG. 24 in that a control processing flow program for performing a control processing that will be described in FIG. 17, FIG. 18 is previously memorized in a processing memory 15A of the microcomputer 15 of FIG. 15, and reference value or other data necessary for the control processing, for example, data of respective value of FIG. 18 is previously memorized in a data memory 15B of the microcomputer 15 of FIG. 16.

Figure 23:
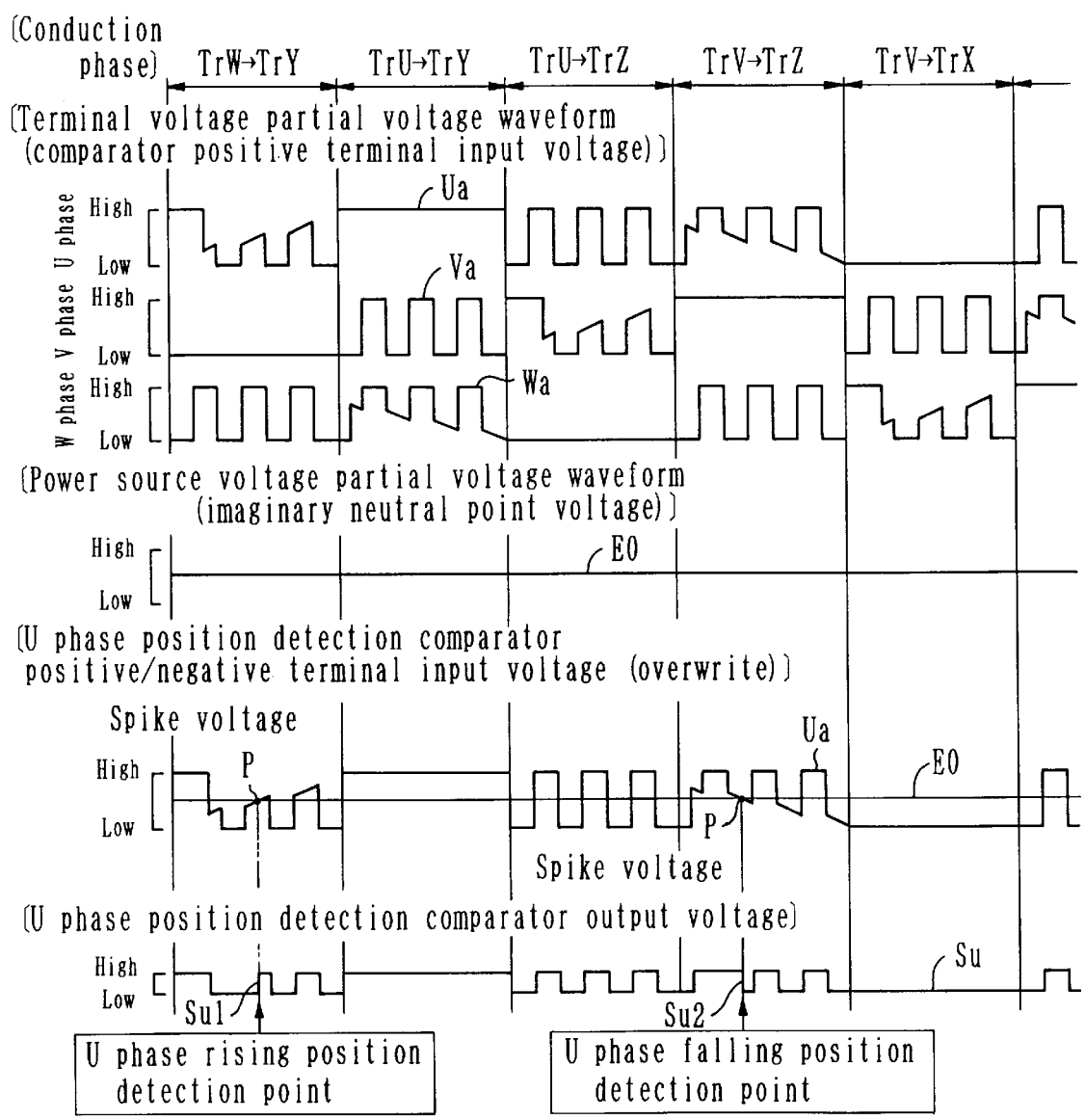
FIG. 23 is a essential part operation waveform diagram of the prior art.
Figure 24:
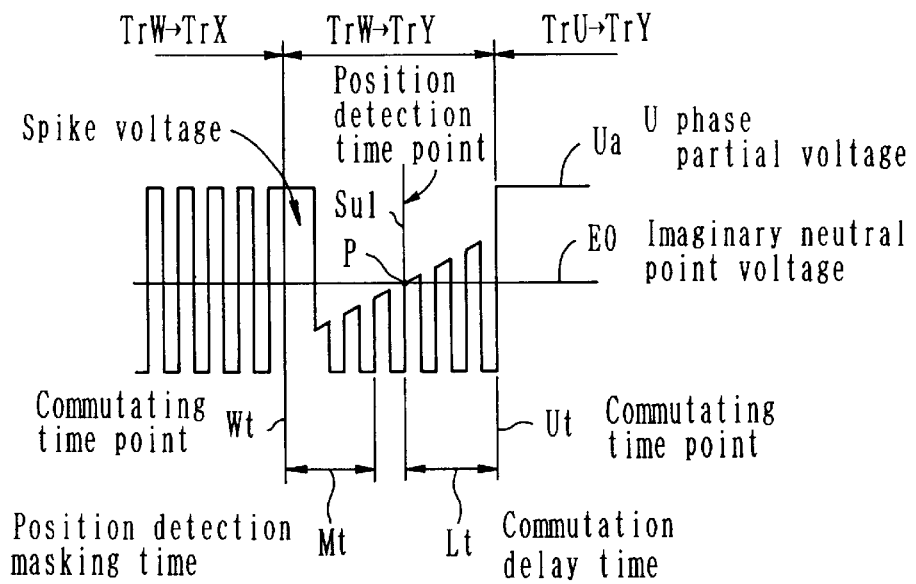
FIG. 24 is a essential part operation waveform diagram of the prior art.

The position detection portion in the stationary operation state of the inverter circuit 12, namely, during the follow-up rotation of the rotor 13R synchronized with the rotational magnetic field by the driving of the inverter circuit 12 based on the position detection signal Su~Sw, appears as [Normal operation state] of FIG. 17, for instance, similarly to FIG. 24, taking example of the point of the zone of "TrW→TrY" "TrUu→TrY" of FIG. 23, however, when the rotation of the rotor 13R is not followed up immediately after the beginning of the start-up of the inverter circuit 12, the position detection portion appears like as [Start-up operation state] of FIG. 17.

[Normal operation state] of FIG. 17, similarly to FIG. 24, corresponds to the position detection portion of [U phase rising position detection point] in [U phase position detection comparator positive, negative terminal input voltage] in FIG. 23, the position detection signal Su1 is obtained by detecting the intersection P after a predetermined position detection masking time Mt has elapsed from the preceding conversion time point Wt, namely, zero cross point, and the time point after a conversion delay time Lt has elapsed from the time point of this position detection signal Su1 is taken as the next conversion time point Ut.

And in [Normal operation state] of FIG. 17, normally, the induction voltage appearing on the stator coil 13U is small because, immediately after the beginning of the start-up of the inverter circuit 12, the rotation direction of the rotor 13R is unstable, and in addition, the rotation speed is low. Consequently, the induction voltage waveform may sometimes like as uncertain C of the same drawing, making an accurate position detection difficult, and causing the start-up performance deterioration.

There, in the composition of this fourth example, as in [Essential part operation condition] of FIG. 18, the start-up is stabilized and it is so composed to be able to transit securely to the synchronous operation by the stationary position detection, by varying the increase/decrease of the position detection masking time Mt in response to the number of times of detection Sn of position detection signal, for example, number of times of detection Sn summing up the number of times of detection of all position detection signals Su, Sv, Sw.

To be more specific, as in FIG. 19, the position detection masking time Mt is expressed in electric time width, namely, in phase angle width, and a plurality of steps, for instance, first step Mt1, second step Mt2, third step Mt3 are set previously, and these respective steps are set to correspond to a plurality of steps of the number of times of detection Sn of position detection signal, for example, first step Sn1, second step Sn2.

Here, the number of times of detection Sn of position detection signal may composed by both ways, namely by using the integrated number of time integrating position detection signals up to that time period, and by using the number of rotations per unit time at that time point, namely, the rotation speed. In other words, in the present invention, "number of times of position detection signal" means both the case of composition using the integral number of times, and the case of composition using the rotation speed. In the description hereinafter, the case of composition using the integral number of times will be described.

Concrete values of respective data are set, for instance, in case of (3 phases×2 points)×2 paired poles, as follows:

Mt1=45°

Mt2=37.5°

Mt3=30°

Sn1=12 times (one revolution of rotor 13R)

Sn2=120 times (10 revolutions of rotor 13R)

Though [Essential part operation condition] of FIG. 18 is represented by graph to help the understanding, in practice, a table of correspondence of data values of FIG. 18 is memorized in a data memory 15B, and the control operation is performed by selecting by the control processing flow program memorized previously in a processing memory 15A. The control processing flow is as simple as distinguishing the data of the abscissa from the detection signal and outputting the data of the ordinate as control signal, so the description thereof is omitted herein.

According to this control processing, even if the number of rotation of the rotor 13R varies due to the load variation of the rotor 13R, the synchronous operation is made possible, independent of such variation, because the position detection masking time Mt is increased/decreased corresponding to this variation; therefore, for instance, if the number of rotation Sn becomes to the second step Sn2, it can be transited to the synchronous operation by the stationary position detection, stably and securely.

Moreover, in the composition of this fourth example, first, the position detection masking time Mt is controlled corresponding to the number of times Sn of position detection signal of the rotor 13R, and second, this control is performed only from the time point where the start-up of the inverter circuit 12 has begun to the time point where the rotor 13R attains a certain number of rotation, namely, until the number of times of detection of position detection signal Su1 attains a predetermined number of times.

Though, in said setting, respective step of the control of the position detection masking time Mt, for instance, first step Mt1, second step Mt2, third step Mt3 is composed to decrease gradually in response to the increase of the number of times Sn of position detection signal Su1, so that the condition Mt1>Mt2>Mt3 be satisfied, if a large pulsation or the like exists in the load of the rotor 13R after the beginning of the start-up, it may set to respond to such load variation.

Namely, when the load varies as in [Load state (1)] of FIG. 18, it may set to satisfy the condition Mt1<Mt3<Mt2, and when the load evolutes as in [Load state (2)] of FIG. 18, it may set to satisfy the condition Mt1<Mt2<Mt3.

FIFTH EXAMPLE

Now a fifth example shall be described referring to FIG. 16~FIG. 19. This fifth embodiment, on the whole, composes said sixth composition and ninth composition and is different from the composition of the fourth example mentioned above in that a control processing flow program for performing a control processing that will be described in FIG. 17, FIG. 19 is previously memorized in a processing memory 15A, and reference value or other data necessary for the control processing, for example, data of respective value of FIG. 19 is previously memorized in a data memory 15B.

There, as in FIG. 19, the start-up is stabilized and it is so composed to be able to transit securely to the synchronous operation by the stationary position detection, by varying the increase/decrease of the conversion delay time Lt in response to the number of times of detection Sn of position detection signal, for example, number of times of detection Sn summing up the number of times of detection of all position detection signals Su, Sv, Sw.

To be more specific, as in FIG. 19, the conversion delay time Lt is expressed in electric time width, namely, in phase angle width, and a plurality of steps, for instance, first step Lt1, second step Lt2, third step Lt3 are set previously, and these respective steps are set to correspond to a plurality of steps of the number of times of detection Sn of position detection signal, for example, first step Sn1, second step Sn2.

Lt1=15°
Lt2=11.25°
Lt3=7.5°

Though FIG. 19 is represented by graph to help the understanding, in practice, a table of correspondence of data values of FIG. 19 is memorized in a data memory 15B, and the control operation is performed by selecting by the control processing flow program memorized previously in a processing memory 15A. The control processing flow is as simple as distinguishing the data of the abscissa from the detection signal and outputting the data of the ordinate as control signal, similarly to said fourth example, so the description thereof is omitted herein.

According to this control processing, even if the number of rotation of the rotor 13R varies due to the load variation of the rotor 13R, independently of such variation, for instance, it can attain the second step Sn2 of which number of rotation is Sn faster than the composition of the fourth example, and transit to the synchronous operation by the stationary position detection, stably and securely, because the position detection masking time Mt is increased/decreased corresponding to this variation by the composition of said fourth example, and the conversion delay time Lt is increased/decreased corresponding to this variation by the data of FIG. 19.

Moreover, in the composition of this fifth example, in addition to the composition of said fourth example, first, the conversion delay time Lt is controlled corresponding to the number of times of position detection signal of the rotor 13R, and second, this control is performed only from the time point where the start-up of the inverter circuit 12 has begun to the time point where the rotor 13R attains a certain number of rotation, namely, until the number of times of detection of position detection signal Su1 attains a predetermined number of times.

Though, in said setting, respective step of the control of the position detection masking time Lt, for instance, first step Lt1, second step Lt2, third step Lt3 is composed to decrease gradually in response to the increase of the number of times Sn of position detection signal Su1, so that the condition Lt1>Lt2>Lt3 be satisfied, if a large pulsation or the like exists in the load of the rotor 13R after the beginning of the start-up, it may set to respond to such load variation.

Namely, when the load varies as in [Load state (1)] of FIG. 18, it may set to satisfy the condition Lt1<Lt3<Lt2, and when the load evolutes as in [Load state (2)] of FIG. 18, it may set to satisfy the condition Lt1<Lt2<Lt3.

SIXTH EXAMPLE

Now a sixth example shall be described referring to FIG. 16~FIG. 18, FIG. 20. This sixth embodiment, on the whole, composes said seventh composition and tenth composition and is different from the composition of the fourth example mentioned above in that a control processing flow program for performing a control processing that will be described in FIG. 20 is previously memorized in a processing memory 15A, and reference value or other data necessary for the control processing, for example, data of respective value of FIG. 20 is previously memorized in a data memory 15B, in addition to the composition of the fourth example.

There, as in FIG. 20, the start-up is stabilized and it is so composed to be able to transit securely to the synchronous operation by the stationary position detection, by controlling to make the increase rate ρ1 of the driving frequency Ft of the inverter circuit 12 immediately after the beginning the start-up of the inverter circuit 12 larger than the increase rate ρ2 during the stationary operation of the inverter circuit 12.

To be more specific, in FIG. 20, the driving frequency Ft of the inverter circuit 12 is set to control within the frequency variation range from the lower limit frequency Ft1~the upper limit frequency Ft3, and in terms of elapsed time, for instance, immediately after the beginning the start-up of the inverter circuit 12, as the control curbs L1, L2, L3, the driving frequency Ft is increased from the frequency 0 to a convenient frequency between the lower limit frequency Ft1~the upper limit frequency Ft3, and then shifted to the control within said frequency variation range for the stationary operation.

While, the increase rate ρ2 of the driving frequency Ft during the stationary operation is controlled by setting, the increase rate ρ1 of the driving frequency Ft immediately after the beginning the start-up of the inverter circuit 12 is controlled to set the frequency increment per unit time T1 to fb, setting fb>fa.

For example, concrete values are set as following:

Ft1=10~30 Hz

Ft3=150 MHz

ρ2=fa/T1=1 Hz/sec~2 Hz/sec

ρ1=fb/T1=ρ2×10

Though FIG. 20 is represented by graph to help the understanding, in practice, a table of correspondence of data values of FIG. 20 is memorized in a data memory 15B, and the control operation is performed by selecting by the control processing flow program memorized previously in a processing memory 15A. The control processing flow is as simple as distinguishing the data of the abscissa from the detection signal and outputting the data of the ordinate as control signal, similarly to said fourth example, so the description thereof is omitted herein.

According to this control processing, even if the number of rotation of the rotor 13R varies due to the load variation of the rotor 13R, independently of such variation, for instance, it can attain the second step Sn2 of which number of rotation is Sn faster than the composition of the first example, and transit to the synchronous operation by the stationary position detection, stably and securely, because the position detection masking time Mt is increased/decreased corresponding to this variation by the composition of said fourth example, and the increase rate of the driving frequency Ft of the inverter circuit 12 responds by the control data of FIG. 20.

Moreover, in the composition of this sixth example, in addition to the composition of said fourth example, first, the increase rate ρ1 of the driving frequency Ft of the inverter circuit 12 immediately after the beginning the start-up of the inverter circuit 12 is controlled by making it larger than the increase rate ρ2 during the stationary operation of the inverter circuit 12, and second, this control is performed only from the time point where the start-up of the inverter circuit 12 has begun to the time point where the rotor 13R attains a certain number of rotation, namely, until the number of times of detection of position detection signal Su1 attains a predetermined number of times.

SEVENTH EXAMPLE

Now a seventh example shall be described referring to FIG. 16~FIG. 20. The composition of this seventh example is composed of the combination of all compositions of said fourth example~sixth example. Therefore, this seventh example, on the whole, composes said eleventh composition.

According to the composition of this seventh example, composed to perform all control processing mentioned in said fourth example~sixth example, even if the number of rotation of the rotor 13R varies due to the load variation of the rotor 13R, independently of such variation, for instance, it can attain the second step Sn2 of which number of rotation is Sn faster than said composition of the fourth example, and transit to the synchronous operation by the stationary position detection, stably and securely, because, simultaneously, the position detection masking time Mt is increased/decreased corresponding to this variation by the composition of said fourth example, the conversion delay time Lt increases/decreases accordingly by the composition of said fifth example, and the increase rate of the driving frequency Ft of the inverter circuit 12 responds by the composition of said sixth composition.

Therefore, independently of such load variation, for instance, the driving frequency Ft can attain the driving frequency Ft1 during the stationary operation faster than said composition of the fourth example~sixth example, and transit to the synchronous operation by the stationary position detection, stably and securely

[Variant Embodiment]

(1) Composition through the application of the composition of said fourth to seventh examples to the composition of said third prior art.

(2) Composition through the application to the composition wherein the voltage of the terminal R,S,T is delivered as it is to the respective comparator CPu, CPv, CPw without dividing, when the voltage of the power source section 1 is low.

According to the present invention, even if the number of rotation of the rotor varies due to the load variation of the rotor, independently of such variation, it can transit to the stationary operation, stably, securely and rapidly, because, the control processing operation from the beginning of start-up to the stationary operation of the inverter circuit is performed by one of, or the combination of a plurality of, the position detection masking time Mt increased/decreased corresponding to this variation, the conversion delay time increased/decreased accordingly, and the response by the increase rate of the driving frequency Ft of the inverter circuit 2.

Moreover, an apparatus of simple and cheep composition can be supplied, because the composition having these function can be composed only by adding control processing functions by microcomputer.

Moreover, as another embodiment of the present invention, examples wherein the present invention is applied to the composition of said prior art shall be described referring to FIG. 26~FIG. 29. In FIG. 26~FIG. 29, those portions having the same symbol as the symbol of said FIG. 30~FIG. 33 are portions having the same function as those portions having the same symbol in FIG. 30~FIG. 33. Moreover, those portions having the same symbol in FIG. 26~FIG. 29 are portions having the same function as those portions having the same symbol described in any one of FIG. 26~FIG. 29.

EIGHTH EXAMPLE

Figure 25:
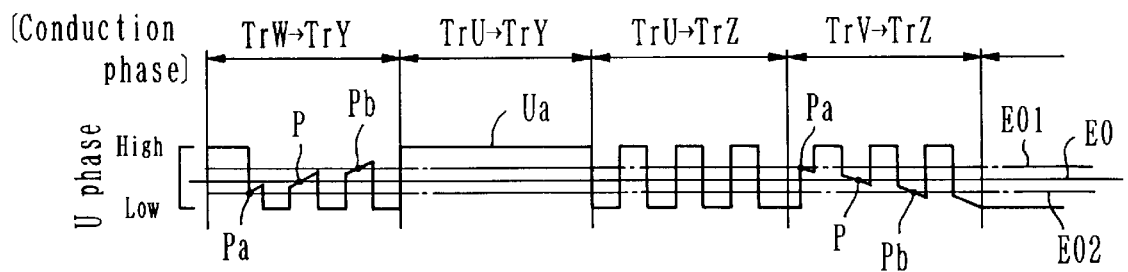
FIG. 25 is a essential part operation waveform diagram of the prior art.
Figure 26:
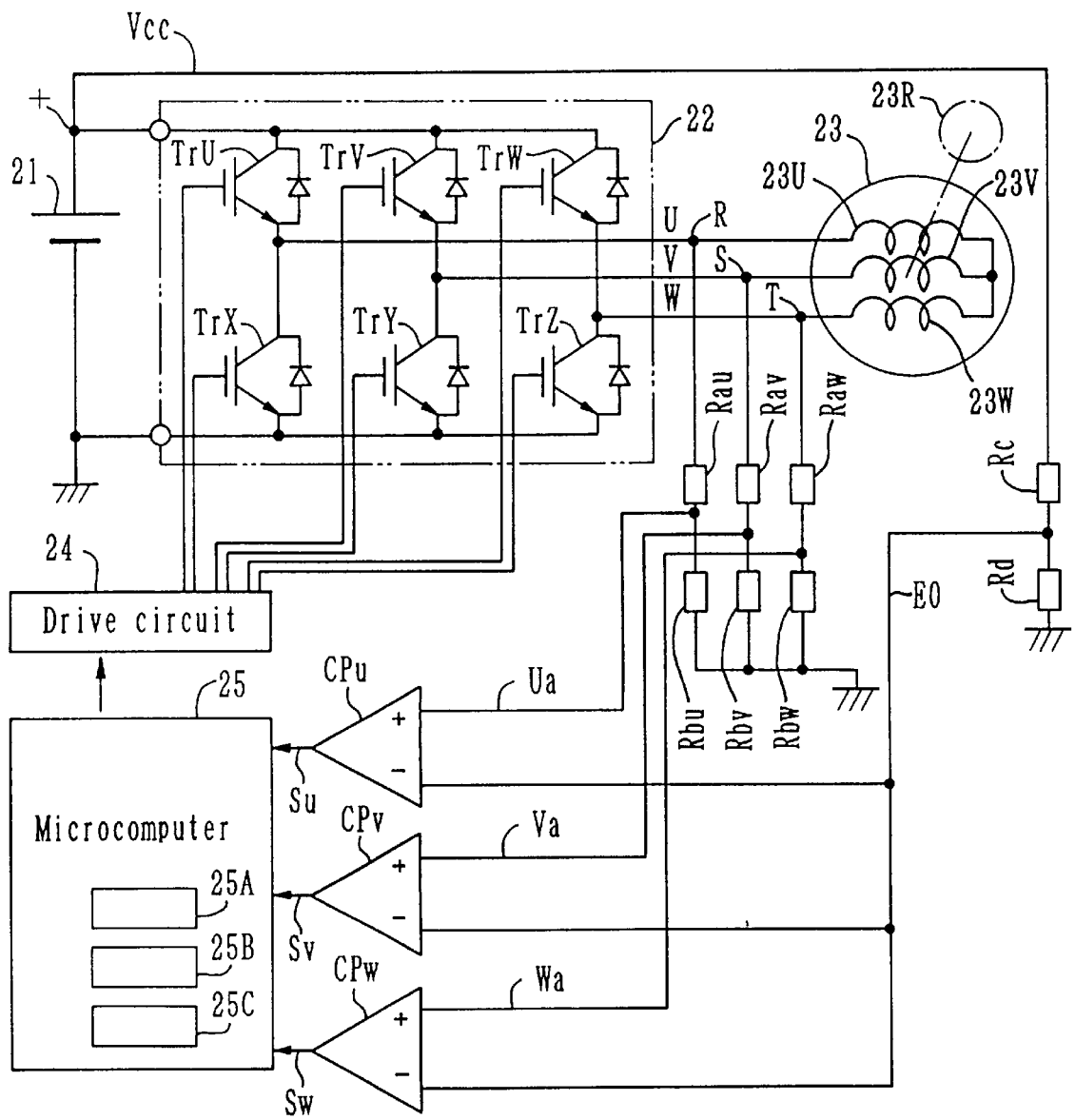
FIG. 26 is a whole block composition diagram of the present invention.
Figure 27:
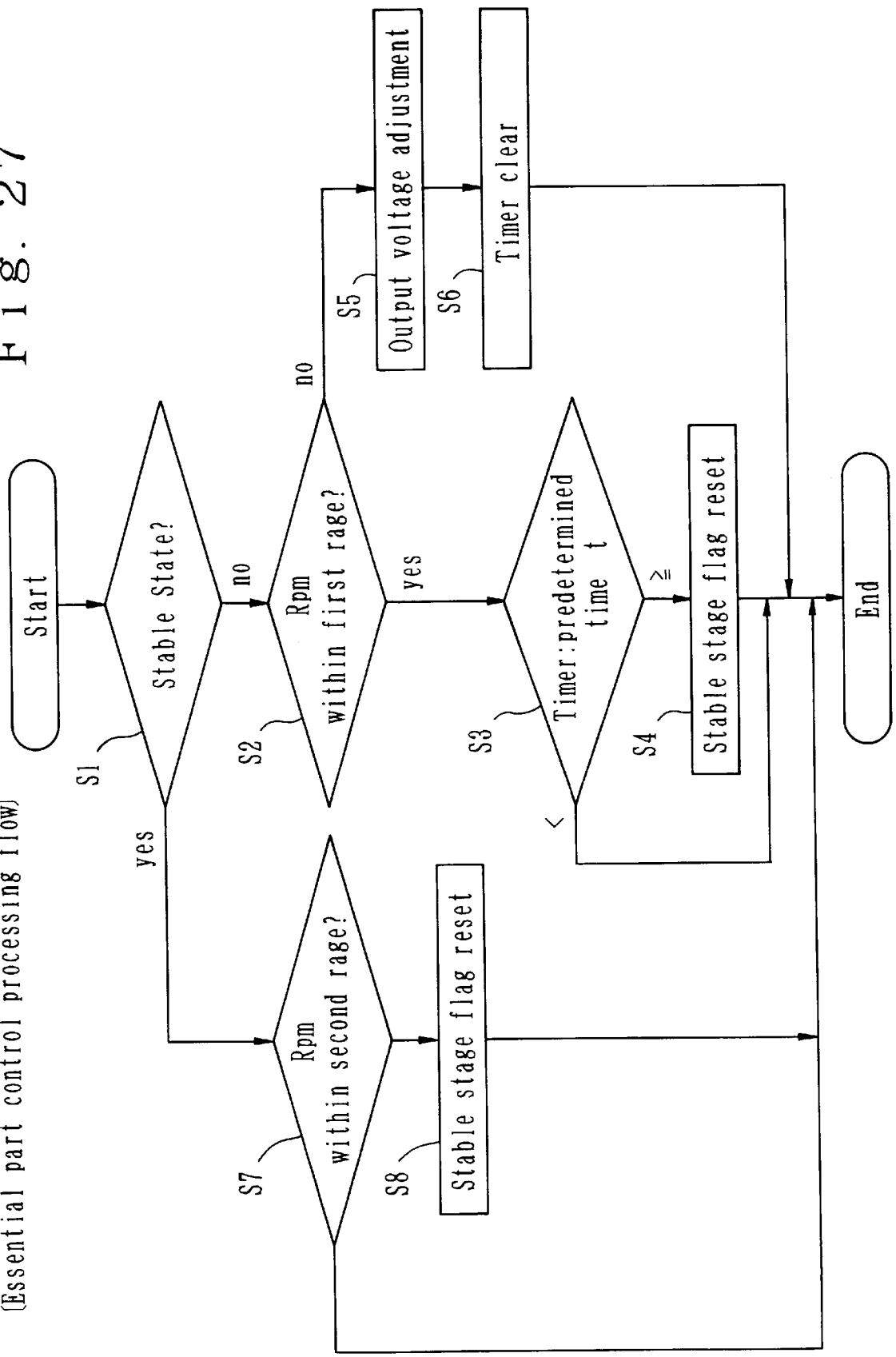
FIG. 27 is a essential part control processing flow chart of the present invention.
Figure 28:
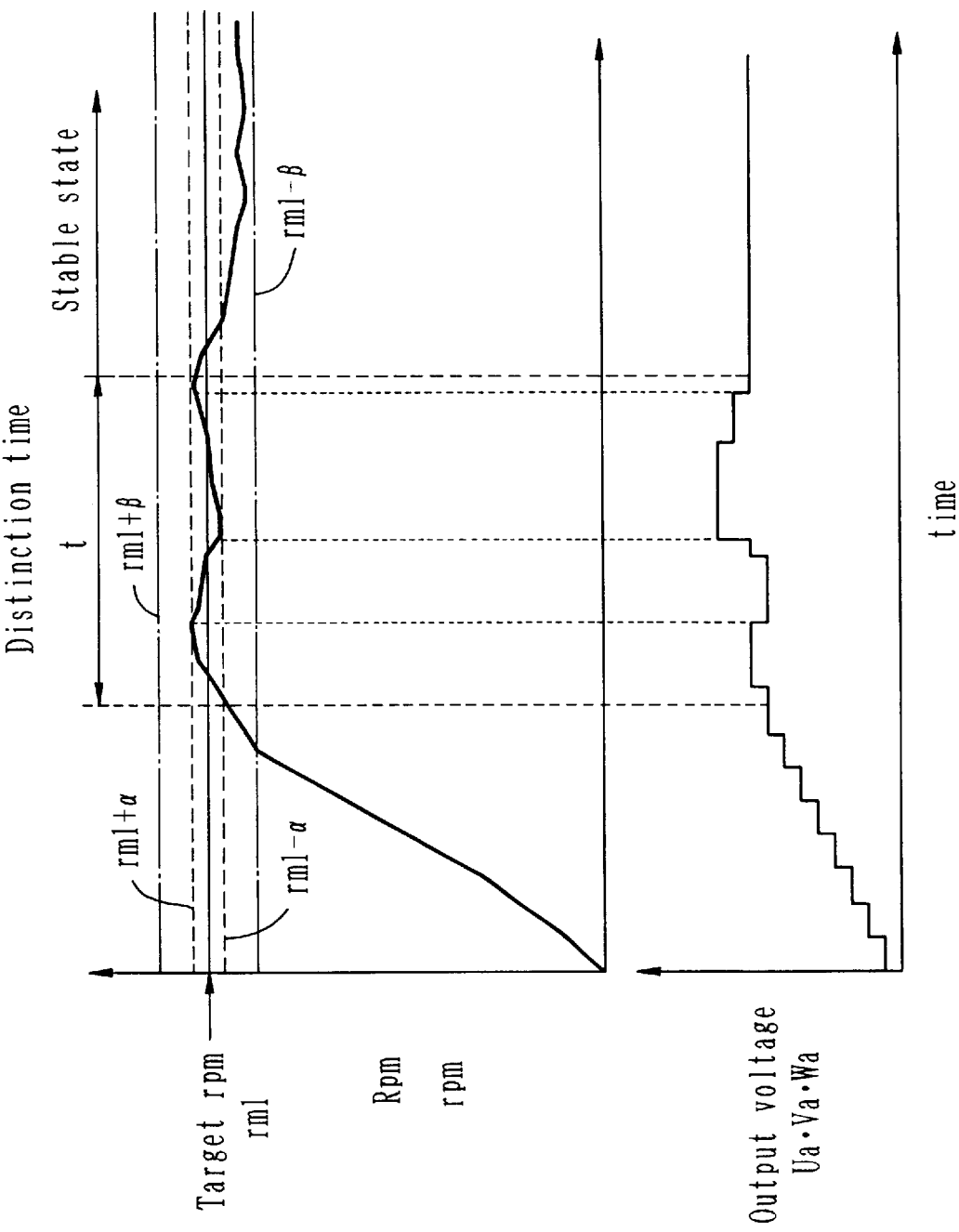
FIG. 28 is a essential part control processing state diagram of the present invention.

Now an eighth example shall be described referring to FIG. 26~FIG. 28. This eighth example, on the whole, composes said twelfth composition and, as shown in FIG. 25, a control processing flow program of FIG. 27, and reference data necessary for the control processing are previously memorized in a processing memory 15A and in a data memory 15B of the microcomputer 25, the following control processing is performed obtaining necessary clock date from the clock circuit 25C provided in the microcomputer 25, and further, data obtained by the processing is memorized in the data memory 25B to be used as reference data thereafter. It goes without saying that the composition may be modified to a discrete circuit composition for the portion where the control processing can be assured by a fixed-form type control processing.

Now the control processing operation according to the control processing flow of FIG. 27 shall be described. In to the control processing flow of FIG. 27, it is composed to transit to the start of this control processing flow for every predetermined time, for instance, stationary control cycle T1, from the main control processing flow for performing the control processing of the entire apparatus, and the end of this control processing flow is the one composed to transit to a predetermined step point of the main control processing flow to execute the next operation at that end time point. Here, the cycle T1 is set, for instance, to 10 msec to 1 sec.

In this control processing, as in FIG. 28, the data memory 25B memorizes as processing data, a first tolerance range rm1+/−α, with the tolerated upper limit rm1+α and tolerated lower limit rm1−α, for the target number of rotation rm1, and a second tolerance range rm1+/−β larger that this tolerance range rm1+/−α, with the tolerated upper limit rm1+β and tolerated lower limit rm1−β, for the target number of rotation rm1.

[Description of Control Processing Flow]

The step S1 of FIG. 27 distinguishes is there is a "flag" indicating the stable state memorized in the step S3 mentioned below, and if there is the "flag", it shifts to the step S7 and if there is not, shifts to the next step S2.

In the step S2, the number of rotation rpm based on the position detection signal Su1~Sw1 is calculated, and it is distinguished if it within the first tolerance range rm1+/−α, and if it is within the range, it shifts to the next step S3, and if it is not, shifts to the step S4.

The step S3 distinguishes if it has shifted to this step in the past and it is set to the state making the clock circuit timer to start to count the time, distinguishes if the time lapse by the set timer is a predetermined t, for instance, 10 times of the stationary cycle T1, namely 100 m~10 sec, and if the timer is not set, it sets the timer, and then, shifts to the "End", namely, a predetermined step point of the control processing flow.

Besides, if the elapsed time of the set timer is equal or superior to the predetermined time 5, it shifts to the next step S4 and, if not, as it is, shifts to the "End", namely, a predetermined step point of the control processing flow. This predetermined time t is a distinction time for distinguishing if it is or not the stable state requiring little output voltage adjustment for the output voltage, namely, modification of chopping frequency fm or duty rate du.

Figure 29:
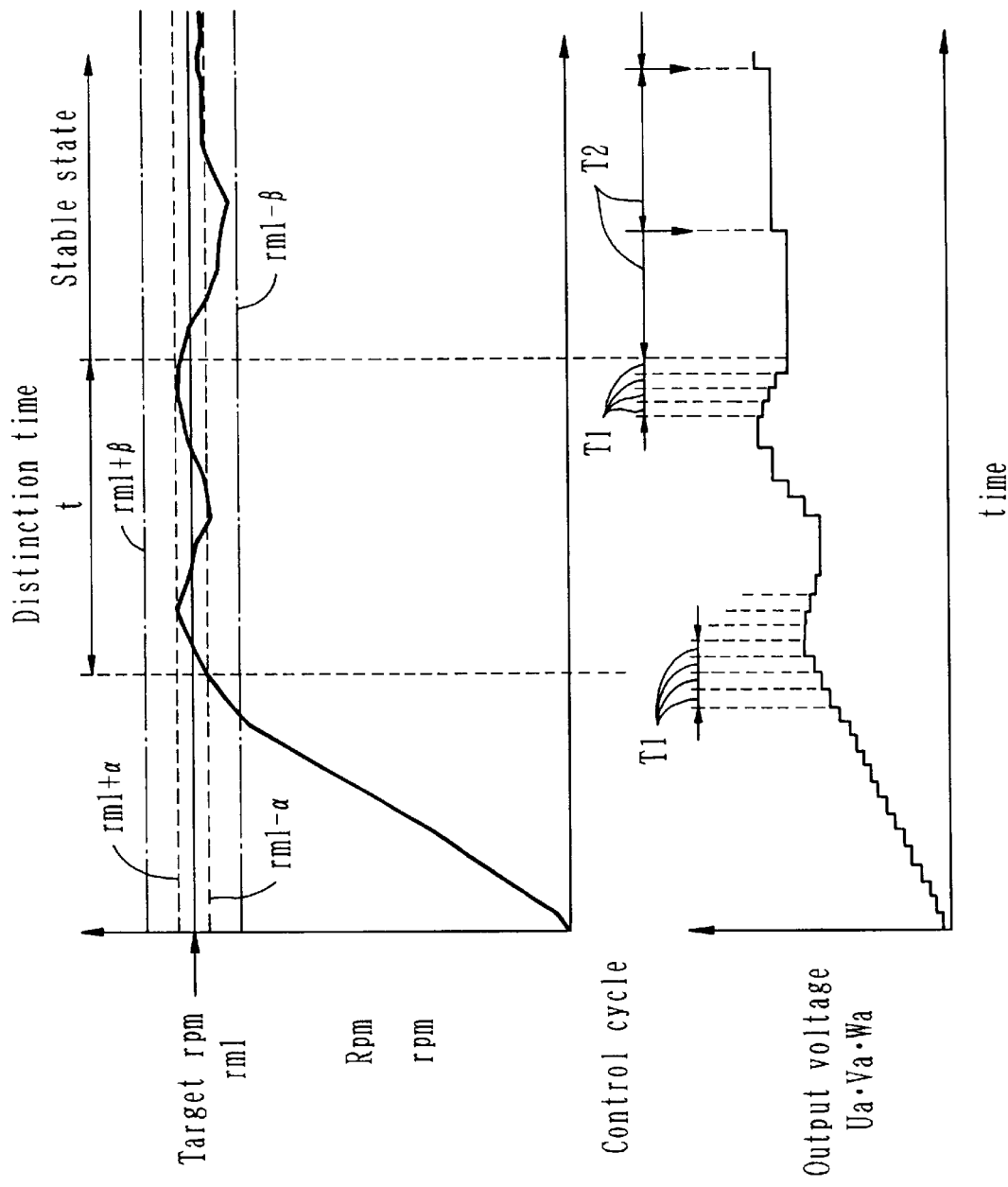
FIG. 29 is a essential part control processing state diagram of the present invention.
Figure 30:
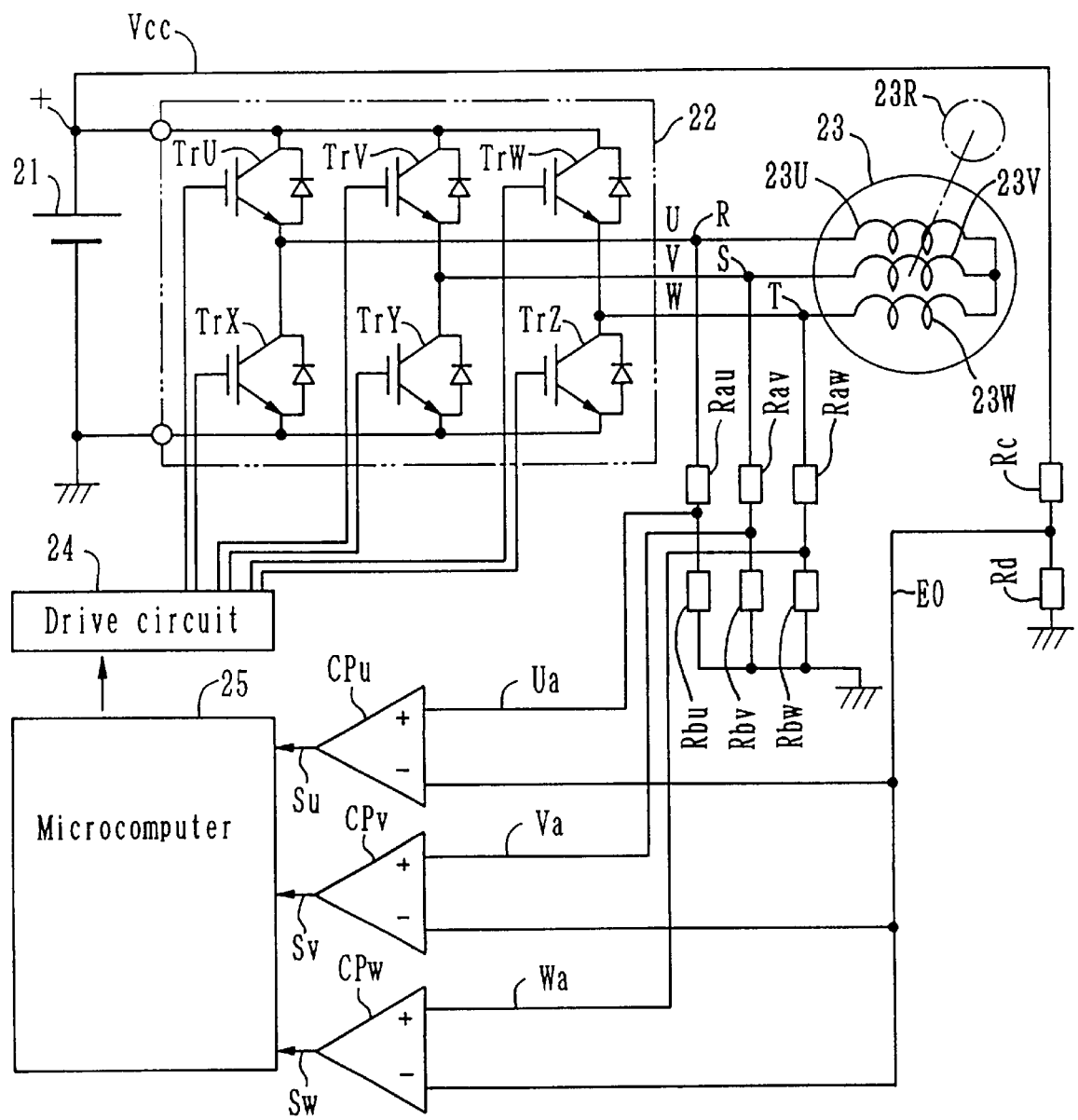
FIG. 30 is a whole block composition diagram of the prior art.
Figure 31:
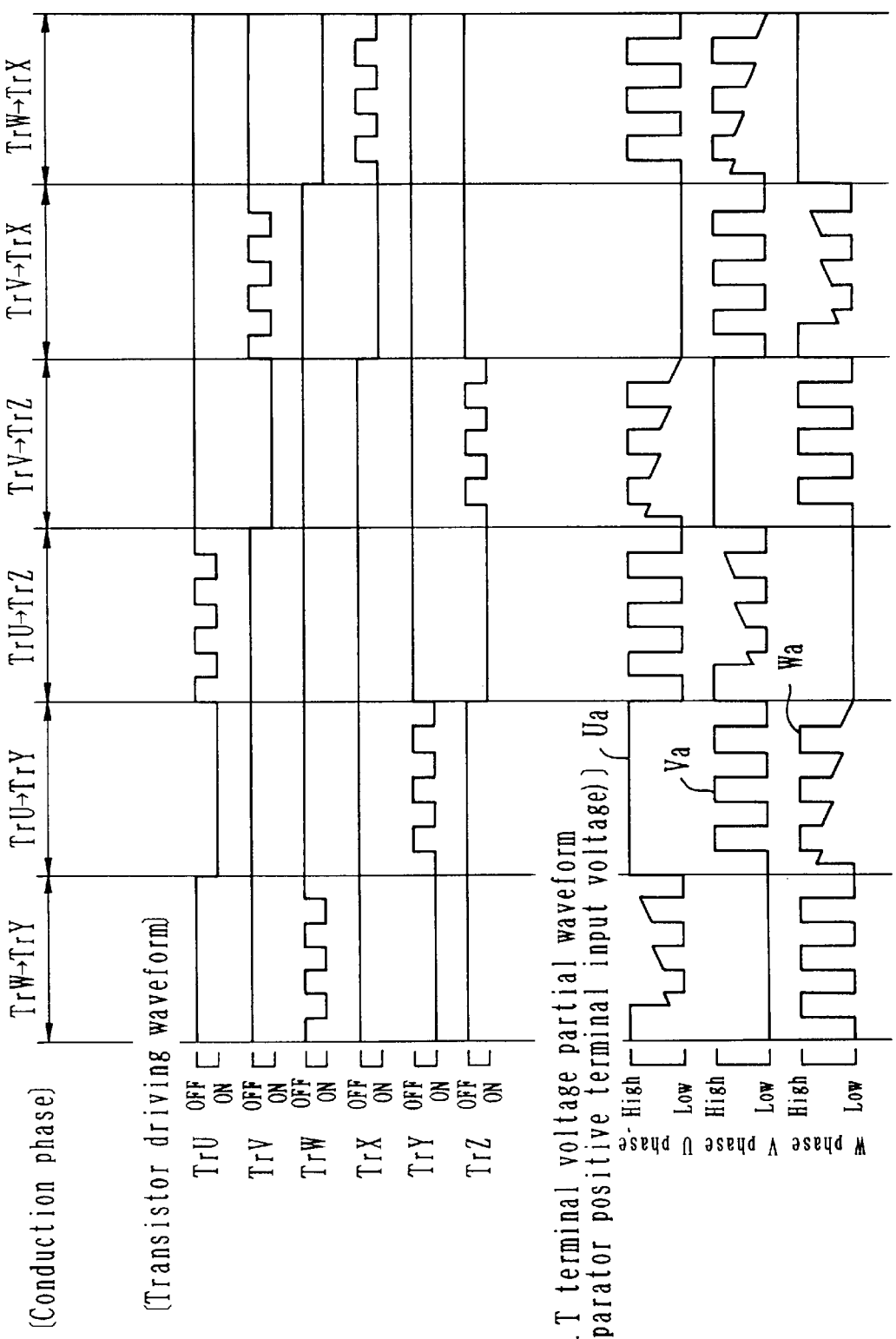
FIG. 31 is a essential part operation waveform diagram of the prior art.
Figure 32:
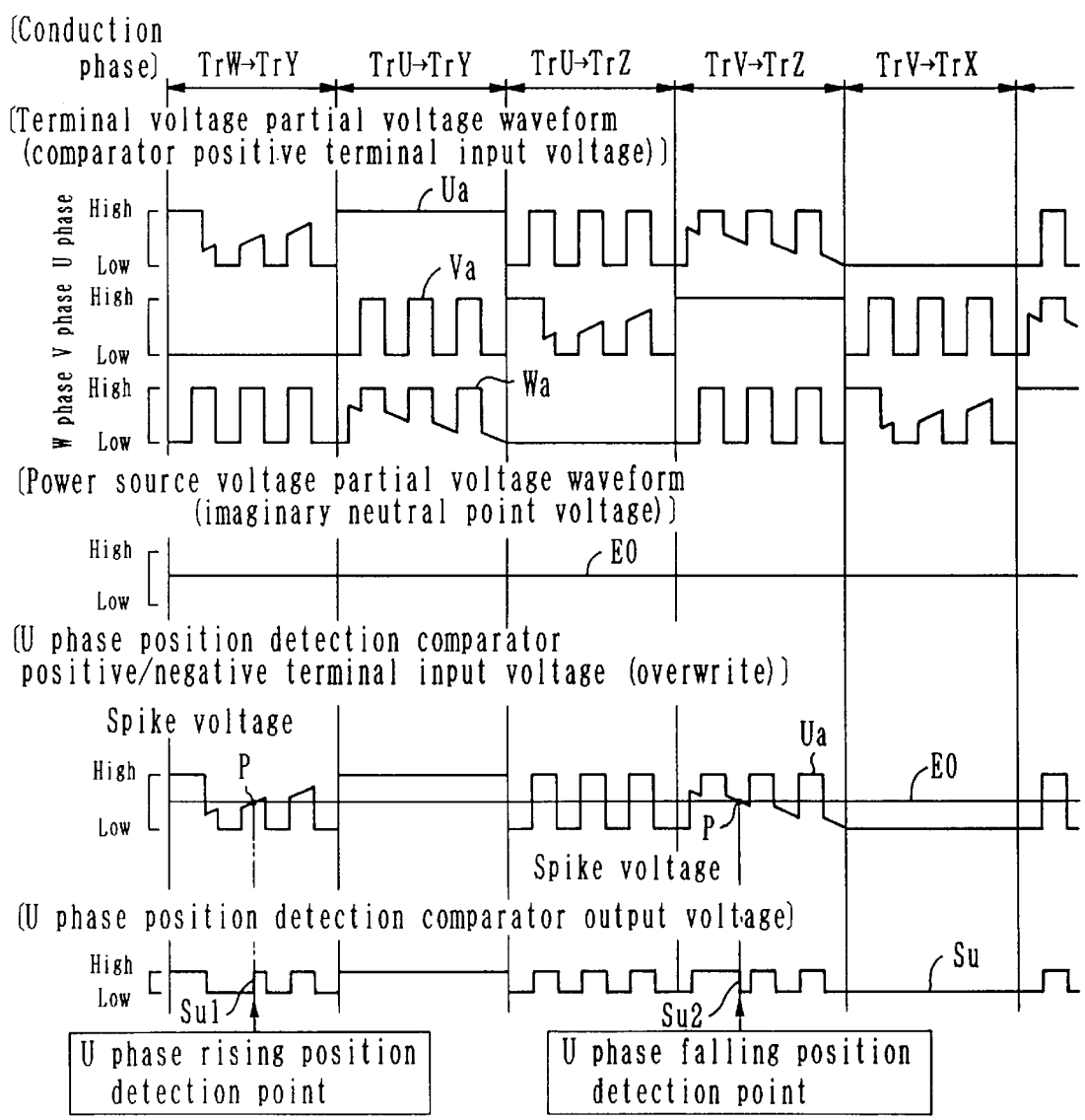
FIG. 32 is a essential part operation waveform diagram of the prior art.
Figure 33:
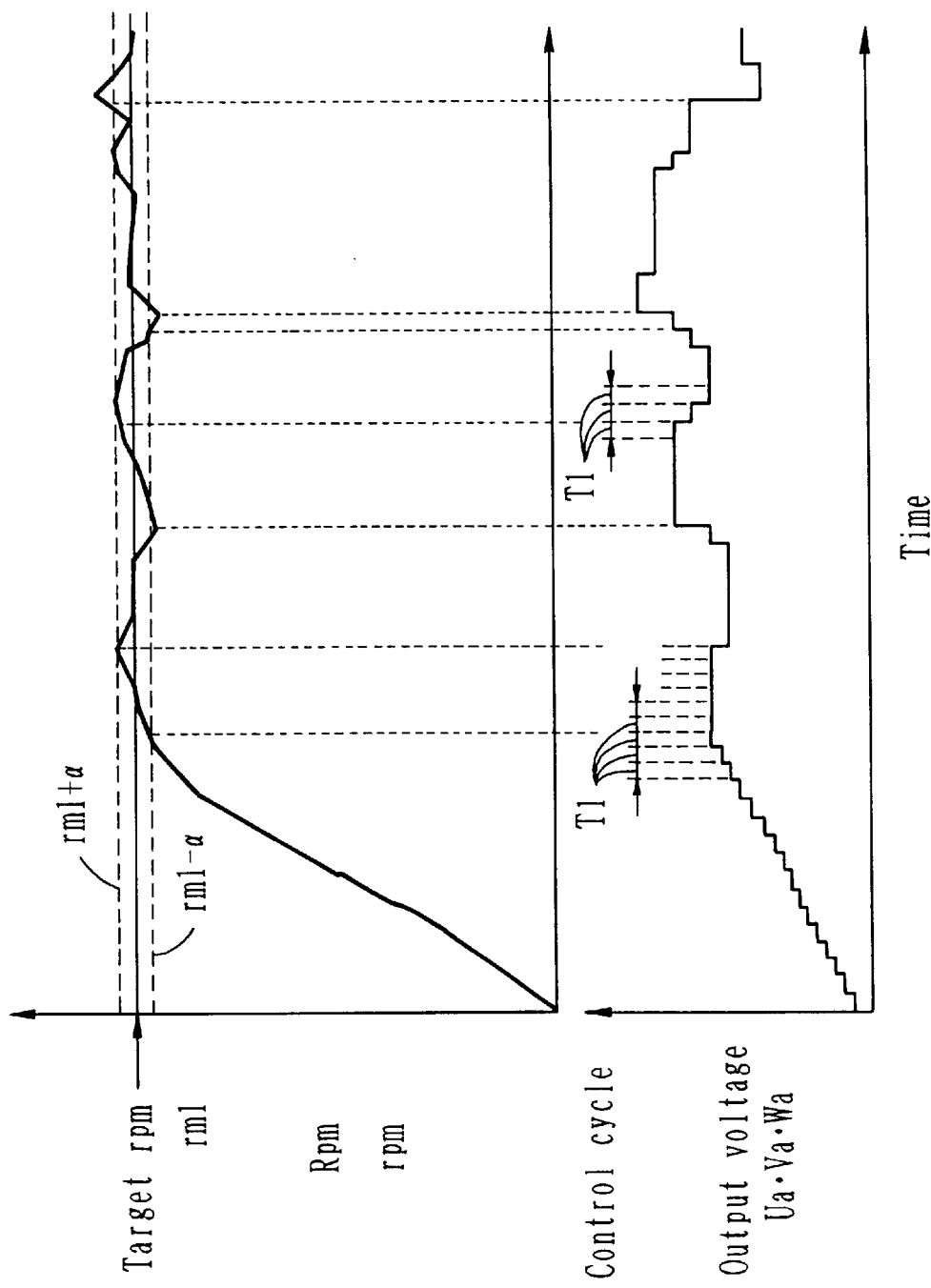
FIG. 33 is a essential part operation waveform diagram of the prior art.

In the step S4, the flag indicating the stable state is memorized in the data memory 25B, it is made to the control state obtaining the current output voltage Ua~Wa, as "stable state" of FIG. 29, namely, a state wherein chopping frequency fm or duty rate du are held not to modify, and thereafter, shifts to the "End", namely, a predetermined step point of the control processing flow.

The step S5 changes over to an output voltage adjustment that would obtain the target number of rotation rpm, namely, to the control by chopping frequency fm or duty rate du, and then shifts to the next step S6.

The step S6 resets the counting of the timer, stops the clock operation, and thereafter, shifts to the "End", namely, a predetermined step point of the control processing flow.

In the step S7, the number of rotation rpm based on the position detection signal Su1~Sw1 is calculated, and it is distinguished if it within the second tolerance range rm1+/−β, and if it is within the range, it shifts to "End", namely, a predetermined step point of the control processing flow, and if it is not, shifts to the step S8.

The step S5 deletes the "flag" indicating the stable state memorized in the data memory 25B, changes the control value by chopping frequency fm or duty rate du that would obtain the target number of rotation rpm, and thereafter, shifts to the "End", namely, a predetermined step point of the control processing flow.

Consequently, according to the control processing composition of said steps S1~S8, as in FIG. 29, if the number of rotation rpm remains within the first tolerance range rm1+/−α for the predetermined time t or more, it is distinguished as stable state, and thereafter, it is operated to change the output voltage given to respective phase until it becomes within the second tolerance range rm1+/−β, provided that β>α.

In other words, after it is distinguished as stable state, it becomes a state where the number of rotation has little difference with the target number of rotation rm1, provided there is no sudden load variation, in this state, as it is made to a state not to change the output voltage Ua~Wa, it can be made to a state where motor vibration or noise are limited to the strict minimum.

NINTH EXAMPLE

Now a ninth example shall be described referring to FIG. 26, FIG. 27, FIG. 29. On the whole, the composition of this ninth example composes the composition of said thirteenth composition. The ninth example is different from the composition of said eighth example in that, in the step S4 of the control processing flow of FIG. 27, the control process in the state where the "flag" indicating the stable state is memorized is modified as follows.

Namely, in place of control operation to hold the output voltage Ua~Wa not to change, as "stable state" of FIG. 29, the control cycle of the output voltage is changed to a control cycle T2 longer than the control cycle T1 at the time point of the distinction, for instance, 100 msec~10 sec corresponding to about 10 times of the control cycle T1. Namely, when the control cycle T1 is set to 50 msec, it is changed to a control cycle T2 of 0.5 sec, 10 times thereof.

In other words, after it is distinguished as stable state, the control cycle is prolonged, provided there is no sudden load variation, and as it is made to a state not to change the output voltage Ua~Wa, it can be made to a state where motor vibration or noise are limited to the strict minimum.

[Variant Embodiment]

The present invention includes also the following variants.

(1) Composition of the control processing portion for performing said control processing operation in the eighth example and the ninth example by a control section different from the microcomputer 25, for example, by a separate microcomputer.

(2) Composition of the control processing flow for performing said control process operation in the eighth example and the ninth example by a control processing flow control different from the control processing flow by the microcomputer 25, namely example by a control processing flow control independent of the main control processing flow.

(3) Composition of the control processing portion for performing said control processing operation in the eighth example, the ninth example or said (1) by a discrete circuit composition by combining gate circuit, logic circuit, or the like.

According to the present invention, as mentioned above, the inverter circuit driving control is stabilized on by a composition to detect the stable state of the load driven by the rotor based on the detection position signal for controlling the inverter circuit driving, and as an effect.

Figure 36:
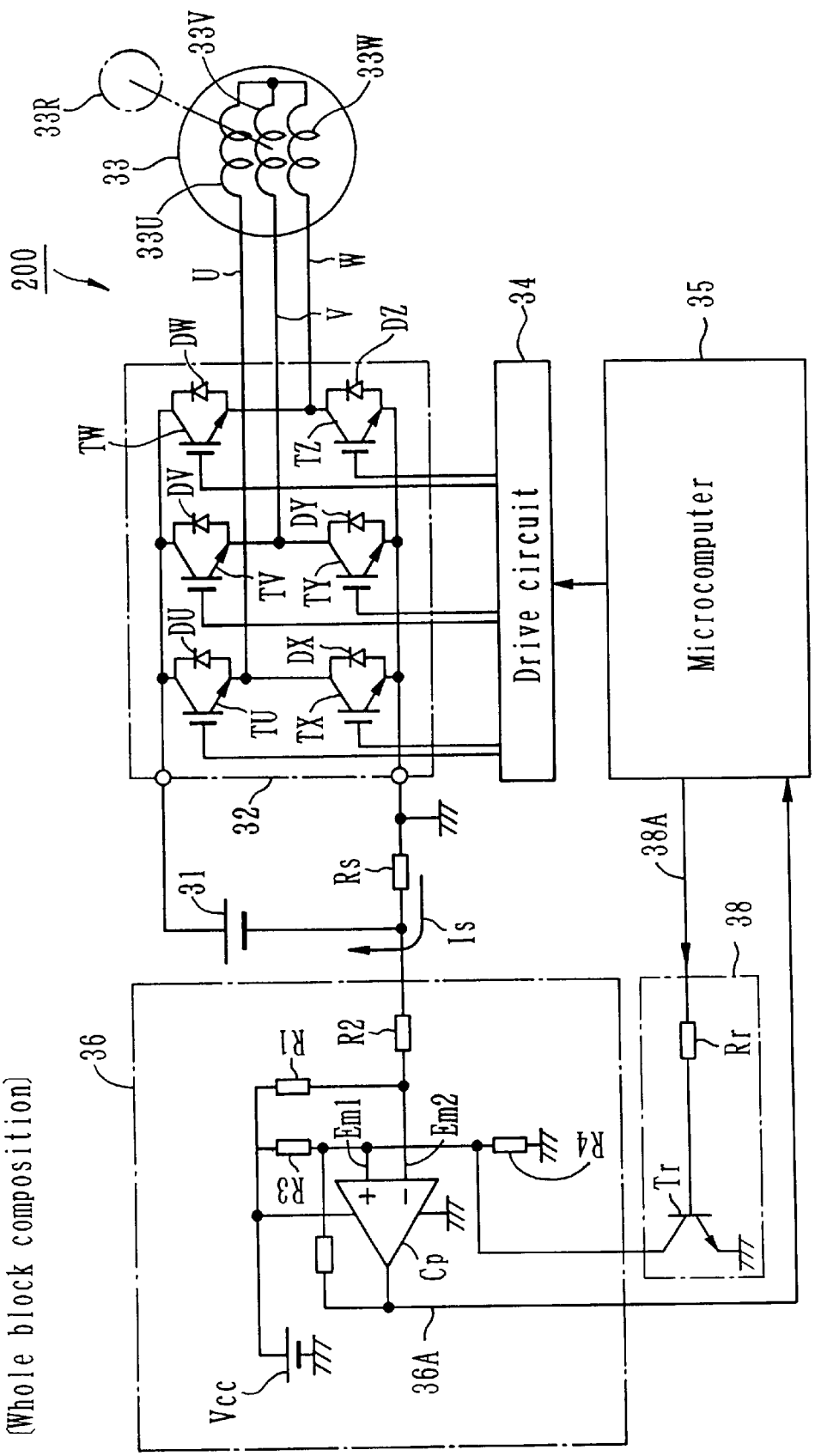
FIG. 36 is a whole block composition diagram of the present invention.
Figure 37:
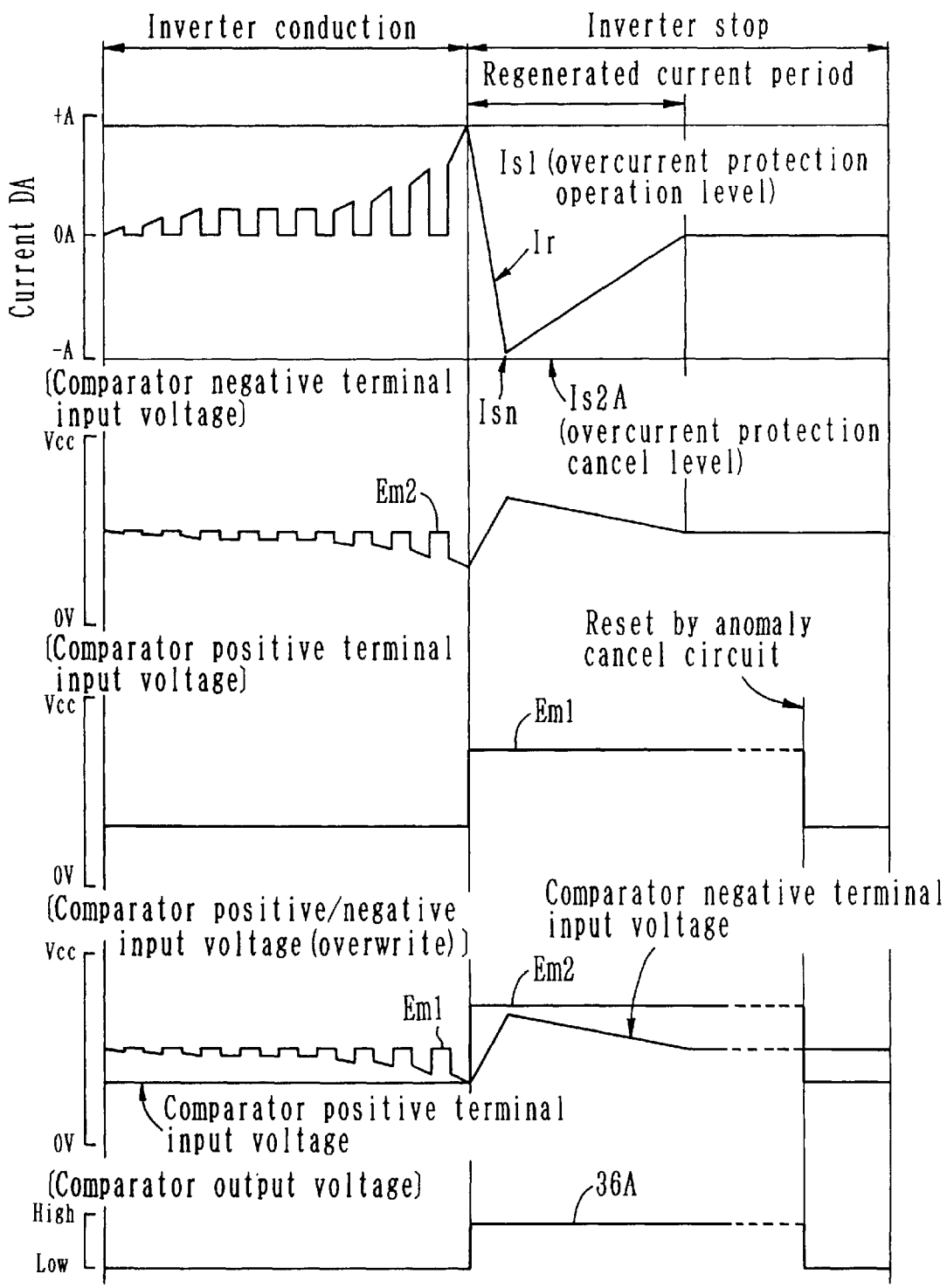
FIG. 37 is a essential part operation waveform diagram of the present invention.
Figure 38:
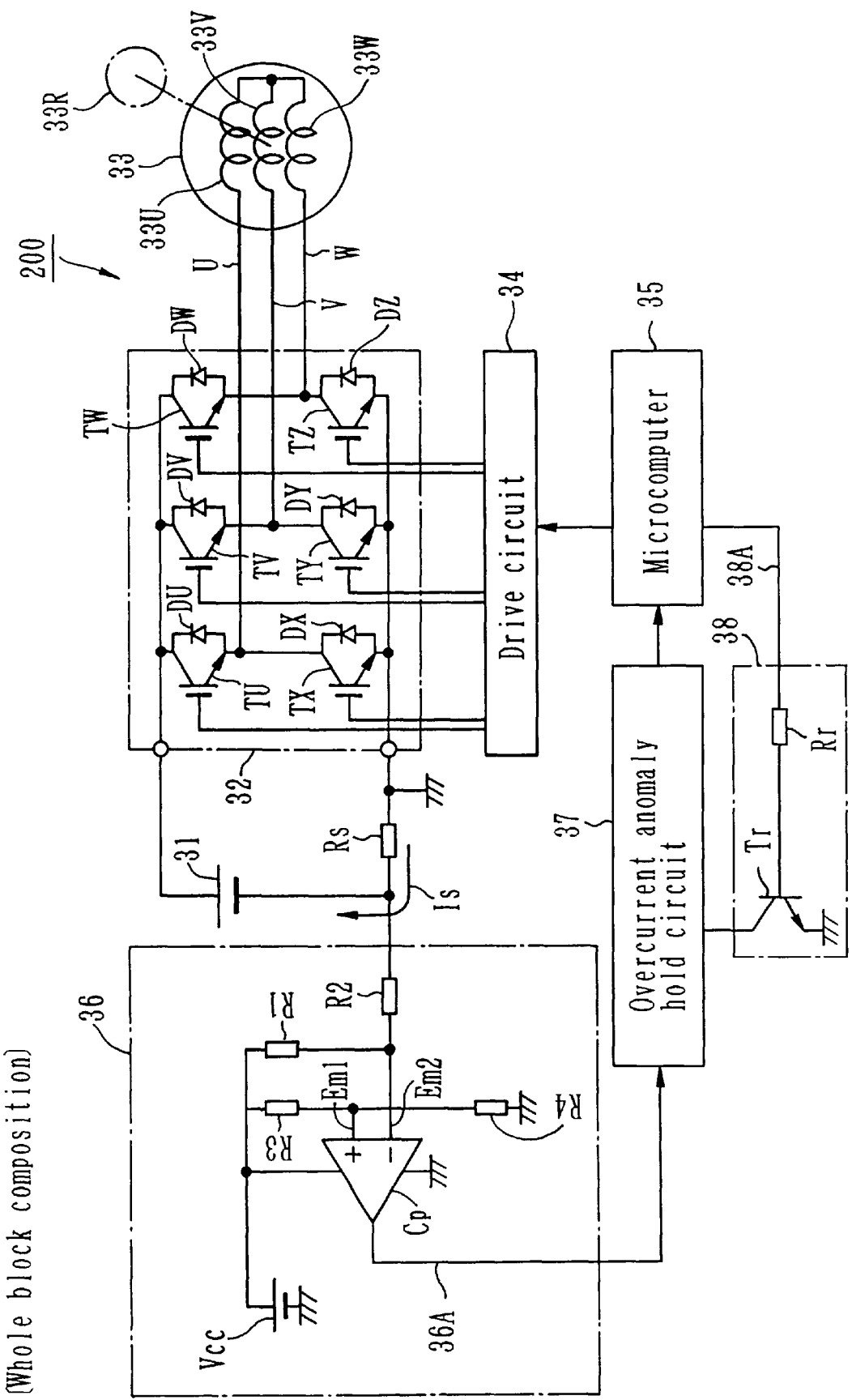
FIG. 38 is a whole block composition diagram of the prior art.
Figure 39:
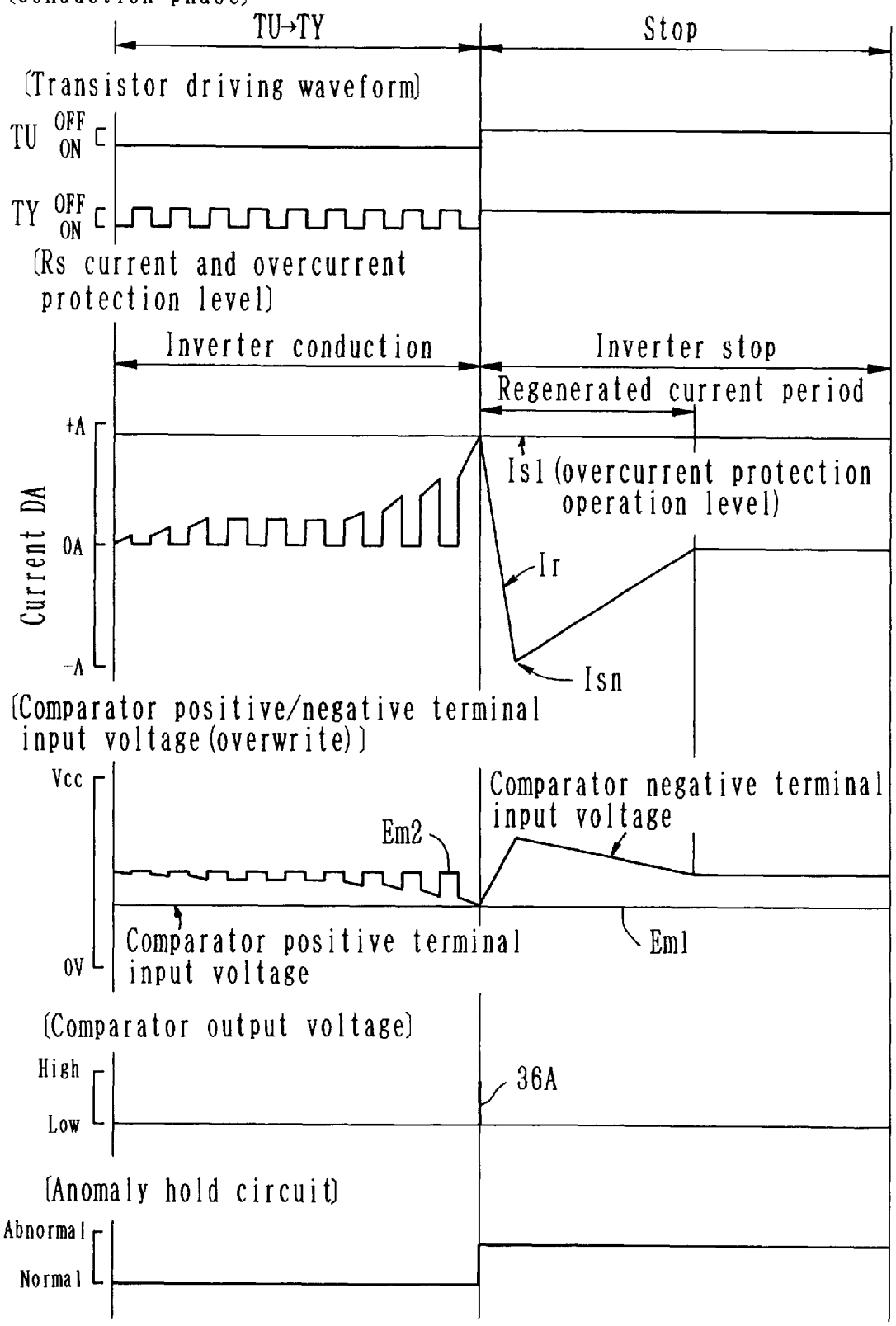
FIG. 39 is a essential part operation waveform diagram of the prior art.
Figure 40:
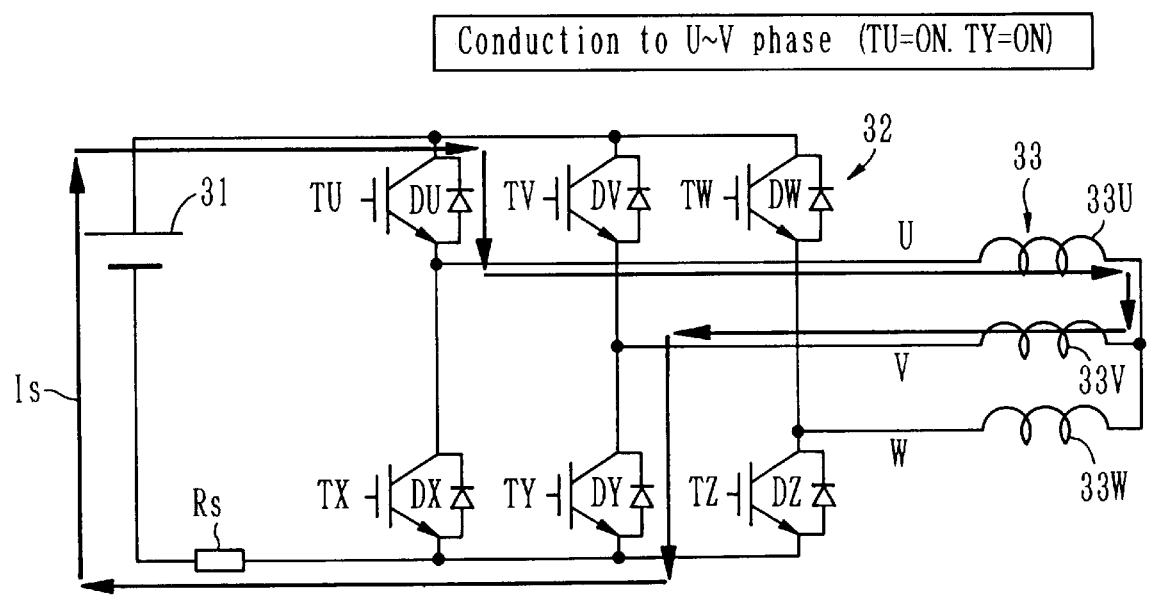
FIG. 40 is a essential part operation state diagram of the prior art.

Moreover, as another embodiment of the present invention, examples wherein the present invention is applied to the inverter driving electric motor apparatus 200 of the composition, shown in said FIG. 38 shall be described referring to FIG. 34~FIG. 37. In FIG. 34~FIG. 37, those portions having the same symbol as the symbol of said FIG. 38~FIG. 40 are portions having the same function as those portions having the same symbol in FIG. 38~FIG. 40. Moreover, those portions having the same symbol in FIG.

Figure 35:
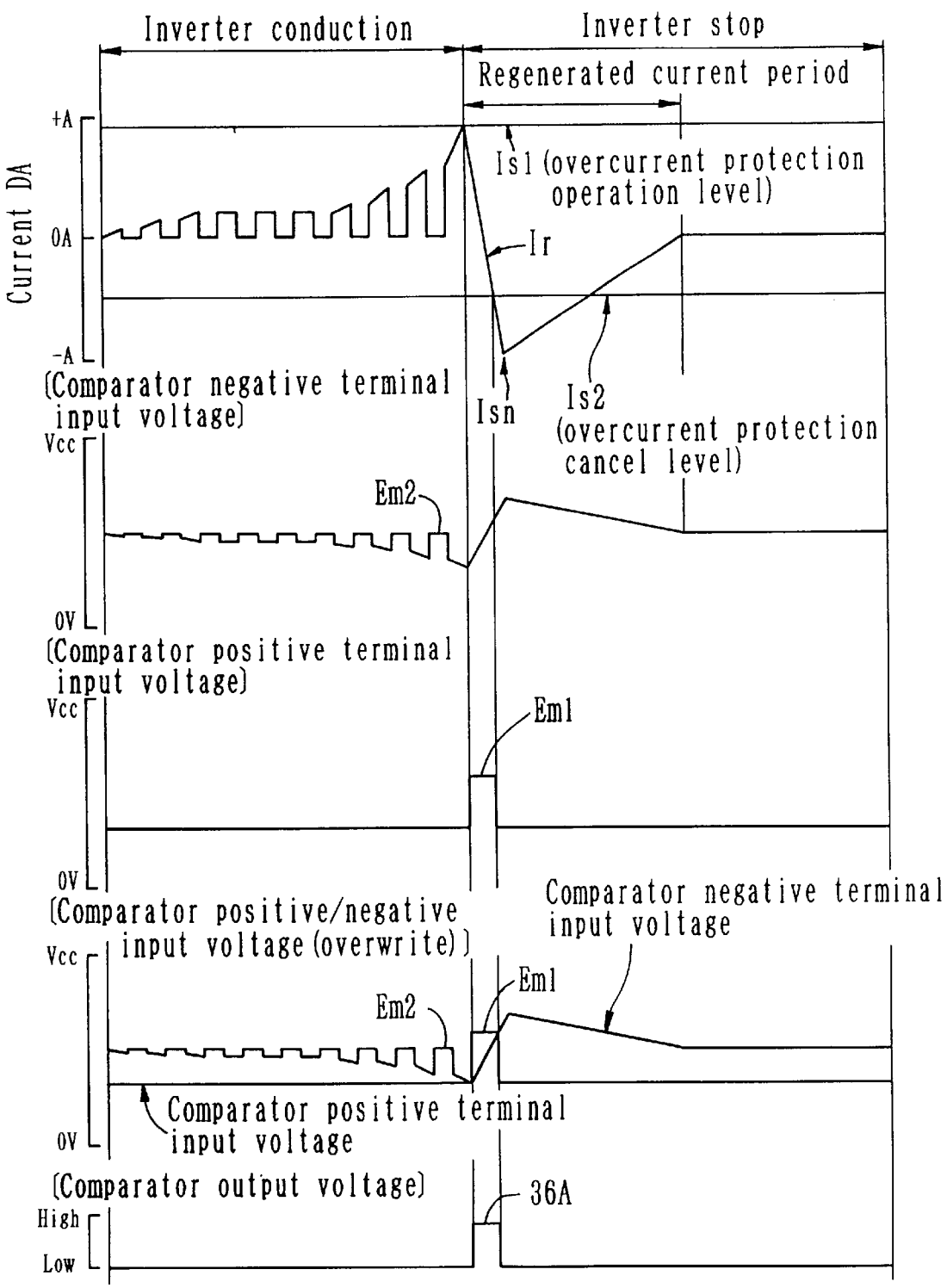
FIG. 35is a essential part operation waveform diagram of the present invention.

34~FIG. 37 are portions having the same function as those portions having the same symbol described in any one of FIG. 34~FIG. 37.

TENTH EXAMPLE

Figure 34:
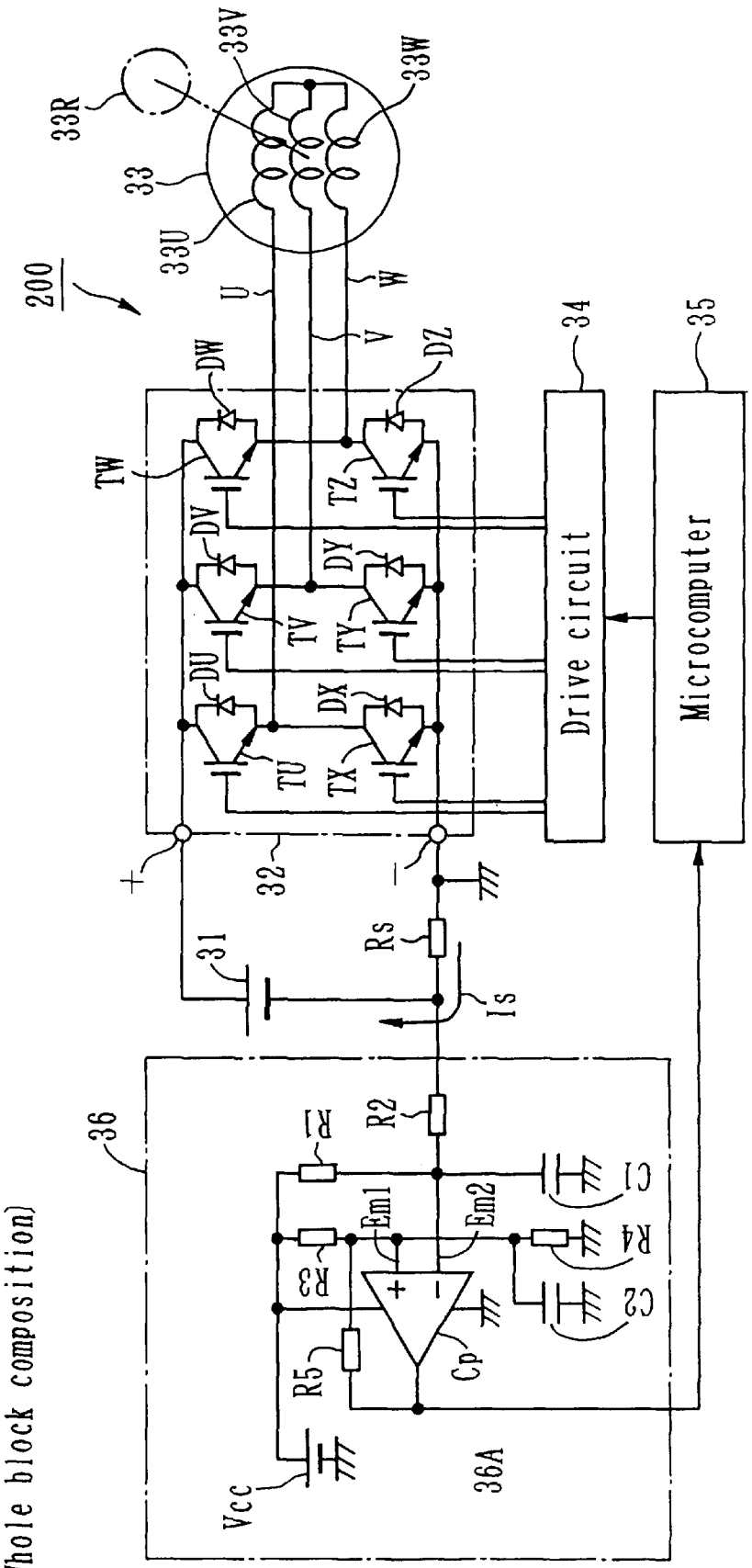
FIG. 34 is a whole block composition diagram of the prior art.

Now a tenth example shall be described referring to FIG. 34, FIG. 35. This tenth embodiment, on the whole, composes said fourteenth composition and fifteenth composition and is different from the composition of the prior art of FIG. 38 in the following points.

First, the overcurrent anomaly hold circuit 37 and anomaly cancel circuit 38 are eliminated, and the abnormal current detection circuit 36 and the microcomputer 35 are made to operate in place of the overcurrent anomaly hold circuit 37 and anomaly cancel circuit 38.

Second, a condenser C2 is connected between the positive terminal, namely, + terminal of the comparator CP and the ground, a feedback circuit by a resistor R5 is provided between + terminal and the output terminal, and a condenser C1 is connected between the negative terminal, namely − terminal of the comparator Cp and the ground, and made to perform the hystérésis operation as shown in FIG. 35. Here, the comparator Cp is composed of an open collector output circuit type comparator.

To be more specific, the conditions by said expressions (1),(2) are set to identical, and suppose the + terminal input voltage $Em1$ be $Em1a$ when the output of the comparator Cp is low level Low:

$$Em1a = Vcc(R4//R5)/[R3+(R4//R5)]$$

Suppose the + terminal input voltage $Em1$ be $Em1b$ when the output of the comparator Cp is high level High:

$$Em1b = Vcc\ R4/(R3+R4)$$

Besides, the condenser C1, C2 is set so that the comparator Cp output be low level Low at the initial operation where the circuit DC power source Vcc is given to the comparator Cp, and also set to a minute capacitance not to give influence to the operation of respective section during the overcurrent protection operation.

In addition, the resistors R1~R5 are set to the condition of the following expression (3):

$$\{(R4//R5)/[R3+(R4//R5)]\} < [R2/(R1+R2)] \tag{3}$$

so that, for the overcurrent protection level Is1, the current Is detected by the current detection resistor Rs will be:

Is<Is1 and when the overcurrent detection signal 36A=Low

Em1<Em2 as in the state before performing the overcurrent protection operation, in [Rs current and, overcurrent protection level] of FIG. 35.

When, it becomes Is1<Is and, as [Comparator output voltage] of FIG. 2, it becomes overcurrent detection signal 36A=High, and after, once, the overcurrent protection operation is performed, even if Is=0 by keeping the state of

Em1>Em2 the circuit constant is set to keep the overcurrent protection operation by obtaining the state overcurrent detection signal 36A=High in this state, it becomes the state of the following expression (4):

$$(R4/(R3+R4)) > [R2/(R1+R2)] \tag{4}$$

The circuit constant is set so that, in this state where this overcurrent protection operation is maintained, even when the current Is reduces and the current Is becomes zero, as in [Rs current and, overcurrent protection level] of FIG. 35, the same state is kept, and when it becomes the overcurrent protection cancel level Is2 in [Rs current and, overcurrent protection level] of FIG. 35, namely, it becomes Em1<Em2 and, as [Comparator positive terminal input voltage] of FIG. 35 the operation will be inverted to overcurrent detection signal 36A=Low.

Therefore, the comparison state in the comparator Cp, is as [Comparator positive negative terminal input voltage (overwrite)] of FIG. 35.

In the present invention, the operation to maintain the comparison output, even if the level of compared input supplied to the − terminal of the comparator Cp, once, exceeds the first comparison input level, performs the comparison output wherein the comparison output is reversed, and then the comparison input level lowers to the compared input level, and to return the comparison output to the original the comparison output state, namely to execute the reset operation, is called 'comparator hystérésis operation'.

In this tenth example, the predetermined current value to execute the reset operation in said 'comparator Cp hystérésis operation' is, as the overcurrent protection cancel level Is2 in [Rs current and, overcurrent protection level] of FIG. 35, is set to a predetermined value Is2 by the regenerated current Ir of the motor 33 generated after the stop of the inverter 32 driving by the microcomputer 35 and the driver circuit 34.

Though, in this tenth example, it is composed by applying to a three-phased DC brushless motor, it is within the practical range for the persons ordinarily skilled in the art to apply to the composition of the case where a motor 33 like a general induction electric motor is driven by an inverter 32 outputting an approximate sinusoidal wave type pulse amplitude modified voltage, and to execute the overcurrent protection operation, similarly; therefore, the description thereof is omitted herein.

ELEVENTH EXAMPLE

Now an eleventh example shall be described referring to FIG. 36, FIG. 37. This eleventh example, on the whole, composes said fourteenth composition and sixteenth composition and is different from said first example in that, an anomaly cancel circuit 38 is added, and its cancel operation is executed by the control of the microcomputer 35.

In FIG. 36, at the beginning of the apparatus operation, the microcomputer 35 resets the output of the comparator Cp of the overcurrent detection circuit 36, namely, overcurrent detection signal 36A to the low level Low side, by resetting the anomaly cancel circuit 38 to the anomaly cancel state, when the circuit DC power source Vcc attains a predetermined voltage value, before driving the inverter. After performing such operation, the microcomputer 35 puts the motor 33 to a state to rotate continuously, by driving the inverter by supplying the drive circuit 34 with a control signal to drive the inverter 32.

Thus, when the overcurrent detection circuit 36, as in said tenth example, detects the overcurrent state and gives the microcomputer 35 an output putting the comparator Cp overcurrent detection signal 36A to the high level High, the microcomputer 35 holds the overcurrent protection operation, by controlling the drive circuit 34, so as to stop driving the inverter 32.

However, as the reset operation level Is2A allowing to perform the reset operation in the comparator Cp hystérésis operation, is set to a negative current value larger than the negative current maximum value Isn, as the reset operation level of [Rs current and overcurrent protection level] in FIG. 37, so that:

|IS2A|>|Isn| it becomes a state wherein the reset operation in the hystérésis operation is blocked, and a state where the overcurrent protection operation is held results to be maintained.

In other words, as in [Anomaly hold circuit] of FIG. 37, it is impossible to return to the state of anomaly detection signal 36A=low level Low. Therefore, the comparison state in the comparator Cp is as [Comparator positive negative terminal input voltage (overwrite)] of FIG. 37.

The reset operation of the comparator CP hystérésis operation is set to be performed by grounding the + terminal or the comparator Cp by the anomaly cancel circuit 38, by supplying the anomaly cancel circuit 38 with a short pulse-shaped control signal 38A from the microcomputer when a clock circuit (not shown) disposed in the microcomputer 35 has counted the lapse of a predetermined time, for instance, 10 sec, or by supplying the anomaly cancel circuit 38 with a control signal 38A from the microcomputer 35 based on a signal that has operated the operation section (not shown) of the microcomputer 35.

Therefore, in the composition of this eleventh example, the reset operation of the comparator Cp hystérésis operation is not performed by the motor 33 regenerated current Ir after stopping the driving of the inverter 32, but it is composed to cancel the anomaly hold, namely, overcurrent protection operation hold based on the control of the microcomputer 35 controlling the driving of the inverter 32.

As mentioned above, the present invention has an effect to make the maintenance work due to the fault of circuit, to supply a simple and cheap apparatus, because the hold of overcurrent protection operation, or its hold and cancellation is assured by the hystérésis operation of the comparator disposed in the anomaly detection circuit, therefore, conventional overcurrent anomaly hold circuit, or overcurrent anomaly hold circuit and anomaly cancel circuit need not be provided.

What is claimed is:

1. A motor apparatus comprising:
    a DC brushless motor including,
        a rotor having a plurality of magnetized poles, and
        a multiple-phase stator coil disposed to supply said rotor with a rotational field during conduction;
    an inverter circuit for generating voltage to conduct a predetermined coil of said multiple-phase stator coil to form said rotational field; and
    a comparator for each phase of said multiple-phase stator coil for comparing and detecting induced voltage generated in said stator coil of the phase not conducted as above by rotation of said rotor and a predetermined voltage to obtain a position detection signal for controlling the time to perform said conduction based on said position detection signal, said comparator including,
        a comparison input device for inputting a first divided voltage to a positive terminal of the comparator for each respective phase, said first divided voltage dividing the voltage of respective ones of said multiple-phase stator coils, and for inputting a second divided voltage to a negative terminal of said comparator, said second divided voltage obtained by dividing the voltage between said first divided voltage of a phase different from the phase input to said positive terminal and an imaginary neutral point voltage obtained by dividing the bus voltage of said inverter circuit, and
        a position detection device for obtaining said position detection signal by detecting the intersection of the voltage portion based on said induced voltage in said first divided voltage and said second divided voltage by said comparator.

2. The motor apparatus of claim 1, wherein
said position detection signal is obtained at the time position shifted from the intersection of said induction voltage and said imaginary neutral point voltage, by making the phase of said stator coil for obtaining said second divided voltage a phase following the phase of said stator coil obtaining said first divided voltage.

3. The motor apparatus of claim 1, wherein
said position detection signal is obtained at the time position shifted from the intersection of said induction voltage and said imaginary neutral point voltage, by making the phase of said stator coil for obtaining said second divided voltage a phase preceding the phase of said stator coil obtaining said first divided voltage.

4. The motor apparatus of claim 1, wherein
a condenser for absorbing noise component of the voltage input to said respective comparator and attenuating the waveform is provided.

5. A motor apparatus comprising:
    a DC brushless motor including,
        a rotor having a plurality of magnetized poles, and
        a multiple-phase stator coil disposed to supply said rotor with a rotational field during conduction;
    an inverter circuit for generating voltage to conduct a predetermined coil of said multiple-phase stator coil;
    a comparator for each phase of said multiple-phase stator coil for comparing and detecting induced voltage generated in said stator coil of the phase not conducted as above by rotation of said rotor and a predetermined voltage to obtain a position detection signal for controlling the time to perform said conduction based on said position detection signal; and
    a masking time control device for controlling an increase/decrease of a position detection masking time for regulating the detection of said position detection signal following a preceding conversion time point, at a start-up of said inverter circuit, said increase/decrease of the position detection masking time controlled in response to the number of times that said position detection signal is obtained after the beginning of said start-up.

6. The motor apparatus of claim 5, further including:
    a conversion time control means for controlling the increase/decrease of conversion delay time for regulating the conversion time point following said preceding position detection signal at said start-up, in response to the number of times of said position detection signal obtained after the beginning of said start-up.

7. The motor apparatus of claim 5, further including:
a driving frequency increase/decrease control means for controlling the increase rate of said inverter circuit driving frequency immediately after the beginning of said start-up, by an increase rate higher than said driving frequency increase rate during the stationary operation of said inverter circuit.

8. The motor apparatus of claim 5, wherein
said control to increase/decrease the position detection masking time is performed only from the time point of the beginning of said start-up to the time point when the revolution of said rotor attains a predetermined number of revolution.

9. The motor apparatus of claim 6, wherein
said control to increase/decrease the conversion delay time is performed only from the time point of the beginning of said start-up to the time point when the revolution of said rotor attains a predetermined number of revolution.

10. The motor apparatus of claim 7, wherein
said control by the higher increase rate is performed only from the time point of the beginning of said start-up to the time point when the revolution of said rotor attains a predetermined number of revolution.

11. A motor apparatus comprising:
a DC brushless motor including,
    a rotor having a plurality of magnetized poles, and
    a multiple-phase stator coil disposed to supply said rotor with a rotational field during conduction;
an inverter circuit for generating voltage to conduct a predetermined coil of said multiple-phase stator coil;
a comparator for each phase of said multiple-phase stator coil for comparing and detecting induced voltage generated in said stator coil of the phase not conducted as above by rotation of said rotor and a predetermined voltage to obtain a position detection signal for controlling the time to perform said conduction based on said position detection signal;
a masking time control device for controlling an increase/decrease of a position detection masking time for regulating the detection of said position detection signal following a preceding conversion time point, at a start-up of said inverter circuit, said increase/decrease of the position detection masking time controlled in response to the number of times that said position detection signal is obtained after the beginning of said start-up;
a conversion time control device for controlling an increase/decrease of a conversion delay time for regulating a conversion time point following a preceding position detection signal at said start-up, in response to the number of times that said position detection signal is obtained after the beginning of said start-up; and
a driving frequency increase/decrease control device for controlling an increase rate of a driving frequency for said inverter circuit immediately after the beginning of said start-up, by an increase rate higher than an increase rate for said driving frequency during stationary operation of said inverter circuit.

12. A motor apparatus such as DC brushless motor comprising a rotor having a plurality of magnetized poles, and a multiple-phase stator coil disposed to supply said rotor with rotational field during the conduction, wherein a rotational field is formed by conducting a predetermined said stator coil with voltage generated in an inverter circuit, and the time to perform said conduction is controlled based on a position detection signal obtained by comparing and detecting the induced voltage generated in said stator coil of the phase not conducted as above by the rotation of said rotor and a predetermined voltage by means of a comparator provided for each phase of said multiple phases, comprising:
a load state distinction means for distinguishing as stable state where the load driven be said rotor is table, when the variation of number of revolution of said rotor obtained based on said position detection signal is within a predetermined range for a predetermined time, and
a control hold means for holding the control state of said pulse amplitude modification voltage at the control state at the time of said distinction when it is distinguished as said stable state.

13. A motor apparatus such as DC brushless motor comprising a rotor having a plurality of magnetized poles, and a multiple-phase stator coil disposed to supply said rotor with rotational field during the conduction, wherein a rotational field is formed by conducting a predetermined said stator coil with voltage generated in an inverter circuit, and the time to perform said conduction is controlled based on a position detection signal obtained by comparing and detecting the induced voltage generated in said stator coil of the phase not conducted as above by the rotation of said rotor and a predetermined voltage by means of a comparator provided for each phase of said multiple phases, comprising:
a load state distinction means for distinguishing as stable state where the load driven be said rotor is table, when the variation of number of revolution of said rotor obtained based on said position detection signal is within a predetermined range for a predetermined time, and
a control cycle modification means for changing said pulse amplitude modification voltage control cycle to a control cycle longer that the control cycle at the time of said distinction.

14. An inverter driving electric motor apparatus for driving an electric motor by an inverter converting DC power source into AC power source, and holding/canceling the overcurrent protection operation for stopping said inverter driving based on the output of overcurrent detection, by comparing the detection voltage obtained by sensing the current supplied to said inverter from said DC power source and a predetermined reference voltage by means of a comparator, comprising:
a hold/cancellation means for performing said hold, or said hold and cancellation, based on the hystérésis operation of said comparator.

15. The motor apparatus of claim 14, wherein
said cancellation is performed based on reset operation of said hystérésis operation when the regenerated current of said electric motor after said stop has done becomes a predetermined negative current.

16. The motor apparatus of claim 14, wherein
said cancellation is performed based on the control of a microcomputer controlling said inverter driving, without reset operation of said hystérésis operation.

17. The motor apparatus of claim 2, wherein
a condenser for absorbing noise component of the voltage input to said respective comparator and attenuating the waveform is provided.

18. The motor apparatus of claim 3, wherein
a condenser for absorbing noise component of the voltage input to said respective comparator and attenuating the waveform is provided.

* * * * *

UNITED STATES PATENT AND TRADEMARK OFFICE
CERTIFICATE OF CORRECTION

PATENT NO.    : 6,538,404 B2
DATED         : March 25, 2003
INVENTOR(S)   : Hideaki Kato et al.

It is certified that error appears in the above-identified patent and that said Letters Patent is <u>Column 6,</u>
Line 45, "3R" should read -- 23R --;

<u>Columns 31-34,</u>
Please delete claims 1-18 and insert the following new claims 1-18:

```
1.    A motor apparatus comprising:
      a DC brushless motor including,
            a rotor having a plurality of magnetized poles, and
            a multiple-phase stator coil disposed to supply said rotor
      with a rotational field during conduction;
      an inverter circuit for generating voltage to conduct a predetermined coil
of said multiple-phase stator coil to form said rotational field; and
      a comparator for each phase of said multiple-phase stator coil for
comparing and detecting induced voltage generated in said stator coil of the
phase not conducted as above by rotation of said rotor and a predetermined
voltage to obtain a position detection signal for controlling the time to
perform said conduction based on said position detection signal, said comparator
including,
            a comparison input device for inputting a first divided voltage to a
positive terminal of the comparator for each respective phase, said first
divided voltage dividing the voltage of respective ones of said multiple-phase
stator coils, and for inputting a second divided voltage to a negative terminal
of said comparator, said second divided voltage obtained by dividing the voltage
between said first divided voltage of a phase different from the phase input to
said positive terminal and an imaginary neutral point voltage obtained by
dividing the bus voltage of said inverter circuit, and
            a position detection device for obtaining said position
      detection signal by detecting the intersection of the voltage
      portion based on said induced voltage in said first divided voltage
      and said second divided voltage by said comparator.
```

UNITED STATES PATENT AND TRADEMARK OFFICE
CERTIFICATE OF CORRECTION

PATENT NO. : 6,538,404 B2
DATED : March 25, 2003
INVENTOR(S) : Hideaki Kato et al.

It is certified that error appears in the above-identified patent and that said Letters Patent is hereby corrected as shown below:

2. The motor apparatus of claim 1, wherein
said position detection signal is obtained at a time position   shifted from the intersection of said induced voltage and said imaginary neutral point voltage, by making the second phase of said stator coil for obtaining said second divided voltage a phase following the first phase of said stator coil obtaining said first divided voltage.

3. The motor apparatus of claim 1, wherein
said position detection signal is obtained at a time position shifted from the intersection of said induced voltage and said imaginary neutral point voltage, by making the second phase of said stator coil for obtaining said second divided voltage a phase preceding the first phase of said stator coil obtaining said first divided voltage.

4. The motor apparatus of claim 1, wherein
a condenser for absorbing noise components of the voltage input to said comparator and attenuating the waveform of the input voltage is provided.

5. A motor apparatus comprising:
a DC brushless motor including,
    a rotor having a plurality of magnetized poles, and
    a multiple-phase stator coil disposed to supply said rotor
with a rotational field during conduction;
an inverter circuit for generating voltage to conduct a predetermined coil of said multiple-phase stator coil;
a comparator for each phase of said multiple-phase stator coil for comparing and detecting induced voltage generated in said stator coil of the phase not conducted as above by rotation of said rotor and a predetermined voltage to obtain a position detection signal for controlling the time to perform said conduction based on said position detection signal; and a masking time control device for controlling an increase/decrease of a position detection masking time for regulating the detection of said position detection signal following a preceding conversion time point, at a start-up of said inverter circuit, said increase/decrease of the position detection masking time controlled in response to the number of times that said position detection signal is obtained after the beginning of said start-up.

6. The motor apparatus of claim 5, further including:
a conversion time control device for controlling an increase/decrease of a conversion delay time for regulating a conversion time point following a preceding position detection signal at said start-up, in response to the number of times that said position detection signal is obtained after the beginning of said start-up.

7. The motor apparatus of claim 5, further including:
a driving frequency increase/decrease control device for controlling an increase rate of a driving frequency for said inverter circuit immediately after the beginning of said start-up, by an increase rate higher than an increase rate for said driving frequency during stationary operation of said inverter circuit.

8. The motor apparatus of claim 5, wherein
said control to said increase/decrease for the position detection masking time is performed only from a time point of the beginning of said start-up to a time point when the revolution of said rotor attains a predetermined number of revolutions.

UNITED STATES PATENT AND TRADEMARK OFFICE
CERTIFICATE OF CORRECTION

PATENT NO. : 6,538,404 B2
DATED : March 25, 2003
INVENTOR(S) : Hideaki Kato et al.

It is certified that error appears in the above-identified patent and that said Letters Patent is hereby corrected as shown below:

```
9.    The motor apparatus of claim 6, wherein
      said control to said increase/decrease for the conversion delay time is
performed only from a time point of the beginning of said start-up to a time
point when the revolution of said rotor attains a predetermined number of
revolutions.

10.   The motor apparatus of claim 7, wherein
      said control by the higher increase rate is performed only from a time
point of the beginning of said start-up to a time point when the revolution of
said rotor attains a predetermined number of revolutions.

11.   A motor apparatus comprising:
      a DC brushless motor including,
          a rotor having a plurality of magnetized poles, and
          a multiple-phase stator coil disposed to supply said rotor
      with a rotational field during conduction;
      an inverter circuit for generating voltage to conduct a predetermined coil
of said multiple-phase stator coil;
      a comparator for each phase of said multiple-phase stator coil for
comparing and detecting induced voltage generated in said stator coil of the
phase not conducted as above by rotation of said rotor and a predetermined
voltage to obtain a position detection signal for controlling the time to
perform said conduction based on said position detection signal;
      a masking time control device for controlling an increase/decrease of a
position detection masking time for regulating the detection of said position
detection signal following a preceding conversion time point, at a start-up of
said inverter circuit, said increase/decrease of the position detection masking
time controlled in response to the number of times that said position detection
signal is obtained after the beginning of said start-up;

a conversion time control device for controlling an increase/decrease of a
conversion delay time for regulating a conversion time point following a
preceding position detection signal at said start-up, in response to the number
of times that said position detection signal is obtained after the beginning of
said start-up; and
      a driving frequency increase/decrease control device for controlling an
increase rate of a driving frequency for said inverter circuit immediately after
the beginning of said start-up, by an increase rate higher than an increase rate
for said driving frequency during stationary operation of said inverter circuit.

12.   A motor apparatus comprising:
      a DC brushless motor including,
          a rotor having a plurality of magnetized poles, and
          a multiple-phase stator coil disposed to supply said rotor
      with a rotational field during conduction;
      an inverter circuit for generating voltage to conduct a predetermined coil
of said multiple-phase stator coil;
      a comparator for each phase of said multiple-phase stator coil for
comparing and detecting induced voltage generated in said stator coil of the
phase not conducted as above by rotation of said rotor and a predetermined
voltage to obtain a position detection signal for controlling the time to
perform said conduction based on said position detection signal;
      a load state distinction device for distinguishing a stable state
where a load driven by said rotor is stable, when the variation of the number of
revolutions of said rotor obtained based on said position detection signal is
within a predetermined range for a predetermined time; and
      a control hold device for holding a control state of a pulse amplitude
modification voltage at a control state at the time of said distinction when the
load driven by said rotor is distinguished as said stable state.
```

UNITED STATES PATENT AND TRADEMARK OFFICE
CERTIFICATE OF CORRECTION

PATENT NO.    : 6,538,404 B2
DATED         : March 25, 2003
INVENTOR(S)   : Hideaki Kato et al.

It is certified that error appears in the above-identified patent and that said Letters Patent is hereby corrected as shown below:

```
13.    A motor apparatus comprising:
       a DC brushless motor including,
              a rotor having a plurality of magnetized poles, and
              a multiple-phase stator coil disposed to supply said rotor
       with a rotational field during conduction;
       an inverter circuit for generating voltage to conduct a predetermined coil
of said multiple-phase stator coil;
       a comparator for each phase of said multiple-phase stator coil for
comparing and detecting induced voltage generated in said stator coil of the
phase not conducted as above by rotation of said rotor and a predetermined
voltage to obtain a position detection signal for controlling the time to
perform said conduction based on said position detection signal;
       a load state distinction device for distinguishing a stable state where a
load driven by said rotor is stable, when variation of the number of revolutions
of said rotor obtained based on said position detection signal is within a
predetermined range for a predetermined time; and
       a control cycle modification device for changing a pulse amplitude
modification voltage control cycle to a control cycle longer than a control
cycle at the time of distinguishing said state.
```

```
14.    An inverter driving electric motor apparatus comprising:
       an electric motor;
       an inverter for driving said electric motor by converting a DC power
source into an AC power source, and holding/canceling an overcurrent protection
operation for stopping the driving of said inverter based on an overcurrent
detection output;
       a comparator for comparing a detection voltage obtained by sensing the
current supplied to said inverter from said DC power source and a predetermined
reference voltage and holding/canceling said overcurrent protection operation
based on the comparison; and
       a hold/cancellation device for performing said hold, or said hold and
cancellation, based on the hysteresis operation of said comparator.

15.    The motor apparatus of claim 14, wherein
       said cancellation is performed based on a reset operation of said
hysteresis operation when a regenerated current of said electric motor after a
stop has been done becomes a predetermined negative current.
```

UNITED STATES PATENT AND TRADEMARK OFFICE
CERTIFICATE OF CORRECTION

PATENT NO. : 6,538,404 B2
DATED : March 25, 2003
INVENTOR(S) : Hideaki Kato et al.

It is certified that error appears in the above-identified patent and that said Letters Patent is hereby corrected as shown below:

```
16.   The motor apparatus of claim 14, wherein
      said cancellation is performed based on the control of a microcomputer
controlling the driving of said inverter, without a reset operation of said
hysteresis operation.

17.   The motor apparatus of claim 2, wherein
      a condenser for absorbing noise components of the voltage input to said
comparator and attenuating the waveform of the input voltage is provided.

18.   The motor apparatus of claim 3, wherein
      a condenser for absorbing noise components of the voltage input to said
comparator and attenuating the waveform of the input voltage is provided.
```

Signed and Sealed this

Thirty-first Day of August, 2004

JON W. DUDAS
*Director of the United States Patent and Trademark Office*